(12) United States Patent
Howell et al.

(10) Patent No.: US 9,654,288 B1
(45) Date of Patent: May 16, 2017

(54) SECURING GROUP COMMUNICATIONS

(71) Applicant: Wickr Inc., Chicago, IL (US)

(72) Inventors: Christopher A. Howell, Freehold, NJ (US); Thomas Michael Leavy, Hoboken, NJ (US)

(73) Assignee: Wickr Inc., San Francisco, CA (US)

( * ) Notice: Subject to any disclaimer, the term of this patent is extended or adjusted under 35 U.S.C. 154(b) by 0 days.

(21) Appl. No.: 14/965,775

(22) Filed: Dec. 10, 2015

Related U.S. Application Data

(60) Provisional application No. 62/090,754, filed on Dec. 11, 2014.

(51) Int. Cl.
*H04L 29/06* (2006.01)
*H04L 9/08* (2006.01)
*G06F 21/60* (2013.01)

(52) U.S. Cl.
CPC .......... *H04L 9/0861* (2013.01); *G06F 21/602* (2013.01)

(58) Field of Classification Search
None
See application file for complete search history.

(56) References Cited

U.S. PATENT DOCUMENTS

| | | |
|---|---|---|
| 5,850,443 A | 12/1998 | Van Oorschot et al. |
| 5,953,419 A | 9/1999 | Lohstroh |
| 6,009,173 A | 12/1999 | Sumner |
| 6,091,820 A | 7/2000 | Aziz |
| 6,112,227 A | 8/2000 | Heiner |
| 6,145,079 A | 11/2000 | Mitty et al. |
| 6,263,435 B1 | 7/2001 | Dondeti |
| 6,266,420 B1 | 7/2001 | Langford et al. |
| 6,314,190 B1 | 11/2001 | Zimmermann |
| 6,324,569 B1 | 11/2001 | Ogilvie et al. |
| 6,393,464 B1 | 5/2002 | Dieterman |
| 6,405,315 B1 | 6/2002 | Burns et al. |
| 6,457,134 B1 | 9/2002 | Lemke |

(Continued)

FOREIGN PATENT DOCUMENTS

| | | |
|---|---|---|
| EP | 2018015 | 1/2009 |
| WO | 2011101784 | 8/2011 |
| WO | 2014140736 | 9/2014 |

OTHER PUBLICATIONS

Yoshida, Masahiro; Ohzahata, Satoshi; Nakao, Akihiro; Kawashima, Konosuke. Controlling File Distribution in the Share Network Through Content Poisoning. 2010 24th IEEE International Conference on Advanced Information Networking and Applications (AINA). http://ieeexplore.ieee.org/stamp/stamp.jsp?arnumber=5474821.*

(Continued)

*Primary Examiner* — Jeremiah Avery
(74) *Attorney, Agent, or Firm* — Christian LaForgia

(57) ABSTRACT

The secure messaging app described herein allows a user to create a secure social feed in order to share content with just a few friends or thousands of recipients. The user encrypts their content and then publishes the encrypted content to the secure social feed. Accordingly, only authorized recipients can decrypt and view the content. Furthermore, the user may administer the secure social feed to manage the addition and/or removal of users from the secure social feed. Further, the user periodically updates the parameters of the secure social feed to manage users' access to the feed.

13 Claims, 53 Drawing Sheets

(56) References Cited

U.S. PATENT DOCUMENTS

| | | |
|---|---|---|
| 6,463,155 B1 | 10/2002 | Akiyama |
| 6,463,460 B1 | 10/2002 | Simonoff |
| 6,463,463 B1 | 10/2002 | Godfrey |
| 6,711,608 B1 | 3/2004 | Ogilvie |
| 6,721,784 B1 | 4/2004 | Leonard et al. |
| 6,742,116 B1 | 5/2004 | Matsui |
| 6,801,998 B1 | 10/2004 | Hanna |
| 6,804,257 B1 | 10/2004 | Benayoun |
| 6,851,049 B1 | 2/2005 | Price, III |
| 6,904,521 B1 | 6/2005 | Jivsov |
| 6,912,656 B1 | 6/2005 | Perlman |
| 6,947,556 B1 | 9/2005 | Matyas |
| 6,978,284 B2 | 12/2005 | McBrearty |
| 7,024,456 B1 | 4/2006 | Simonoff |
| 7,043,529 B1 | 5/2006 | Simonoff |
| 7,139,399 B1 | 11/2006 | Zimmermann |
| 7,149,893 B1 | 12/2006 | Leonard et al. |
| 7,178,021 B1 | 2/2007 | Hanna |
| 7,197,537 B2 | 3/2007 | Koch |
| 7,243,231 B2 | 7/2007 | Ellison |
| 7,263,619 B1 | 8/2007 | Kim |
| 7,308,477 B1 | 12/2007 | Gress et al. |
| 7,356,564 B2 | 4/2008 | Hartselle et al. |
| 7,366,894 B1 | 4/2008 | Kalimuthu et al. |
| 7,383,439 B2 | 6/2008 | Price et al. |
| 7,526,620 B1 | 4/2009 | McGovern |
| 7,584,505 B2 | 9/2009 | Mondri et al. |
| 7,640,427 B2 | 12/2009 | Callas et al. |
| 7,657,037 B2 | 2/2010 | Callas |
| 7,711,120 B2 | 5/2010 | Kimmel |
| 7,715,565 B2 | 5/2010 | Kimmel |
| 7,730,309 B2 | 6/2010 | Zimmermann |
| 7,739,501 B2 | 6/2010 | Kimmel |
| 7,802,099 B2 | 9/2010 | Mitchell et al. |
| 8,036,221 B2 | 10/2011 | Fluhrer et al. |
| 8,156,536 B2 | 4/2012 | Polk |
| 8,175,277 B2 | 5/2012 | Bell et al. |
| 8,291,031 B1 | 10/2012 | Kirkham |
| 8,347,083 B1 | 1/2013 | Scudder |
| 8,356,177 B2 | 1/2013 | McGrew et al. |
| 8,364,764 B2 | 1/2013 | Hartselle et al. |
| 8,364,984 B2 | 1/2013 | Jeffries et al. |
| 8,379,857 B1 | 2/2013 | Zheng |
| 8,380,868 B2 | 2/2013 | Hiie |
| 8,392,699 B2 | 3/2013 | Jones et al. |
| 8,407,471 B1 | 3/2013 | Sobel |
| 8,412,934 B2 | 4/2013 | De Atley et al. |
| 8,429,420 B1 | 4/2013 | Melvin |
| 8,433,901 B2 | 4/2013 | De Atley et al. |
| 8,447,970 B2 | 5/2013 | Klein et al. |
| 8,478,893 B2 | 7/2013 | Hiie |
| 8,489,889 B1 | 7/2013 | Moscaritolo et al. |
| 8,503,621 B2 | 8/2013 | Patel et al. |
| 8,503,681 B1 | 8/2013 | McGrew et al. |
| 8,510,552 B2 | 8/2013 | De Atley et al. |
| 8,527,769 B2 | 9/2013 | Kotla et al. |
| 8,549,643 B1 * | 10/2013 | Shou ............ G06F 21/556 455/410 |
| 8,560,843 B2 | 10/2013 | Moscaritolo et al. |
| 8,566,350 B2 | 10/2013 | Chow |
| 8,572,757 B1 | 10/2013 | Stamos |
| 8,588,425 B1 | 11/2013 | Harwood |
| 8,589,673 B2 | 11/2013 | Ackerly |
| 8,589,680 B2 | 11/2013 | De Atley et al. |
| 8,601,114 B1 | 12/2013 | Cooper |
| 8,601,263 B1 | 12/2013 | Shankar |
| 8,625,805 B1 | 1/2014 | Statica |
| 8,631,227 B2 | 1/2014 | Olechowski et al. |
| 8,667,271 B2 | 3/2014 | Shkolnikov |
| 8,677,136 B2 | 3/2014 | Brokenshire et al. |
| 8,682,893 B2 | 3/2014 | Summerlin |
| 8,689,015 B2 | 4/2014 | Jeffries et al. |
| 8,705,565 B2 | 4/2014 | Kutt et al. |
| 8,713,311 B1 | 4/2014 | Roskind |
| 8,719,233 B2 | 5/2014 | Gandhi |
| 8,726,009 B1 | 5/2014 | Cook et al. |
| 8,726,369 B1 | 5/2014 | Emigh |
| 8,732,452 B2 | 5/2014 | Byrum et al. |
| 8,756,419 B2 | 6/2014 | De Atley et al. |
| 8,762,712 B1 | 6/2014 | Kwan |
| 8,782,409 B2 | 7/2014 | Murphy et al. |
| 8,788,842 B2 | 7/2014 | Brouwer et al. |
| 8,788,899 B2 | 7/2014 | Hiie |
| 8,798,614 B2 | 8/2014 | Bellovin |
| 8,824,664 B1 | 9/2014 | Ristock et al. |
| 8,837,739 B1 | 9/2014 | Sexton et al. |
| 8,862,129 B2 | 10/2014 | Moshir et al. |
| 8,863,226 B1 | 10/2014 | Bailey, Jr. |
| 8,874,902 B2 | 10/2014 | Ackerly |
| 8,913,994 B2 | 12/2014 | Edwards et al. |
| 8,918,896 B2 | 12/2014 | Murphy et al. |
| 8,925,109 B2 | 12/2014 | Agrawal |
| 8,938,810 B2 | 1/2015 | Richardson et al. |
| 8,948,382 B2 | 2/2015 | Hassan et al. |
| 8,948,391 B2 | 2/2015 | Kritt et al. |
| 8,954,740 B2 | 2/2015 | Moscaritolo |
| 8,958,559 B2 | 2/2015 | Medina et al. |
| 8,996,861 B1 | 3/2015 | Cummings et al. |
| 9,027,114 B2 | 5/2015 | Akhter et al. |
| 9,037,796 B2 | 5/2015 | Nagpal |
| 9,059,840 B2 | 6/2015 | Connelly et al. |
| 9,071,597 B2 | 6/2015 | Lord et al. |
| 9,075,638 B2 | 7/2015 | Barnett et al. |
| 9,077,525 B2 | 7/2015 | Chandran et al. |
| 9,078,127 B2 | 7/2015 | Kritt et al. |
| 9,094,405 B2 | 7/2015 | Buck et al. |
| 9,100,373 B2 | 8/2015 | Deluca et al. |
| 9,124,559 B2 | 9/2015 | Deluca et al. |
| 9,130,822 B2 | 9/2015 | Cooper |
| 9,137,191 B2 | 9/2015 | Firstenberg et al. |
| 9,154,612 B2 | 10/2015 | Moshir et al. |
| 9,197,616 B2 | 11/2015 | Sinha |
| 9,210,143 B2 | 12/2015 | Ozzie |
| 9,224,014 B2 | 12/2015 | Rios |
| 9,225,709 B2 | 12/2015 | Ackerly |
| 9,237,016 B2 | 1/2016 | De Atley et al. |
| 9,264,406 B2 | 2/2016 | Kipnis et al. |
| 9,282,192 B2 | 3/2016 | Laasik et al. |
| 9,288,047 B2 | 3/2016 | Brouwer et al. |
| 9,326,135 B2 | 4/2016 | Rodrigues et al. |
| 9,380,044 B2 | 6/2016 | Zhang et al. |
| 2001/0044901 A1 | 11/2001 | Grawrock |
| 2002/0002468 A1 | 1/2002 | Spagna |
| 2002/0026487 A1 | 2/2002 | Ogilvie et al. |
| 2002/0037736 A1 | 3/2002 | Kawaguchi |
| 2002/0038296 A1 | 3/2002 | Margolus |
| 2002/0038421 A1 | 3/2002 | Hamada |
| 2002/0078380 A1 | 6/2002 | Lin |
| 2002/0094085 A1 | 7/2002 | Roberts |
| 2002/0095465 A1 | 7/2002 | Banks |
| 2002/0154776 A1 | 10/2002 | Sowa |
| 2002/0166053 A1 | 11/2002 | Wilson |
| 2002/0186703 A1 | 12/2002 | West |
| 2003/0021416 A1 | 1/2003 | Brown et al. |
| 2003/0028597 A1 | 2/2003 | Salmi |
| 2003/0037114 A1 | 2/2003 | Nishio |
| 2003/0046533 A1 | 3/2003 | Olkin |
| 2003/0084050 A1 | 5/2003 | Hall |
| 2003/0084347 A1 | 5/2003 | Luzzatto |
| 2003/0126215 A1 | 7/2003 | Udell et al. |
| 2003/0131060 A1 | 7/2003 | Hartselle et al. |
| 2003/0191937 A1 | 10/2003 | Balissat |
| 2003/0204720 A1 | 10/2003 | Schoen |
| 2003/0208686 A1 | 11/2003 | Thummalapally |
| 2003/0217266 A1 | 11/2003 | Epp |
| 2003/0229668 A1 | 12/2003 | Malik |
| 2004/0013113 A1 | 1/2004 | Singh |
| 2004/0054891 A1 | 3/2004 | Hengeveld |
| 2004/0064512 A1 | 4/2004 | Arora |
| 2004/0078568 A1 | 4/2004 | Pham |
| 2004/0107349 A1 | 6/2004 | Sasselli |
| 2004/0111612 A1 | 6/2004 | Choi |
| 2004/0133520 A1 | 7/2004 | Callas et al. |
| 2004/0133775 A1 | 7/2004 | Callas et al. |

(56) References Cited

U.S. PATENT DOCUMENTS

| | | |
|---|---|---|
| 2004/0168055 A1 | 8/2004 | Lord et al. |
| 2004/0205248 A1 | 10/2004 | Little |
| 2004/0210772 A1 | 10/2004 | Hooker et al. |
| 2005/0005106 A1 | 1/2005 | Chen |
| 2005/0044059 A1 | 2/2005 | Samar |
| 2005/0053232 A1 | 3/2005 | Bace |
| 2005/0076061 A1 | 4/2005 | Cox |
| 2005/0086527 A1 | 4/2005 | Jackson |
| 2005/0102528 A1 | 5/2005 | Tan |
| 2005/0125659 A1 | 6/2005 | Sarfati |
| 2005/0149732 A1 | 7/2005 | Freeman |
| 2005/0160292 A1 | 7/2005 | Batthish |
| 2005/0187966 A1 | 8/2005 | Iino |
| 2005/0193199 A1 | 9/2005 | Asokan |
| 2005/0198170 A1 | 9/2005 | LeMay |
| 2005/0229257 A1 | 10/2005 | Kim |
| 2005/0262338 A1 | 11/2005 | Irwin |
| 2005/0273592 A1 | 12/2005 | Pryor |
| 2006/0020796 A1 | 1/2006 | Aura |
| 2006/0031670 A1 | 2/2006 | Price et al. |
| 2006/0036739 A1 | 2/2006 | Hagale et al. |
| 2006/0075234 A1 | 4/2006 | You |
| 2006/0090073 A1 | 4/2006 | Steinberg |
| 2006/0133346 A1 | 6/2006 | Chheda et al. |
| 2006/0147000 A1 | 7/2006 | Novi |
| 2006/0149822 A1 | 7/2006 | Henry et al. |
| 2006/0212928 A1 | 9/2006 | Maino |
| 2006/0288209 A1 | 12/2006 | Vogler |
| 2007/0003065 A1 | 1/2007 | Schwartz et al. |
| 2007/0003066 A1 | 1/2007 | Schwartz et al. |
| 2007/0005713 A1 | 1/2007 | LeVasseur |
| 2007/0011469 A1 | 1/2007 | Allison |
| 2007/0016771 A1 | 1/2007 | Allison |
| 2007/0022469 A1 | 1/2007 | Cooper |
| 2007/0050624 A1 | 3/2007 | Lord et al. |
| 2007/0073823 A1 | 3/2007 | Cohen et al. |
| 2007/0116269 A1 | 5/2007 | Nochta |
| 2007/0199071 A1 | 8/2007 | Callas |
| 2007/0233832 A1 | 10/2007 | Narayanan |
| 2007/0276836 A1 | 11/2007 | Chatterjee |
| 2007/0277240 A1 | 11/2007 | Durfee |
| 2008/0019530 A1 | 1/2008 | Eldridge et al. |
| 2008/0022061 A1 | 1/2008 | Ito et al. |
| 2008/0049941 A1 | 2/2008 | Kim |
| 2008/0065878 A1 | 3/2008 | Hutson |
| 2008/0077686 A1 | 3/2008 | Subhraveti |
| 2008/0091780 A1 | 4/2008 | Balan et al. |
| 2008/0095371 A1 | 4/2008 | Vataja |
| 2008/0098038 A1 | 4/2008 | Motoyama et al. |
| 2008/0162647 A1 | 7/2008 | Liang |
| 2008/0165952 A1 | 7/2008 | Smith |
| 2008/0235336 A1 | 9/2008 | Stern |
| 2008/0281930 A1 | 11/2008 | Hartselle et al. |
| 2009/0052660 A1 | 2/2009 | Chen et al. |
| 2009/0069033 A1 | 3/2009 | Karstens et al. |
| 2009/0070466 A1 | 3/2009 | Elbring |
| 2009/0083112 A1 | 3/2009 | Bhogal |
| 2009/0097662 A1 | 4/2009 | Olechowski |
| 2009/0100268 A1 | 4/2009 | Garcia et al. |
| 2009/0132822 A1 | 5/2009 | Chen |
| 2009/0154705 A1 | 6/2009 | Price et al. |
| 2009/0198997 A1 | 8/2009 | Yeap |
| 2009/0222668 A1 | 9/2009 | Zaccone |
| 2009/0265552 A1 | 10/2009 | Moshir et al. |
| 2009/0281829 A1 | 11/2009 | Hansen et al. |
| 2009/0299200 A1 | 12/2009 | Eggenberger |
| 2010/0002882 A1 | 1/2010 | Rieger et al. |
| 2010/0017602 A1 | 1/2010 | Bussard |
| 2010/0031038 A1 | 2/2010 | Kruegel |
| 2010/0100967 A1 | 4/2010 | Douglas et al. |
| 2010/0138619 A1 | 6/2010 | Benavides |
| 2010/0138934 A1 | 6/2010 | Minoshima |
| 2010/0161817 A1 | 6/2010 | Xiao |
| 2010/0174911 A1 | 7/2010 | Isshiki |
| 2010/0199340 A1 | 8/2010 | Jonas |
| 2010/0211541 A1 | 8/2010 | Deetz et al. |
| 2010/0217984 A1 | 8/2010 | Hill |
| 2010/0223470 A1 | 9/2010 | Lord et al. |
| 2010/0239087 A1 | 9/2010 | Chaisson |
| 2010/0250939 A1 | 9/2010 | Adams |
| 2010/0250946 A1 | 9/2010 | Korte |
| 2010/0262714 A1 | 10/2010 | Hiie |
| 2010/0275007 A1 | 10/2010 | Kutt et al. |
| 2010/0296655 A1 | 11/2010 | Solow |
| 2010/0304766 A1 | 12/2010 | Goyal |
| 2011/0035591 A1 | 2/2011 | Dudziak et al. |
| 2011/0072262 A1* | 3/2011 | Amir ............... G06F 21/52 713/168 |
| 2011/0131406 A1 | 6/2011 | Jones et al. |
| 2011/0145564 A1 | 6/2011 | Moshir et al. |
| 2011/0145571 A1 | 6/2011 | Schmidt-Karaca et al. |
| 2011/0151903 A1 | 6/2011 | Moshir et al. |
| 2011/0173272 A1 | 7/2011 | Carvalho Neto |
| 2011/0202598 A1 | 8/2011 | Evans et al. |
| 2011/0246942 A1 | 10/2011 | Misawa |
| 2011/0307707 A1 | 12/2011 | Fielder |
| 2012/0030183 A1 | 2/2012 | Deetz et al. |
| 2012/0030743 A1 | 2/2012 | Semba |
| 2012/0045064 A1 | 2/2012 | Rembarz |
| 2012/0096035 A1 | 4/2012 | Spector |
| 2012/0098639 A1 | 4/2012 | Ijas |
| 2012/0102326 A1 | 4/2012 | Palekar |
| 2012/0117568 A1 | 5/2012 | Plotkin |
| 2012/0159164 A1 | 6/2012 | Brown et al. |
| 2012/0173353 A1 | 7/2012 | Rausch |
| 2012/0173880 A1 | 7/2012 | Swaminathan |
| 2012/0179905 A1 | 7/2012 | Ackerly |
| 2012/0184309 A1 | 7/2012 | Cohen |
| 2012/0209924 A1 | 8/2012 | Evans et al. |
| 2012/0231770 A1 | 9/2012 | Clarke |
| 2012/0240037 A1 | 9/2012 | Migos et al. |
| 2012/0297451 A1 | 11/2012 | Ozzie |
| 2012/0300331 A1 | 11/2012 | Deetz et al. |
| 2012/0311329 A1 | 12/2012 | Medina et al. |
| 2012/0331073 A1 | 12/2012 | Williams |
| 2013/0034229 A1 | 2/2013 | Sauerwald et al. |
| 2013/0036302 A1 | 2/2013 | Lord et al. |
| 2013/0046828 A1 | 2/2013 | Grewal et al. |
| 2013/0070045 A1 | 3/2013 | Meek |
| 2013/0073850 A1 | 3/2013 | Zaverucha |
| 2013/0077774 A1 | 3/2013 | Lynch, III |
| 2013/0091298 A1 | 4/2013 | Ozzie et al. |
| 2013/0097688 A1 | 4/2013 | Bradley, II et al. |
| 2013/0136255 A1 | 5/2013 | Brown |
| 2013/0138968 A1* | 5/2013 | Yudkin ............... G06F 21/602 713/183 |
| 2013/0159436 A1 | 6/2013 | Hartselle et al. |
| 2013/0194301 A1 | 8/2013 | Robbins et al. |
| 2013/0198522 A1 | 8/2013 | Kohno |
| 2013/0208725 A1 | 8/2013 | Wakumoto |
| 2013/0219035 A1 | 8/2013 | Detienne |
| 2013/0232209 A1 | 9/2013 | Fernandez et al. |
| 2013/0252585 A1 | 9/2013 | Moshir et al. |
| 2013/0254537 A1 | 9/2013 | Bogorad |
| 2013/0275842 A1 | 10/2013 | Peach |
| 2013/0290416 A1 | 10/2013 | Nelson |
| 2013/0304833 A1 | 11/2013 | St. Clair |
| 2013/0305049 A1 | 11/2013 | Krakowski |
| 2013/0305057 A1 | 11/2013 | Greco et al. |
| 2013/0308628 A1 | 11/2013 | Marueli et al. |
| 2013/0326220 A1 | 12/2013 | Connelly |
| 2013/0332724 A1 | 12/2013 | Walters |
| 2013/0339465 A1 | 12/2013 | Zhang |
| 2014/0033286 A1 | 1/2014 | Zhang |
| 2014/0052982 A1 | 2/2014 | Ackerly |
| 2014/0053150 A1 | 2/2014 | Barnett et al. |
| 2014/0068254 A1 | 3/2014 | Scharf |
| 2014/0090042 A1 | 3/2014 | Short |
| 2014/0129785 A1 | 5/2014 | Deetz et al. |
| 2014/0129838 A1 | 5/2014 | Kim |
| 2014/0136842 A1 | 5/2014 | Kitze et al. |
| 2014/0157435 A1 | 6/2014 | Stamos |
| 2014/0162601 A1 | 6/2014 | Kim |
| 2014/0164776 A1 | 6/2014 | Hook |

(56) References Cited

U.S. PATENT DOCUMENTS

| | | |
|---|---|---|
| 2014/0169554 A1 | 6/2014 | Scarisbrick |
| 2014/0181221 A1 | 6/2014 | Kushtagi |
| 2014/0196140 A1 | 7/2014 | Gong |
| 2014/0206285 A1 | 7/2014 | Jance et al. |
| 2014/0207887 A1 | 7/2014 | Hartselle et al. |
| 2014/0207900 A1 | 7/2014 | Liu |
| 2014/0233736 A1 | 8/2014 | Zhang |
| 2014/0258719 A1 | 9/2014 | Cidon |
| 2014/0304508 A1 | 10/2014 | Murphy et al. |
| 2014/0304515 A1 | 10/2014 | Feuerman |
| 2014/0307543 A1 | 10/2014 | Marueli et al. |
| 2014/0325622 A1 | 10/2014 | Luk |
| 2014/0325667 A1 | 10/2014 | Sun |
| 2014/0351586 A1 | 11/2014 | Hook et al. |
| 2014/0373173 A1* | 12/2014 | Baker, II ............... G06Q 30/00 726/27 |
| 2015/0006884 A1 | 1/2015 | Ackerly |
| 2015/0039882 A1 | 2/2015 | Watanabe |
| 2015/0082391 A1 | 3/2015 | Lerman et al. |
| 2015/0106628 A1* | 4/2015 | Holman ............... G06F 21/602 713/189 |
| 2015/0121549 A1 | 4/2015 | Baessler et al. |
| 2015/0143546 A1 | 5/2015 | Bradley, II et al. |
| 2015/0154206 A1 | 6/2015 | Sanjeev et al. |
| 2015/0156177 A1 | 6/2015 | Murphy et al. |
| 2015/0169615 A1 | 6/2015 | Batchu |
| 2015/0169893 A1 | 6/2015 | Desai |
| 2015/0195239 A1 | 7/2015 | Firstenberg et al. |
| 2015/0215291 A1 | 7/2015 | Abdunabi et al. |
| 2015/0227761 A1 | 8/2015 | Cohen |
| 2015/0229612 A1 | 8/2015 | Hassan et al. |
| 2015/0244658 A1 | 8/2015 | Speyer et al. |
| 2015/0244684 A1 | 8/2015 | Ng |
| 2015/0264005 A1 | 9/2015 | Brooks et al. |
| 2015/0264042 A1 | 9/2015 | Lord et al. |
| 2015/0264540 A1 | 9/2015 | Brooks et al. |
| 2015/0271653 A1 | 9/2015 | Brooks et al. |
| 2015/0281185 A1 | 10/2015 | Cooley |
| 2015/0282117 A1 | 10/2015 | Serna Pozuelo |
| 2015/0304849 A1 | 10/2015 | Moon |
| 2015/0312260 A1 | 10/2015 | Kim |
| 2015/0326731 A1 | 11/2015 | Laasik et al. |
| 2015/0332332 A1 | 11/2015 | Darmaki et al. |
| 2015/0347770 A1 | 12/2015 | Whalley |
| 2015/0350036 A1 | 12/2015 | Cooper et al. |
| 2015/0350119 A1 | 12/2015 | Thirumalai et al. |
| 2015/0350247 A1 | 12/2015 | Adler et al. |
| 2015/0350895 A1 | 12/2015 | Brander et al. |
| 2015/0365395 A1 | 12/2015 | Enriquez et al. |
| 2015/0370918 A1 | 12/2015 | Patterson et al. |
| 2015/0373021 A1 | 12/2015 | Tussy et al. |
| 2016/0013939 A1 | 1/2016 | Jun |
| 2016/0034692 A1 | 2/2016 | Singler et al. |
| 2016/0036791 A1 | 2/2016 | Sauerwald et al. |
| 2016/0055325 A1 | 2/2016 | Ozzie |
| 2016/0057156 A1 | 2/2016 | Lin et al. |
| 2016/0063258 A1 | 3/2016 | Ackerly |
| 2016/0065530 A1 | 3/2016 | Prado et al. |
| 2016/0072781 A1 | 3/2016 | Zhang et al. |
| 2016/0191513 A1 | 6/2016 | Tomlinson |

OTHER PUBLICATIONS

Sharma, Mansi; Mishra, Nishchol; Sharma, Sanjeev. Prevention of Traffic Analysis Attack in Friend in the Middle using Dummy Traffic Approach. 2013 IEEE International Conference on Computational Intelligence and Computing Research (ICCIC). http://ieeexplore.ieee.org/stamp/stamp.jsp?arnumber=6724131.*

Author Unknown, "myENIGMA: Whitepaper", Onective AG, 2013.

Author Unknown, "Perfect Forward Secrecy", IBM Security SiteProtector System, http://pic.dhe.ibm.com/infocenter/sprotect/v2r8m0/index.jsp?topic=%2Fcom.ibm.siteprotector.doc%2Freferences%2Fsp_agenthelp_perfect_forward_secrecy.htm.

Author Unknown, "Threema Cyrptography Whitepaper" Threema., Mar. 9, 2015.

B. Kaliski, "PKCS #7: Cryptographic Message Syntax", Version 1.5, Mar. 1998, http://tools.ietf.org/html/rfc2315.

Callas et al., "OpenPGP Message Format", RFC 4880, Nov. 2007.

Cremers et al., "One-round strongly secure key exchange with perfect forward secrecy and deniability", IACR Cryptology ePrint Archive, version 3, 2011.

Diffie et al., "Authentication and authenticated key exchanges", Designs, Codes and Cryptography, vol. 2, Issue 2, pp. 107-125, Jun. 1992.

Lin et al., "An Improvement on Secure E-mail Protocols Providing Perfect Forward Secrecy", JCIS, 2006.

Moscaritolo et al., "Silent Circle Instant Messaging Protocol Protocol Specification", Silent Circle Engineering, Dec. 5, 2012, Version 1.0.

Ms. Smith, "How to easily encrypt email with Virtru for free: Gmail, Hotmail, Outlook, Yahoo", Network World, Jan. 28, 2014.

Pomian & Corella, LLC, "Submission of Prior Art under 37 CFR 1.501 for U.S. Pat. No. 8,625,805", Apr. 18, 2014.

S. Kent, "Privacy Enhancement for Internet Electronic Mail: Part 2: Certificate-Based Key Managment", Feb. 1993, http://tools.ietf.org/html/rfc1422.

Stedman et al., "A User Study of Off-the-Record Messaging", Symposium on Unstable Privacy and Security (SOUPS), Jul. 2008.

Sui et al., "An Improved Authenticated Key Agreement Protocol with Perfect Forward Secrecy for Wireless Mobile Communication", WCNC, pp. 2088-2093, 2005.

Sun et al., Password-based authentication and key distribution protocols with perfect forward secrecy, Journal of Computer and System Sciences 72, pp. 1002-1011, 2006.

Toorani et al.,"SSMS—A Secure SMS Messaging Protocol for the M-Payment Systems", Proceedings of the 13th IEEE Symposium on Computers and Communications, IEEE, Jul. 2008.

Wong et al., "Email Protocols with Perfect Forward Secrecy", Int. J. Security and Networks, vol. 7, No. 1, 2012.

Oikonomidis et al. "Identity Based Protocols for Secure Electronic Content Distribution and Licensing Proceedings of the Fourth International Conference on Web Delivering of Music", WEDELMUSIC 2004. http://ieeexplore.ieee.org/stamp/stamp.jsp?arnumber=1358105.

Pei et al. "An Intelligent Digital Content Protection Framework between Home Network Receiver Devices", 2006 Interational Conference on Computational Intelligence and Security. http://ieeexplore.ieee.org/stamp/stamp.jsp?arnumber=4076116.

Yampolskiy, Roman V. "Mimicry Attack on Strategy-Based Behavioral Biometric", Fifth International Conference on Information Technology: New Generations, 2008. ITNG 2008. http://ieeexplore.ieee.org/stamp/stamp.jsp?arnumber=4492601.

Green et al., "Dancing on the Lip of the Volcano—Chosen Ciphertext Attacks on Apple iMessage" Mar. 21, 2016.

Leach et al. "A Universally Unique Identifier (UUID) URN Namespace", Standards Track, Jul. 2005.

* cited by examiner

SECURING GROUP COMMUNICATIONS

CROSS REFERENCE TO OTHER APPLICATIONS

This application claims priority to U.S. Provisional Patent Application No. 62/090,754 entitled SECURING GROUP COMMUNICATIONS filed Dec. 11, 2014 which is incorporated herein by reference for all purposes.

BACKGROUND OF THE INVENTION

Users of electronic devices increasingly desire to communicate privately and securely with one another. Unfortunately, existing approaches to securing communications can be difficult and/or cumbersome to use. As one example, some approaches to data security make use of digital certificates or keys, or pre-shared passwords, which can be tedious to manage. Further, existing approaches are often susceptible to interception (e.g., eavesdropping and man-in-the middle attacks), forensic analysis, and impersonation. Improvements to digital communication techniques are therefore desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
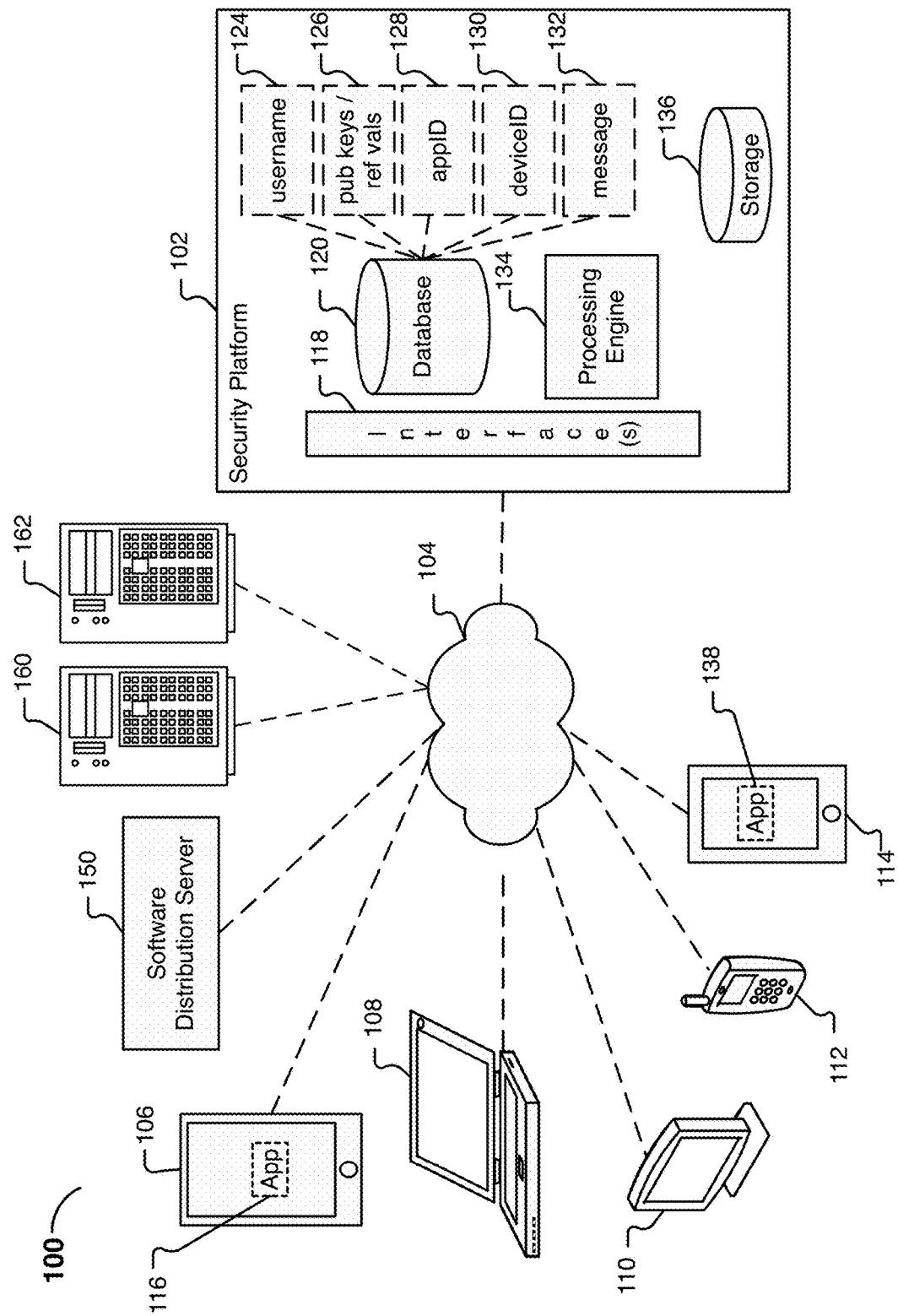
FIG. 1 illustrates an embodiment of an environment in which the exchange of secure communications is facilitated by a security platform.

FIG. 1 illustrates an embodiment of an environment in which the exchange of secure communications is facilitated by a security platform (e.g., security platform 102). In the environment shown in FIG. 1, a "digital security bubble" (DSB), described in more detail below, encapsulates or is otherwise provided around a message. The DSB allows information such as encryption information, hardware binding information, message security controls, and decryption information—for multiple recipients (as applicable)—to securely travel with the message. Further, the DSB provides cross-platform support. For example, techniques described herein can be deployed on a variety of operating systems (e.g., Linux, iOS, and Windows), on a variety of smart phone platforms (e.g., iPhone, Android, Windows, Blackberry, etc.), and on a variety of device types (e.g., mobile smart phones, tablets, laptops, desktops, etc.). Using techniques described herein, only intended accounts on intended devices are able to decrypt the messages. Thus, for example, the security platform is unable to decrypt messages. Users of embodiments of platform 102 (or administrators associated with those users, as applicable) can control who is cable of communicating with them, using privacy lists (described in more detail below, e.g., in Section H). As will further be described in more detail below, using the techniques described herein, message participants can maintain a forward secret secure messaging channel, whether communicating synchronously (e.g., where all participants are online or otherwise able to communicate with platform 102) and asynchronously (e.g., where at least one participant is offline or otherwise not in communication with platform 102).

Users of client devices, such as client devices 106-114 communicate securely with one another using techniques described herein. As shown in FIG. 1, client devices include personal computers (110), laptop computers (108), tablets (106), and mobile telephony devices (112, 114). Some client devices, e.g., tablet device 106, make use of techniques described herein via a messaging application (also referred to as an "app") obtained from a software distribution server 150. Examples of software distribution servers (which can comprise a single server or multiple servers working in cooperation) include app stores (e.g., provided by Apple, Google, Blackberry, Microsoft, Amazon, and/or other entities) and other webservers offering app (and/or other software) downloads. Client devices can also make use of a web interface (e.g., provided by platform 102) instead of or in addition to a dedicated messaging application installed on the device. Other types of devices not depicted in FIG. 1 can also be used in conjunction with the techniques described herein, such as game consoles, camera/video recorders, video players (e.g., incorporating DVD, Blu-ray, Red Laser, Optical, and/or streaming technologies) and other network-connected appliances, as applicable.

Communications are exchanged via one or more networks (depicted collectively in FIG. 1 as network cloud 104). Such networks can include wired, wireless, cellular, and satellite networks. And, such networks can be closed/private networks, as well open networks (e.g., the Internet). Further, as used herein, "communications" and "messages" can take a variety of forms, including: text messages, documents, audiovisual files, SMSes, and voice and video calls. Further, in addition to personal, business, or other types of conversations, the content can pertain to electronic transactions such as credit card security, password protection, directories, and storage drive protection, video on demand security, online gaming, gambling, electronic distribution of music, videos, documents, online learning systems, databases, cloud storage and cloud environments, bank transactions, voting processes, military communications, security of medical records, communication between medically implanted devices and doctors, etc. As will be described in more detail below, the exchange of communications is facilitated by security platform 102 (or embodiments thereof, as applicable).

As will be described in more detail below, platform 102 can be used to facilitate the secure exchange of social networking messages. For example, platform 102 can be used to facilitate the posting of messages (e.g., created by users of platform 102) to social network services 160 (e.g., Facebook) and/or 162 (e.g., Twitter). Other users of platform 102 (that are authorized by the posting author) can securely view the messages, either inline, or as a link redirecting the users to a viewer or other appropriate way to securely view the message content. As applicable, participants of services 160/162 that do not use platform 102 (or are not authorized viewers of the messages, even if users of platform 102) can be shown decoy text/images within services 160/162, such as a picture of a kitten, or default/random text. In various embodiments, users of platform 102 and services 160/162 can continue to post messages (e.g., public messages, or messages otherwise not secured by platform 102) to services 160/162 in the existing manner services 160/162 make information available, and can also optionally interleave secure messages. Thus, a user of both service 160 and platform 102 could continue to make ten typical posts to service 160 using existing tools for service 160, then post a single (or multiple) secure posts with the assistance of platform 102, and then post additional typical messages to service 160 (without using platform 102's security services). As will be described in more detail below, message expiration can be enforced by platform 102 of such social messages, whether as a fixed default applicable to all users (e.g., 24 hours), or a customizable time.

Integration of platform 102 with services 160 and 162 can be done in a variety of ways, including by platform 102 using APIs made available by services 160 and 162, whether by passing messages from an application associated with platform 102 to applications maintained by the operators of services 160 and 162, or by platform 102 (or another appropriate entity) making available a custom application that allows users of the application to post to services 160 and/or 162 (e.g., without requiring the use of or cooperation with any applications made available by services 160/162). In some embodiments, instead of or in addition to integrating with services such as service 160/162, secure social networking/messaging is handled entirely by platform 102 (e.g., with platform 102 providing a standalone social network).

Also as will be described in more detail below, a variety of entities can operate embodiments of platform 102. Further, multiple embodiments of platform 102 can exist simultaneously in an environment (with those multiple embodiments operated by a single entity, or different entities) with the techniques described herein adapted as applicable. For example, platform 102 can be operated by a non-profit organization (or an individual, a company, or any other appropriate type of entity or set of entities) for use by the general public (e.g., with arbitrary members of the public able to use platform 102 to exchange communications). As another example, an enterprise organization can operate an embodiment of platform 102 exclusively for use by the employees of the enterprise (and, as applicable, other individuals, such as vendors). As yet another example, a company (or other entity or entities) can operate one or multiple instances of platform 102 on behalf of multiple organizations, such as small business or companies, schools, charitable organizations, etc.

A. Installation/Initialization/Registration

Suppose a user of client device 106 (hereinafter referred to as "Alice") would like to send a secure message to her friend, Bob (a user of client device 114) in accordance with techniques described herein. In some embodiments, in order to send a message to Bob, Alice first obtains a copy of a messaging application suitable for her device. For example, if Alice's tablet device runs iOS, she could obtain an "app" for her tablet from the Apple App Store (an example of software distribution server 106). Bob similarly obtains an appropriate application suitable for his client device 114 (e.g., an Android-based smartphone) from an appropriate location (e.g., the Google Play store or Amazon Appstore). In some embodiments, client devices make use of a web-based application (e.g., made available by platform 102 through interface 118), instead of, or in addition to, a dedicated installed application.

In embodiments where platform 102 is operated on behalf of specific groups of individuals (e.g., on behalf of employees of a company, students/teachers at a school, company stockholders, members of a club, premium customers, etc.), the app can be obtained from a publicly accessible software distribution server as Alice and Bob do above (e.g., from the Google Play store), can be obtained from a privately operated software distribution server (e.g., made available only to company-issued devices or devices otherwise authorized to communicate with the private server), can be provisioned by support personnel associated with the group (e.g., by being directly installed by the support personnel or included in a device image), etc., as applicable. For example, suppose an embodiment of platform 102 is operated by ACME University on behalf of its students and faculty/staff. As mentioned above, the university can itself operate an embodiment of platform 102, or can contract with a third party to make available the embodiment of platform 102 for university users. Freshmen (and other new students/employees, as applicable) at ACME University can be provided with instructions for downloading and installing an ACME University-specific embodiment of the secure messaging application from a university server in conjunction with their new student orientation. As another example, new employees of Beta Corporation can be issued company phones (and/or other devices such as laptops) with an embodiment of the secure messaging application pre-installed and pre-configured by support personnel for Beta Corporation (e.g., where Beta Corporation operates an embodiment of platform 102 on behalf of its employees and business partners). As yet another example, business partners of Beta Corporation (e.g., vendors) can be provided with instructions for provisioning a Beta Corporation-specific embodiment of the secure messaging application via email, or via a website. And, the Beta Corporation-specific embodiment of the secure messaging application can be made available via email, a website, or any other appropriate mechanism.

Figure 2A:
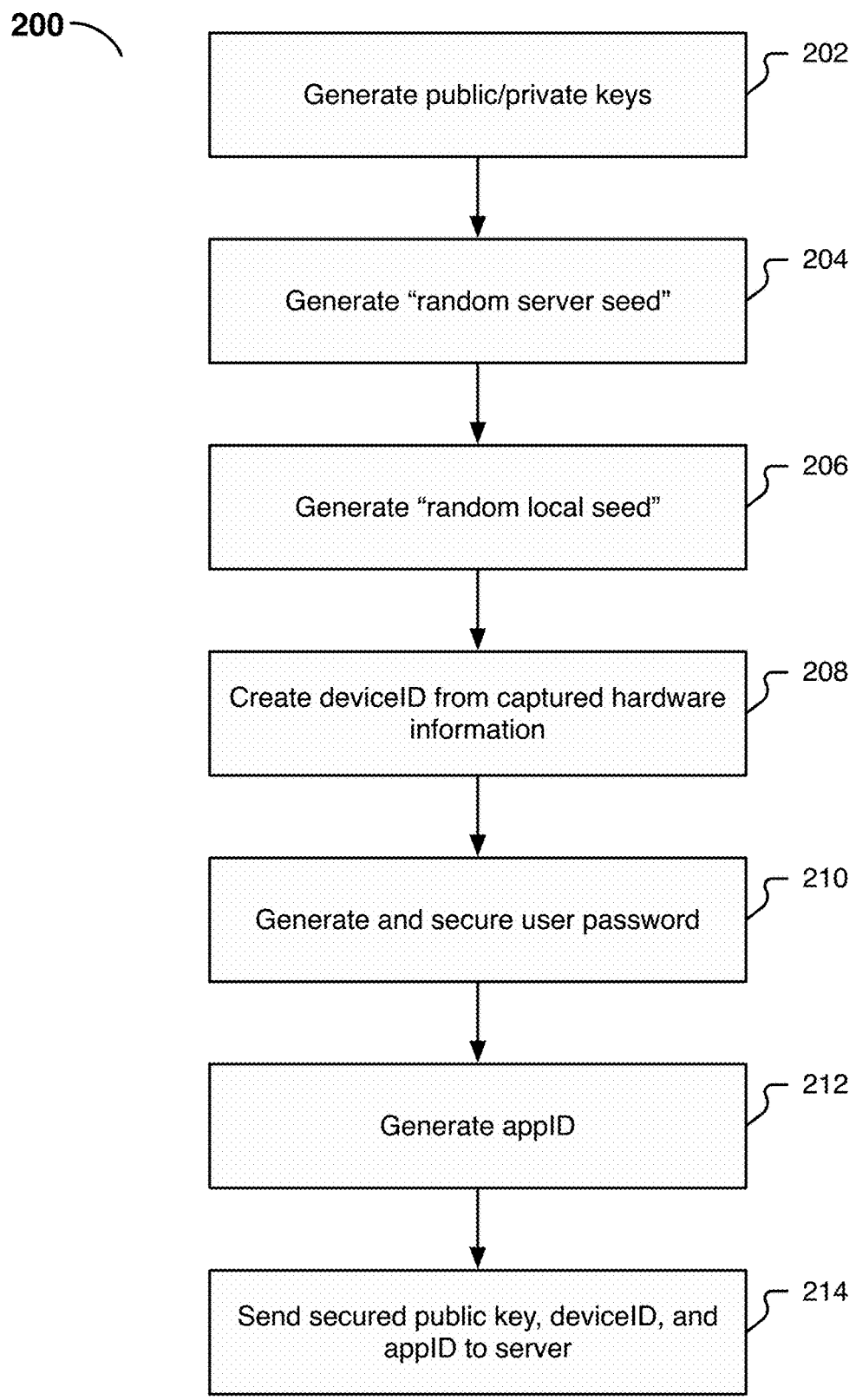
FIG. 2A illustrates an embodiment of an installation and registration process.
Figure 2B:
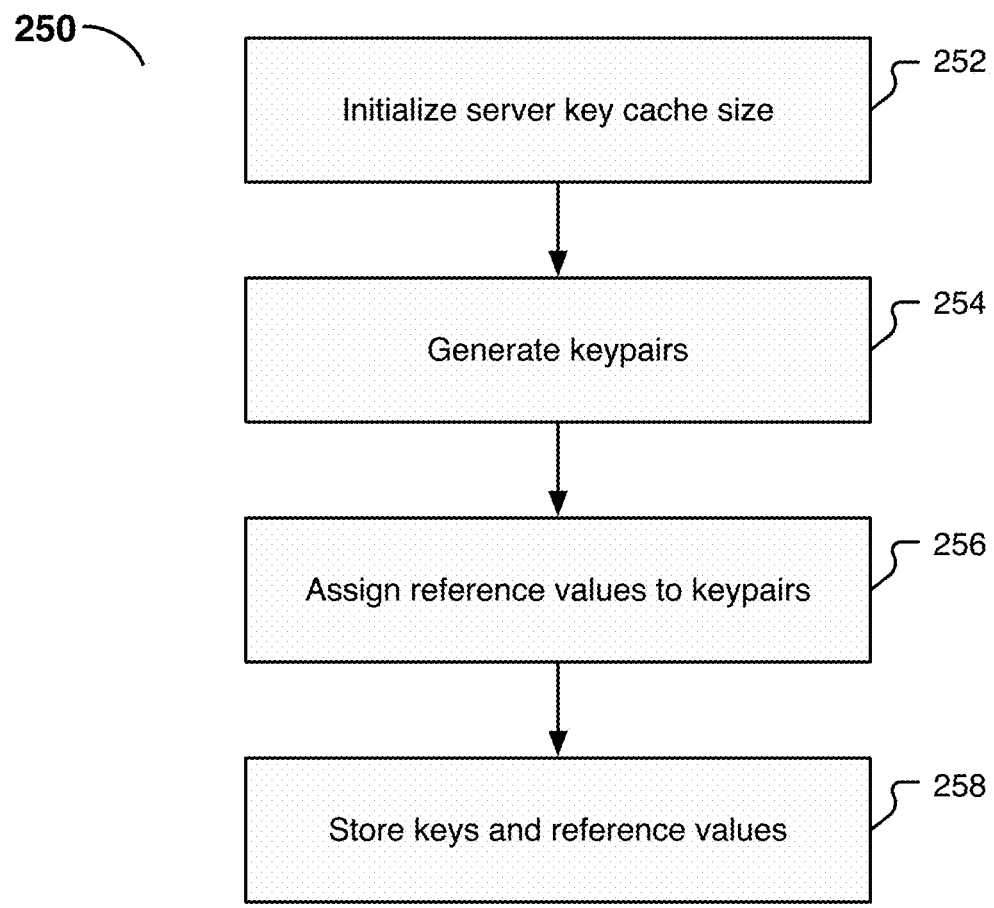
FIG. 2B illustrates an embodiment of a process for generating a pool of keypairs.

Returning to the example of Alice (a member of the public, using an embodiment of platform 102 made available to the public), once Alice's tablet 106 has obtained a copy of the secure messaging app, the app is installed, and Alice is able to register for an account. An instance of a messaging app usable in conjunction with the techniques described herein is depicted in FIG. 1 as app 116 (installed on device 106). Examples of events that can occur during an installation/initialization/registration process (200) are illustrated in FIGS. 2A and 2B and will now be described. While the events will be described in one order, events can also be performed in other orders and/or in parallel (instead of in sequence) in other embodiments. Further, various events can be added or omitted, in some embodiments, as applicable. For example, where an embodiment of platform 102 is made available by an enterprise for use by its employees (or a school on behalf of its student/staff/faculty, etc.), account creation and initialization may at least partially be performed by support personnel (and/or may be performed at least partially in an automated manner based on a new employee/member workflow), instead of being performed by an end user. As a further example, administrators (e.g., in the school or enterprise scenarios) can pre-configure privacy list information (described in more detail below) on behalf of users.

In some embodiments, process 200 is performed on a client device, such as Alice's client device 106. The process begins at 202 when a pool of public/private keypairs for the application is generated, on client device 106 (e.g., using RSA, ECDH, or any other appropriate asymmetric encryption algorithms). As one example, the keypairs can be generated using Eliptic Curve Algorithm with Diffie Helman Key Exchange (ECDH). Other cryptographic standards can also be used, such as RSA. In some embodiments, the keypairs are randomly seeded. As will be described in more detail below, each message Alice sends (whether to Bob or anyone else) can be encrypted with a unique, random key that is used only once then destroyed forensically by Alice (the sender's) device. The forensic destruction ensures that the deleted keys cannot be recovered from Alice's device, even via digital forensics methods.

FIG. 2B illustrates an embodiment of a process for generating a plurality of public/private keypairs. In some embodiments, process 250 is performed on a client device (such as client device 106) as portion 202 of process 200. Process 250 begins at 252 when the pool size associated with the client device is initialized. As one example, a default pool size of fifty keys is received as a parameter from platform 102 by application 116. The pool size can also be encoded into application 116 or otherwise provided to device 106 (e.g., configured via an enterprise administrator, where platform 102 is operated on behalf of an enterprise) without requiring the server to transmit the initial pool size.

As will be explained in more detail below, the pool size associated with a device can be dynamically adjusted, for example, such that a device (e.g., of a heavy user that is frequently offline) that initially has a pool size of 50 keys can have the size adjusted upward to a pool size of 200 keys (or more).

At 254, a pool of keys (i.e., a number of keypairs equal to the size initialized at 252) is generated on client device 106. As mentioned above, the keypairs can be generated using Eliptic Curve Algorithm with Diffie Helman Key Exchange (ECDH). Other cryptographic standards can also be used, such as RSA.

At 256, a reference value is assigned for each of the respective keypairs. As one example, suppose fifty keypairs are generated at portion 254 of process 250. At 256, fifty respective reference values are assigned to each of the respective keypairs. The reference values will be used to distinguish the various keys in the pool of keys from one another and can be assigned to the keypairs in a variety of ways. As one example, a six digit random number can be generated by device 106 as the first reference value for the first keypair, and each subsequent reference value can be selected as an increment of the first reference value. As another example, every reference value can be randomly selected. Other schemes for selecting/assigning reference values can be employed at 256 as applicable.

At 258, the private keys and reference values are stored (e.g., in a secure database residing on device 106). As will be described in more detail below, the corresponding public keys will be transmitted to platform 102 (along with the associated reference values) and platform 102 will designate one of the public keys in the pool as a reserve key.

Returning to FIG. 2A, at 204, a "random server seed" is generated, and at 206, a "random local seed" is generated. The seeds are used in conjunction with cryptographic key generation, and in some embodiments, the seeds are determined based on captured hardware information (described in more detail below).

At 208, a device identifier ("deviceID") is created from captured hardware information. Examples of captured hardware information include: hard drive identifiers, motherboard identifiers, CPU identifiers, and MAC addresses for wireless, LAN, Bluetooth, and optical cards. Combinations of information pertaining to device characteristics, such as RAM, CACHE, controller cards, etc., can also be used to uniquely identify the device. Some, or all, of the captured hardware information is run through a cryptographic hash algorithm such as SHA-256, to create a unique deviceID for the device. The captured hardware information can also be used for other purposes, such as to seed cryptographic functions.

At 210, Alice is asked, via an interface provided by app 116, to supply a desired username. Alice enters "Alice" into the interface. A determination is made as to whether the username is available. As one example, app 116 can supply a cryptographic hash of "Alice" to platform 102 for checking. If platform 102 does not already have a record for that hash, the username "Alice" is available for Alice to use. If platform 102 already has a record of that hash, Alice is instructed by the interface to pick an alternate username. Once Alice has selected an available username, she is asked to supply a password. As mentioned above, in some embodiments, portions of process 200 may be omitted (or performed by other entities, as applicable). For example, where a university student at ACME University is getting set up to use an ACME University-specific embodiment of platform 102, the user's name may be preselected or otherwise issued by the University, rather than being selected by the user.

At 212, an application identifier ("appID") is created. The appID is a unique identifier for the particular installation of the messaging app. If Alice installs the messaging app on multiple devices, each of her devices will have its own unique appID. (And, each of her devices will also have its own unique deviceID.) In some embodiments, the appID is created by hashing Alice's selected password and other information such as device information.

Finally, at 214 Alice's public keys (and reference values), deviceID, and appID are sent to platform 102 in a secure manner. As one example, in some embodiments app 116 is configured to communicate with platform 102 via TLS.

At the conclusion of process 200, Alice is ready to send and receive secure communications.

As mentioned above, alternate versions of processes 200 and/or 250 can be used in accordance with the techniques described herein. As one example, username/password selection (210) can be performed prior to other portions of process 200 (and can be performed by an entity other than the end user of the messaging application, e.g., where an employer determines a username for an employee). As another example, the random server seed generation (204) and random local seed generation (206) can be performed prior to the keypair generation (202), e.g., with the local seed being used in conjunction with the generating of the keypairs. As yet another example, portions of processes 200 and/or 250 can be combined and/or omitted as applicable. For example, instead of generating a pool of fifty key pairs (254), assigning reference values to the pool as a batch operation (256) and storing the keys/values as a batch operation (258), fifty iterations of a process that generates a key pair, assigns a reference value, and stores the information can be performed.

B. Security Platform

As mentioned above, security platform 102 is configured to facilitate the exchange of communications (e.g., among any/all of client devices 106-114). Also as mentioned above, platform 102 can be operated by a variety of entities on behalf of a variety of end users. For example, one embodiment of platform 102 can be made available to members of the public, whether as a public service, or for a fee. As another example, another embodiment of platform 102 can be made available by a business, by a school, by a charitable organization, etc., and its use limited to its employees/students/members, etc., as applicable. Additional detail regarding various aspects of embodiments of platform 102 will now be provided.

Security platform 102 includes one or more interface(s) 118 for communicating with client devices, such as client devices 106-114. As one example, platform 102 provides an application programming interface (API) configured to communicate with apps installed on client devices, such as app 116 and app 138. Platform 102 can also provide other types of interfaces, such as a web interface, or stand alone software programs for desktops and laptops, running on various Operating Systems (OSes). The web interface can allow users of client devices such as client devices 108 and 110 to exchange messages securely (whether with one another or other users), without the need for a separately installed messaging application. The stand alone software program allows users to exchange secure messages via software that is downloaded by each user. As will be discussed in more detail below (e.g., in Section G), in various embodiments, platform 102 makes available (e.g., via one or more interface(s) 118) a master clock time. The master clock time can be used, in various embodiments, to enforce secure time-to-live (TTL) values of messages. The TTL values can be used to enforce (e.g., on behalf of a message sender) time constraints on message access (e.g., by a recipient).

Security platform 102 also includes a database 120. Included in database 120 is a record for each user of platform 102. Each record has associated with it information such as the user's public key pool and associated reference values, deviceID(s), appID(s), privacy mode and privacy list entries, and messages. As shown in FIG. 1, database 120 is relational and stores information in a variety of tables, including a table of hashed usernames (124), a table of public keys and reference values (126), a table of deviceIDs (128), a table of appIDs (130), and a table of messages (132). Other techniques can also be used to store the information used by platform 102. For example, messages can be stored in a separate storage 136 instead of being stored within database 120.

Finally, security platform 102 includes a processing engine 134 which performs a variety of tasks, including interacting with database 120 on behalf of interface(s) 118. As will be described in more detail below, one task performed by platform 102 (e.g., by processing engine 134) is to designate one of the keys in the pool of public keys (e.g., received from Alice at the conclusion of portion 214 of process 200) as a "reserve" key. Another task performed by platform 102 (e.g., processing engine 134) is to facilitate the addition of new keys to a user's key pool as the keys are used. Yet another task performed by platform 102 (e.g., processing engine 134) is to dynamically adjust the size of a user's key pool as needed. Yet another task performed by platform 102, in various embodiments, is confirming whether mutual privacy settings permit a given user to communicate with another user (described in more detail in Section H), and providing keys for communications only where privacy settings permit.

The embodiment of platform 102 depicted in FIG. 1 comprises standard commercially available server hardware (e.g., having a multi-core processor(s), 8G+ of RAM, gigabit network interface adaptor(s), and hard drive(s)) running a typical server-class operating system (e.g., Linux). In various embodiments, platform 102 is implemented across a scalable infrastructure comprising multiple such servers, solid state drives, and/or other applicable high-performance hardware.

Whenever platform 102 is described as performing a task, either a single component or a subset of components or all components of platform 102 may cooperate to perform the task. Similarly, whenever a component of platform 102 is described as performing a task, a subcomponent may perform the task and/or the component may perform the task in conjunction with other components.

C. Sending DSB Secured Messages

Returning back to Alice's desire to send a message to Bob: at the conclusion of Section A above, Alice has successfully registered her username ("Alice") with security platform 102. And, Bob is also a user of platform 102. Suppose Alice would like to send a message to Bob. She starts app 116 and is presented with an interface that includes a "compose" option. Alice selects the compose option and is presented with a message composition interface.

Figure 3:
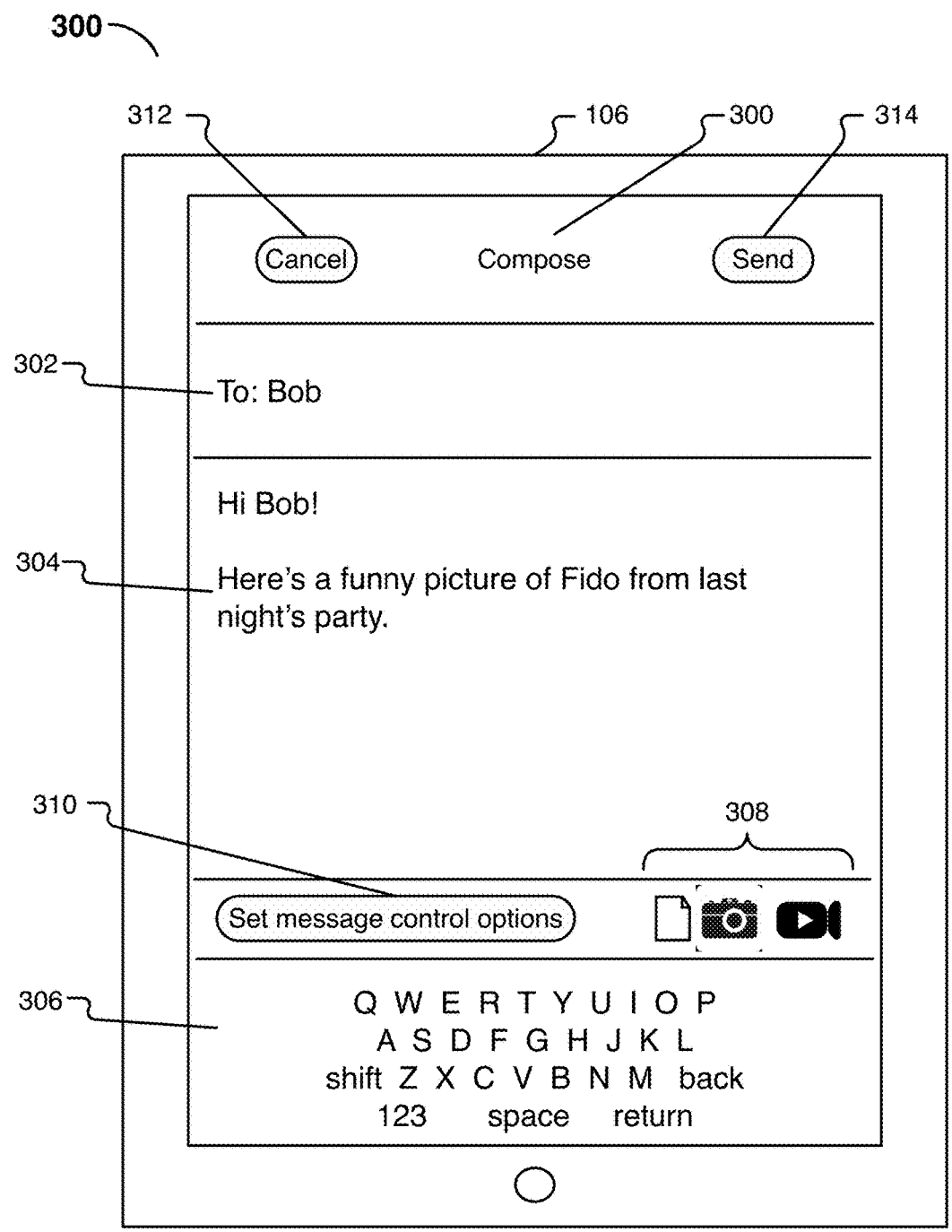
FIG. 3 illustrates an example of an interface.

An example message composition interface is shown in FIG. 3. In particular, FIG. 3 depicts interface 300 as rendered on an example tablet device 106, connected to the Internet via an appropriate connection, such as: 3G, 4G or higher cellular connection, WiFi, satellite, wireless or wired LANs, Bluetooth, etc. Tablet device 106 includes a touchscreen. An on-screen keyboard is provided for Alice in region 306. Alice can enter the usernames of one or more recipients in region 302. As will be described in more detail below (e.g., in Section H), in some embodiments, any names that Alice enters into region 302 are checked against Alice's privacy list (and the privacy lists of the recipients) to confirm that privacy settings allow Alice to message the recipient(s). She can enter message text in region 304. Alice can optionally add attachments by interacting with buttons shown in region 308. Examples of attachments include, but are not limited to: documents, pictures, and audiovisual clips. By selecting button 310, Alice can specify various message control options, such as: the lifetime/expiration of the message (the enforcement of which is described in more detail below in Section G); on which device(s) it can be unencrypted/read; and sharing, saving, forwarding, recalling, and deleting options.

If Alice is satisfied with her message, she can send it to Bob by clicking the send button (314). If she wishes to cancel out of composing the message, she can click the cancel button (312). Suppose Alice clicks send button (314) after composing the message shown in interface 300. An example of the events that occur, in some embodiments, in conjunction with Alice sending a message is illustrated as process 400 in FIG. 4 and will now be described.

Figure 4:
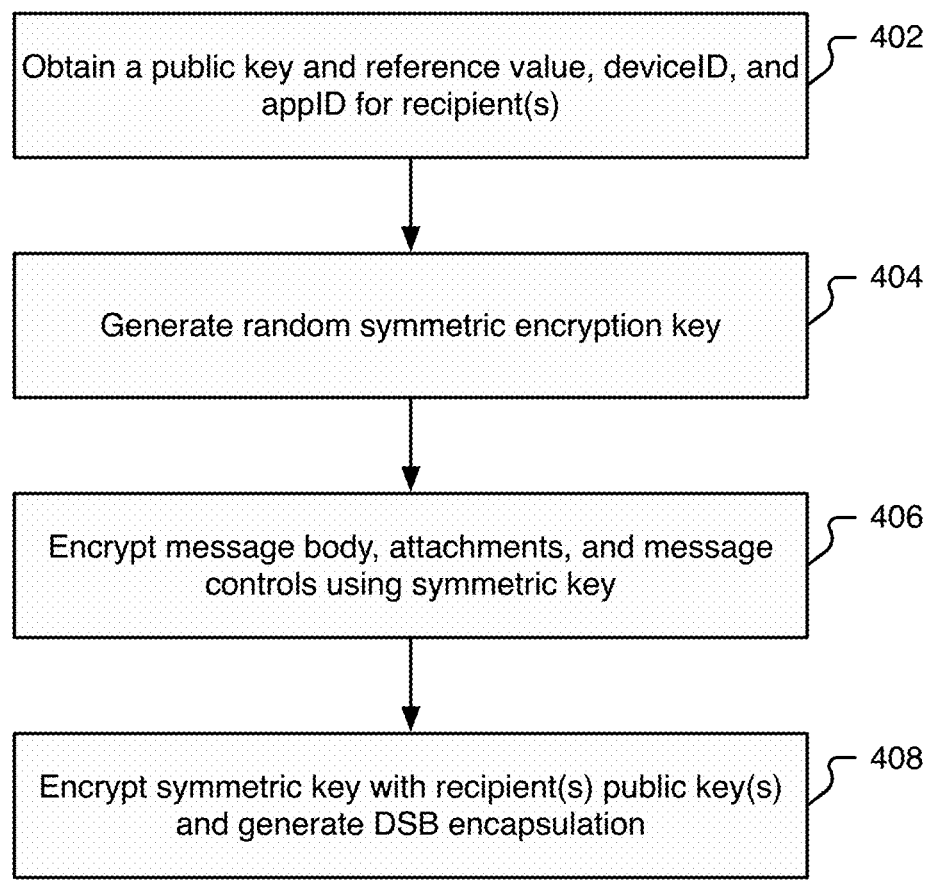
FIG. 4 illustrates an example of a message sending process.

FIG. 4 illustrates an example of a process for sending a DSB-secured message. In some embodiments, process 400 is performed on a client device, such as Alice's client device 106. The process begins at 402 when a particular public key (from the user's pool of public keys) and associated reference value, deviceID, and appID of a recipient are obtained from platform 102. As will be described in more detail below (e.g., in Section H), in some embodiments, the recipient's public key is only obtained after platform 102 confirms that the sending of a message by the sender to the recipient is mutually permitted after checking one or more privacy lists. The recipient's particular public key, deviceID and appID are used in the encryption of the symmetric key used to encrypt data, and in the DSB encapsulation of the message for the hardware/appID binding of the message. As one example, app 116 can request the information from platform 102 via an API (e.g., interface 118). In some embodiments, the information is retrieved when Alice enters the recipient's name into region 302. In other embodiments, the information is retrieved when Alice clicks send button 314, or at any other appropriate time (e.g., while she is composing a message). In the example shown in FIG. 3, Alice is only sending a message to Bob. If she also desires to send the message to other recipients, she can enter their names in region 302 as well, and one of their respective public keys (again selected from their respective pools of public keys) and associated reference values, deviceIDs, and appIDs will also be retrieved at 402 (after any applicable privacy checks have been performed).

At 404, a random symmetric encryption key is generated (e.g., by app 116 on device 106). As one example, the symmetric key is an AES 256 bit key. At 406, the symmetric encryption key is used to encrypt the message body, any attachments, and any message control options. In some embodiments, Alice's own information (e.g., public key(s) and associated reference value(s), deviceID(s), and appID(s) are included in the DSB as well. Finally, at 408, the symmetric key is encrypted with the particular public key of each recipient (obtained from the pool of public keys). A DSB encapsulation is then generated, and contains the aforementioned components and reference values of the public keys used to encrypt the symmetric key. Examples of the DSB format are provided in Section D below.

In some cases, a user may own multiple devices. For example, Bob may be the owner of device 114 and 112, both of which are configured with secure messaging apps. Each of Bob's installations will have its own deviceID and appID. When the DSB is created, each of Bob's devices will be considered a separate device under the same username account.

The generated DSB is securely transmitted to platform 102 (e.g., by being encrypted with a symmetric key shared by the app and platform 102, and also encapsulated by TLS as an additional security layer). Irrespective of how many recipients Alice designates for her message (and, e.g., how many recipients there are or how many devices Bob has), only one DSB will be created and transmitted to platform 102. Upon receipt of the DSB, processing engine 134 opens the DSB and determines the recipients of the message. Specifically, the processing engine 134 performs a match against the deviceIDs (in a cryptographic hash and camouflaged representation) included in the DSB and the deviceIDs stored in database 120 as well as the username (in a cryptographic hash and camouflaged representation) in the DSB and the ones stored in the database 120. A cryptographic hash and camouflaged representation means that the hash algorithm (i.e. SHA256) that is used for the deviceID, username, and appID values, is further camouflaged, in some embodiments, by taking multiple hashes of the result values (i.e. multiple rounds of SHA256 of the previous SHA256 value—i.e. SHA(SHA(SHA(SHA . . . ))). Processing engine 134 also creates an entry for the received DSB in message table 132 and notifies the recipient(s) that a new message is available. In various embodiments, other actions are also performed by platform 102 with respect to the DSB. As one example, platform 102 can be configured to remove the DSB as soon as the recipient successfully downloads it. As another example, platform 102 can enforce an expiration time (e.g., seven days) by which, if the DSB has not been accessed by the recipient, the DSB is deleted. Where multiple recipients are included in a DSB, platform 102 can be configured to keep track of which recipients have downloaded a copy of the DSB, and remove it once all recipients have successfully downloaded it (or an expiration event has occurred).

D. DSB Examples

Figure 5:
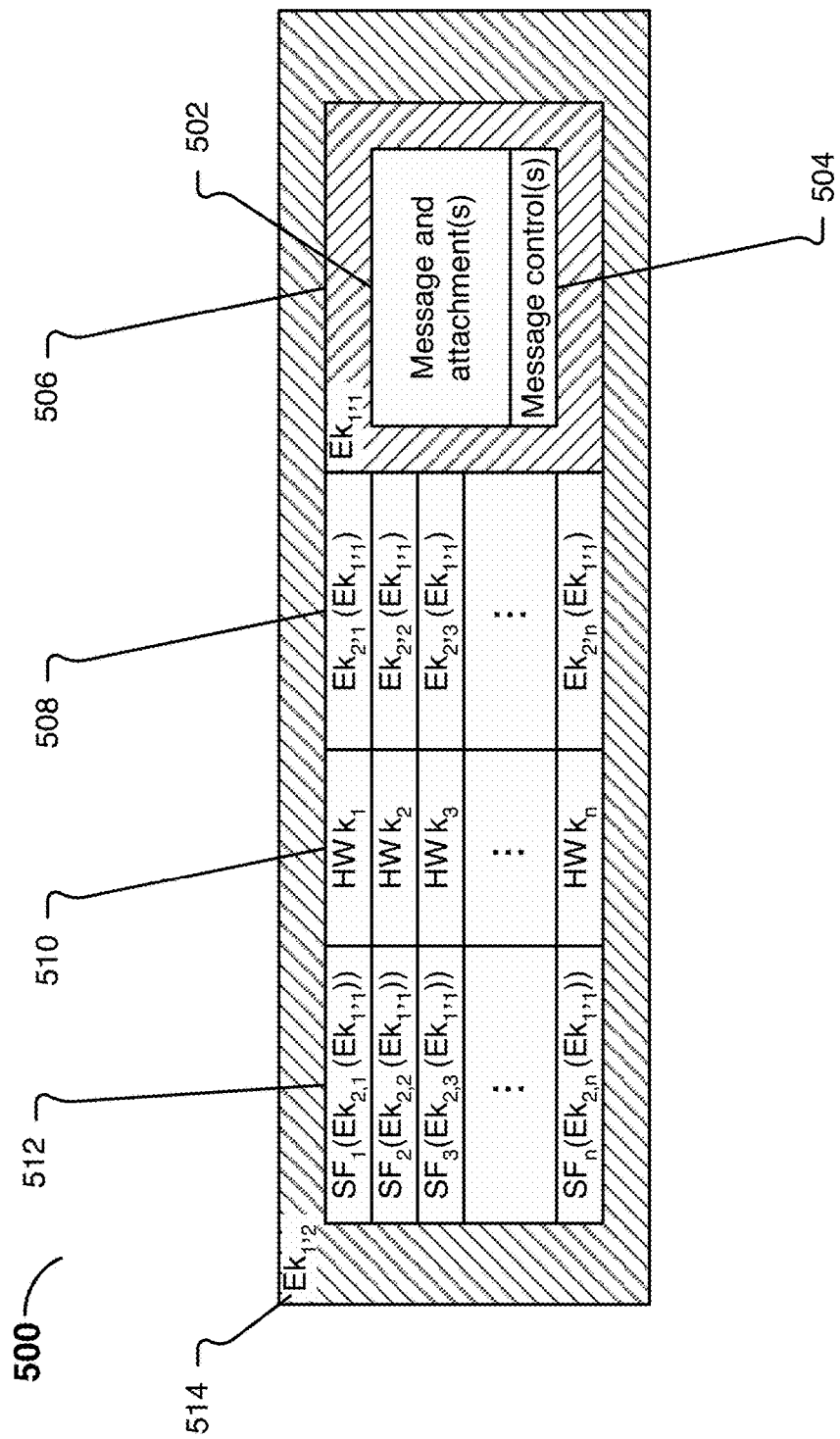
FIG. 5 illustrates an example of a digital security bubble.

FIG. 5 illustrates an example of a digital security bubble (DSB). DSB 500 is an example of output that can be generated by app 116 as a result of executing process 400. In the example shown, DSB 500 includes a message and optional attachments (502), and one or more message controls (504) encrypted with a key $Ek_{1,1}$ (encrypted portion 506). In some embodiments, key $Ek_{1,1}$ is generated by app 116 at portion 404 of process 400. Additional detail regarding portion 506 is shown in FIG. 7, where SSK in FIG. 7 is $Ek_{1,1}$ of FIG. 5 and represents the sender's symmetric shared key used to encrypt the message and attachments.

DSB 500 also includes, for each message recipient 1-n, the key $Ek_{1,1}$ encrypted by each of the recipient's respective particular public keys (as shown in region 508). Further, DSB 500 includes a combination of each recipient's respective deviceID, hashed username, appID, and the reference value associated with the particular public key (collectively denoted $HWk_{1-n}$) in region 510. These constituent parts are also referred to herein as "parameters." Additional detail regarding the parameters is shown in FIG. 9—namely, a plurality of parameters (such as hashed username, deviceID, and appID) are encrypted using SK2, which is a symmetric key generated by the client and shared with platform 102.

In some embodiments (e.g., as is shown in FIG. 5), a spreading function is used to spread the encrypted symmetric keys inside the DSB (as shown in region 512), by spreading the bits of the encrypted key in a spreading function generated pattern, with the default function being a sequential block or data. The spreading function also contains the cryptographic hashed representation of the recipient usernames that are used by the server to identify the recipients of the message and to set the message waiting flag for each of them. Finally, the DSB is itself encrypted using key $Ek_{1,2}$ (encrypted portion 514), which is a symmetric key shared between app 116 and platform 102. Additional detail regarding portions 514 and 508 are shown in FIG. 8, where SK1 in FIG. 8 is Ek1,2 in FIG. 5 and represents the symmetric encryption key shared by the app and platform 102, and where User1Pubkey in FIG. 8 is $Ek_{2,1}$ in FIG. 5 and represents the recipient's particular public key (e.g., selected from the pool of public keys generated at 202).

Figure 6:
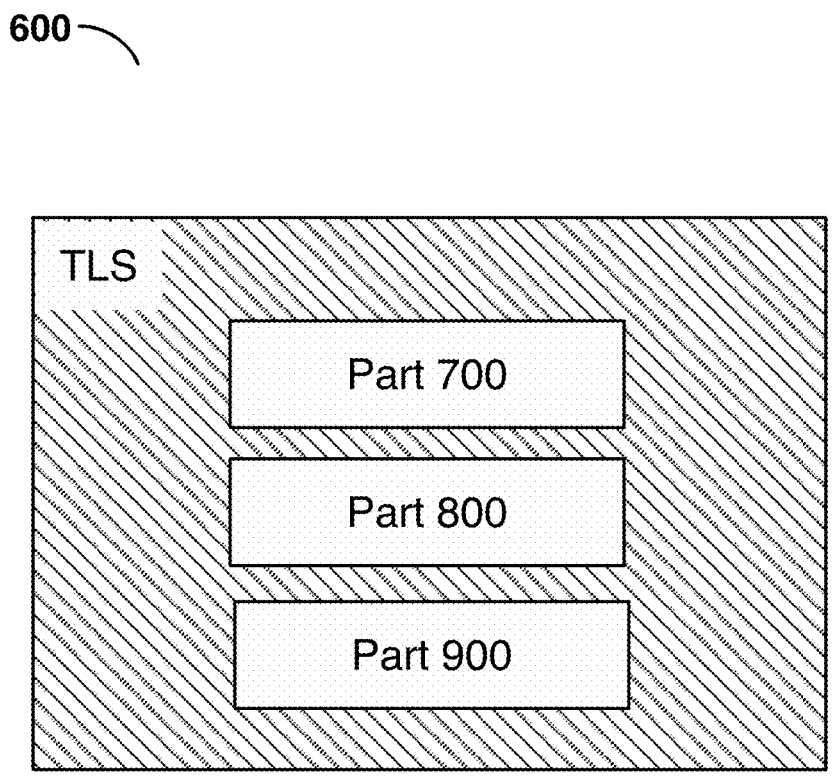
FIG. 6 illustrates an example of a digital security bubble.
Figure 7:
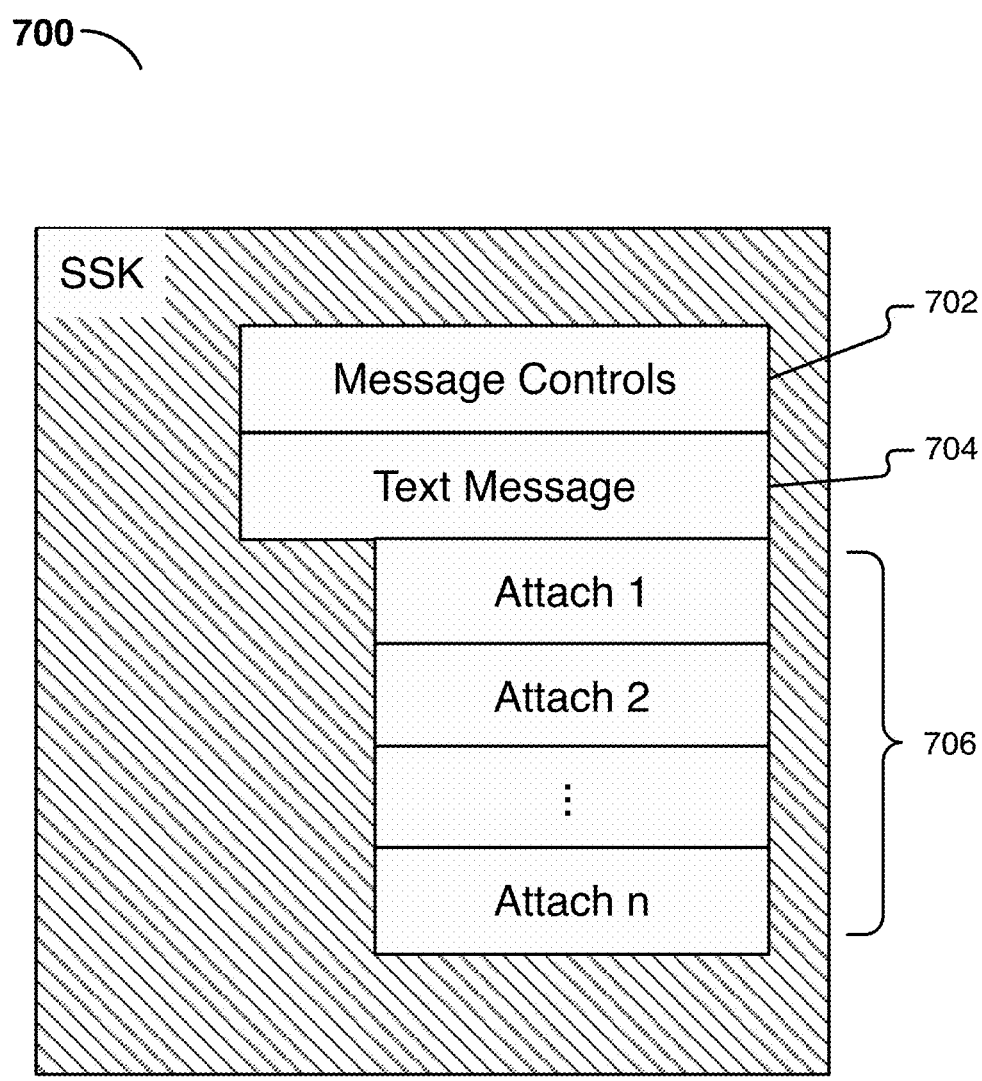
FIG. 7 illustrates an example of a portion of a digital security bubble.
Figure 8:
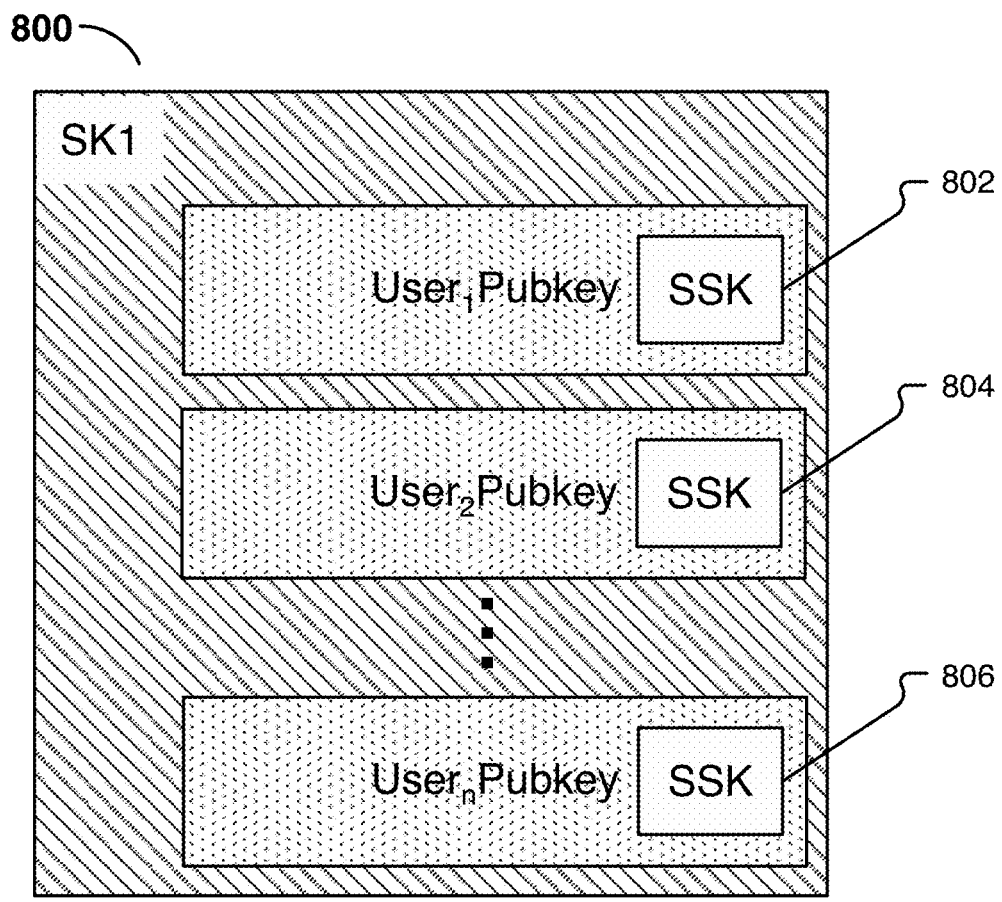
FIG. 8 illustrates an example of a portion of a digital security bubble.
Figure 9:
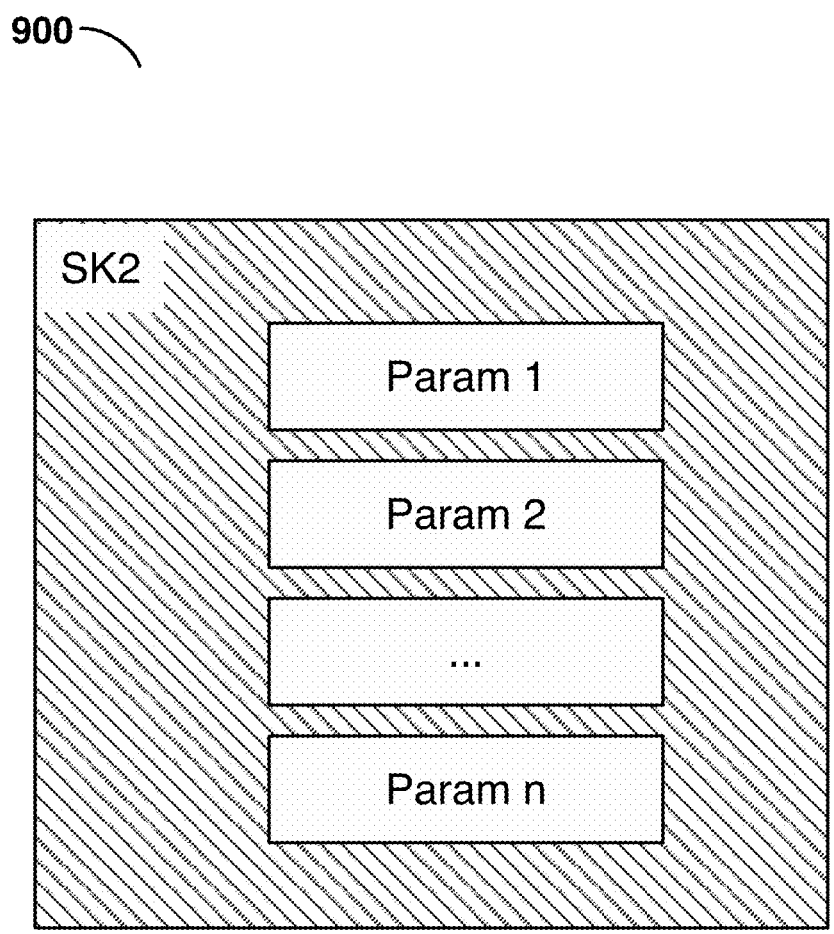
FIG. 9 illustrates an example of a portion of a digital security bubble.

FIGS. 6-9 illustrate additional examples of the construction of an embodiment of a DSB. FIG. 6 illustrates an example of a DSB 600. DSB 600 encapsulates three subcomponents—part 700 (the encrypted message, attachments, and message controls), part 800 (the symmetric key encrypted with each recipient's particular public key selected from the recipients' respective key pools), and part 900 (encrypted message parameters). As with DSB 500, a symmetric key (shared by app 116 and platform 102) is used to secure the DSB. In addition, the transmission of the DSB to the server is encapsulated with TLS for an additional security layer. FIG. 7 illustrates part 700 of DSB 600. In particular, part 700 includes the message controls (702), message (704), and attachments (706). Part 700 is encrypted using a shared symmetric key SSK (e.g., $Ek_{1,1}$). FIG. 8 illustrates part 800 of DSB 600. In particular, part 800 includes the shared symmetric key, encrypted to each of the recipients' respective particular public keys (selected from the recipients' respective key pools). Further, the collection of encrypted keys (802-806) is encrypted using symmetric key SK1. FIG. 9 illustrates part 900 of DSB 600. In particular, part 900 includes encrypted message parameters. Part 900 is encrypted using symmetric key SK2.

E. Receiving DSB Secured Messages

As mentioned above, Bob is also a user of platform 102. When Bob loads his copy of the messaging app on his smartphone (i.e., app 138 on device 114), the app communicates with platform 102 (e.g., via interface 118) to determine whether Bob has any new messages. As will be described in more detail below, platform 102 will also determine how many additional keypairs Bob's device should generate to replenish his pool, and facilitate the generation of those keypairs. Since Alice has sent a message to Bob since he last used app 138, a flag is set in database 120, indicating to app 138 that one or messages are available for download.

Figure 10:
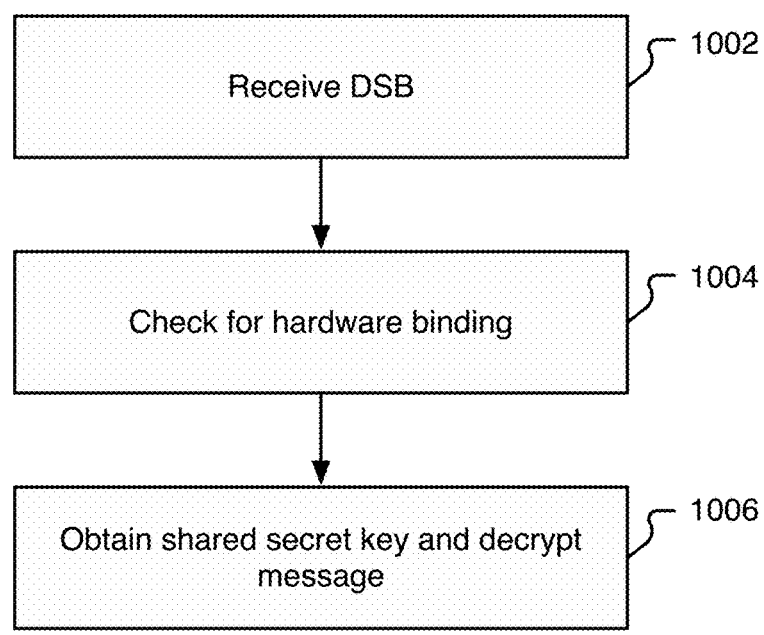
FIG. 10 illustrates an example of a process for accessing a message included inside a digital security bubble.

FIG. 10 illustrates an example of a process for accessing a message included inside a digital security bubble. In some embodiments, process 1000 is performed on a client device, such as Bob's client device 114. The process begins at 1002 when a DSB is received. As one example, a DSB is received at 1002 when app 138 contacts platform 102, determines a flag associated with Bob's account has been set (e.g., indicating he has one or more new messages), and downloads the DSB from platform 102. In such circumstances, upon receipt of the DSB, client 114 is configured to decrypt the DSB using the particular private key of Bob that corresponds to the public key that was selected from his pool at message creation time (and is identifiable by the reference value included in the DSB).

At 1004 (i.e., assuming the decryption was successful), hardware binding parameters are checked. As one example, a determination is made as to whether device information (i.e., collected from device 114) can be used to construct an identical hash to the one included in the received DSB. If the hardware binding parameters fail the check (i.e., an attempt is being made to access Alice's message using Bob's keys on a device that is not Bob's), contents of the DSB will be inaccessible, preventing the decryption of Alice's message. If the hardware binding parameter check is successful, the device is authorized to decrypt the symmetric key (i.e., using Bob's private key generated at 202) which can in turn be used to decrypt Alice's message (1006). As will be described in more detail below (e.g., in Section G), additional controls can be applied (e.g., by Bob's app 138) to Bob's ability to access Alice's message.

F. Additional Example Processes

The following are examples of processes that can be performed by various entities present in environment 100, such as platform 102 and devices 106 and 114 in various embodiments (whether as alternate versions of or additional processes to those described above). The processes can also be performed outside of environment 100, e.g., by other types of platforms and/or devices.

Figure 11:
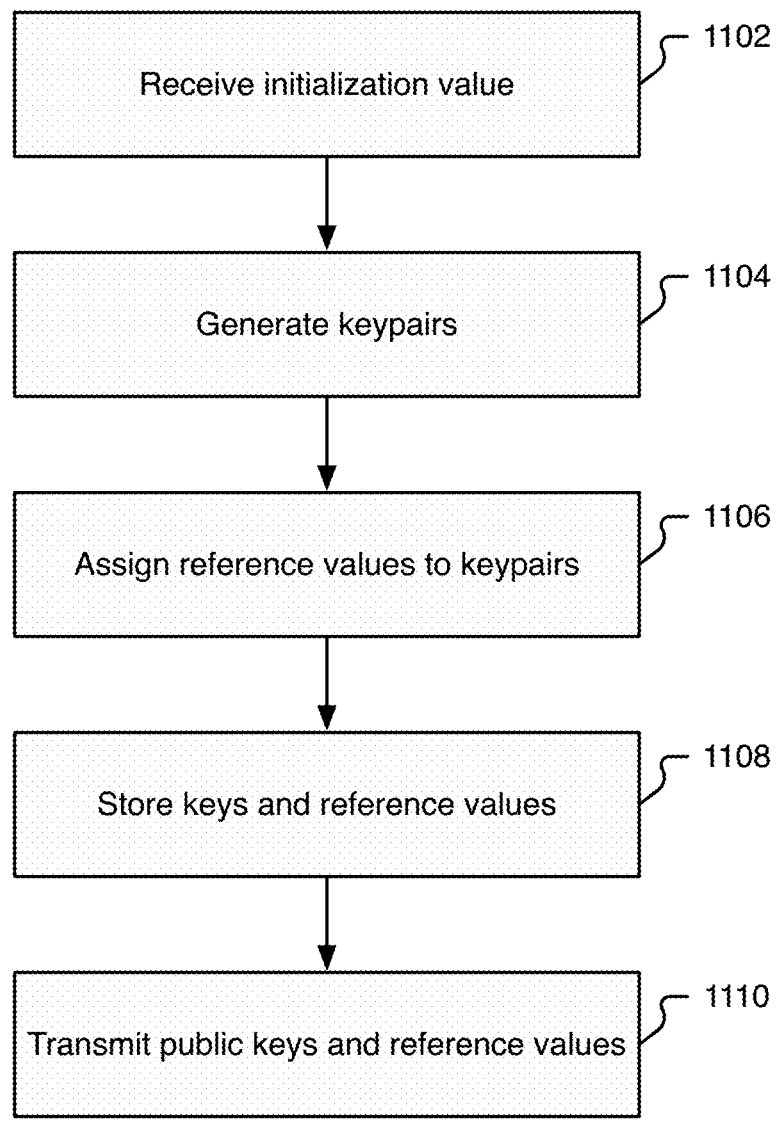
FIG. 11 illustrates an example of a registration process.

FIG. 11 illustrates an example of a registration process. In some embodiments, process 1100 is performed by device 106. Process 1100 can also be performed by other devices, including devices in environments other than those shown in FIG. 1. Process 1100 begins at 1102 when an initialization value is received. As one example, an initialization value of 50 (corresponding to a target minimum server key cache size of fifty public keys to be stored on platform 102) is received at 1102. In some embodiments, in response to receiving a request from a device, such as device 106, platform 102 sets a server count (C)=0. The server count represents the number of public keys currently stored on platform 102 associated with the device. As device 106 is registering, no keys are present yet on platform 102.

At 1104, a number of keypairs is generated. In this example, a number of asymmetric keypairs equal to the initialization value received at 1102 (e.g., fifty) is generated. In some embodiments, the keypairs are randomly seeded.

At 1106, reference values (e.g., usable to uniquely identify each of the key pairs and described in more detail above) are assigned for each of the keypairs generated at 1104.

At 1108, the private key portion of the key pairs (i.e., the fifty private keys) and associated reference values are securely stored locally (e.g., on device 106). As one example, the private keys are inserted into a database resident on device 106 and secured using an AES key derived from the password selected by Alice at portion 210 in process 200.

Finally, at 1110, the public key portion of the key pairs (i.e., the fifty public keys) and associated reference values are securely transmitted to platform 102. As mentioned above, platform 102 will designate one of the fifty keys as a reserve key (e.g., by setting a flag associated with that particular key).

Figure 12:
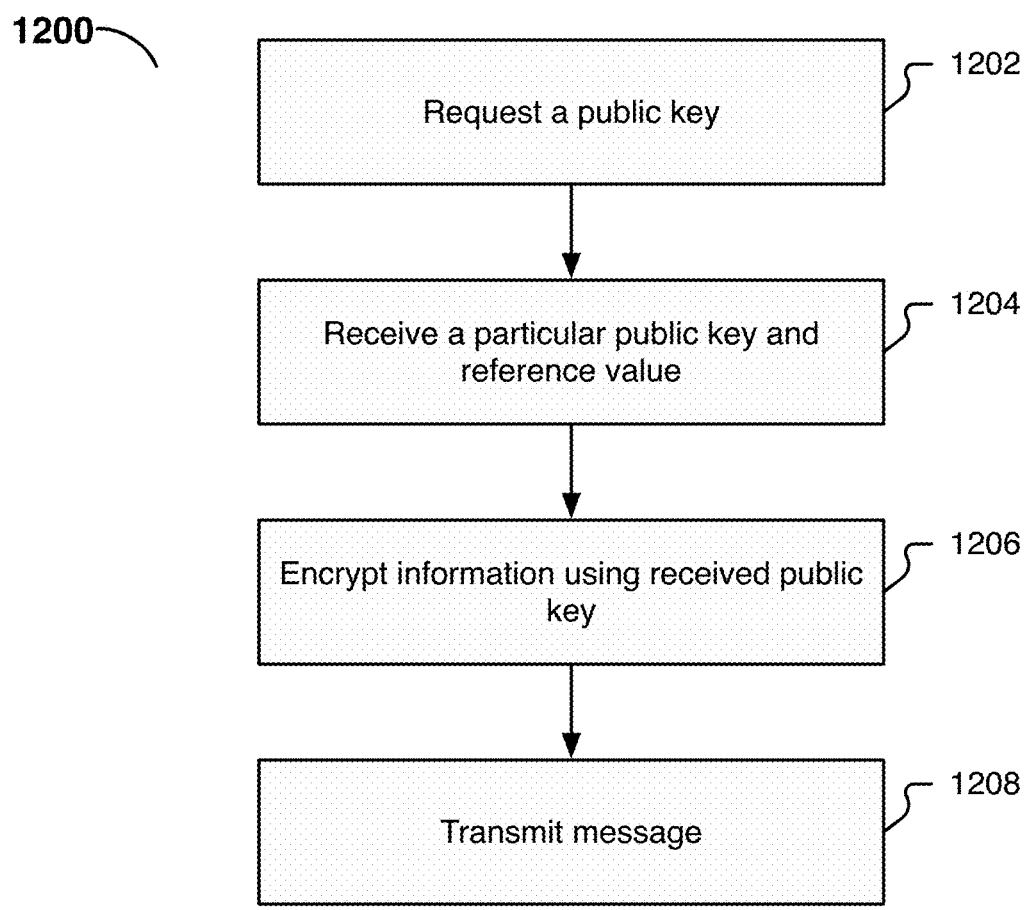
FIG. 12 illustrates an example of a process for sending a message.

FIG. 12 illustrates an example of a process for sending a message. In some embodiments, process 1200 is performed by device 114 (e.g., when Bob wants to send a message to Alice). Process 1200 begins at 1202 when device 114 requests a public key associated with Alice from platform 102 (and after any applicable privacy checks have been performed). If multiple public keys for Alice are present in her pool of keys (i.e., the pool of public keys stored on platform 102 for Alice), the platform will preferentially select (whether randomly, sequentially, or by any other appropriate selection technique) one of the non-reserve keys, and delete the selected key in an atomic operation in conjunction with sending the selected key to device 114. As will be described in more detail below, if only one public key is present for Alice (i.e., only the reserve key remains in the pool), platform 102 will send the reserve key to device 114, but will not delete the reserve key from platform 102 (until such time as the reserve key is replaced with a new key designated as the reserve).

At 1204, a public key is received (e.g., by device 114 from platform 102) along with the reference value associated with the key.

At 1206, the received public key is used to encrypt information, such as a message, or other information (e.g., a symmetric key which in turn is used to encrypt the message). The key reference value associated with the received public key is included in the message metadata or otherwise incorporated into the message payload.

Finally, at 1208, device 114 sends the message (e.g., to platform 102 for retrieval by Alice). Note that using techniques described, Alice's device(s) need not be online (e.g., connected to platform 102) at the time Bob composes and/or sends messages to her.

Figure 13:
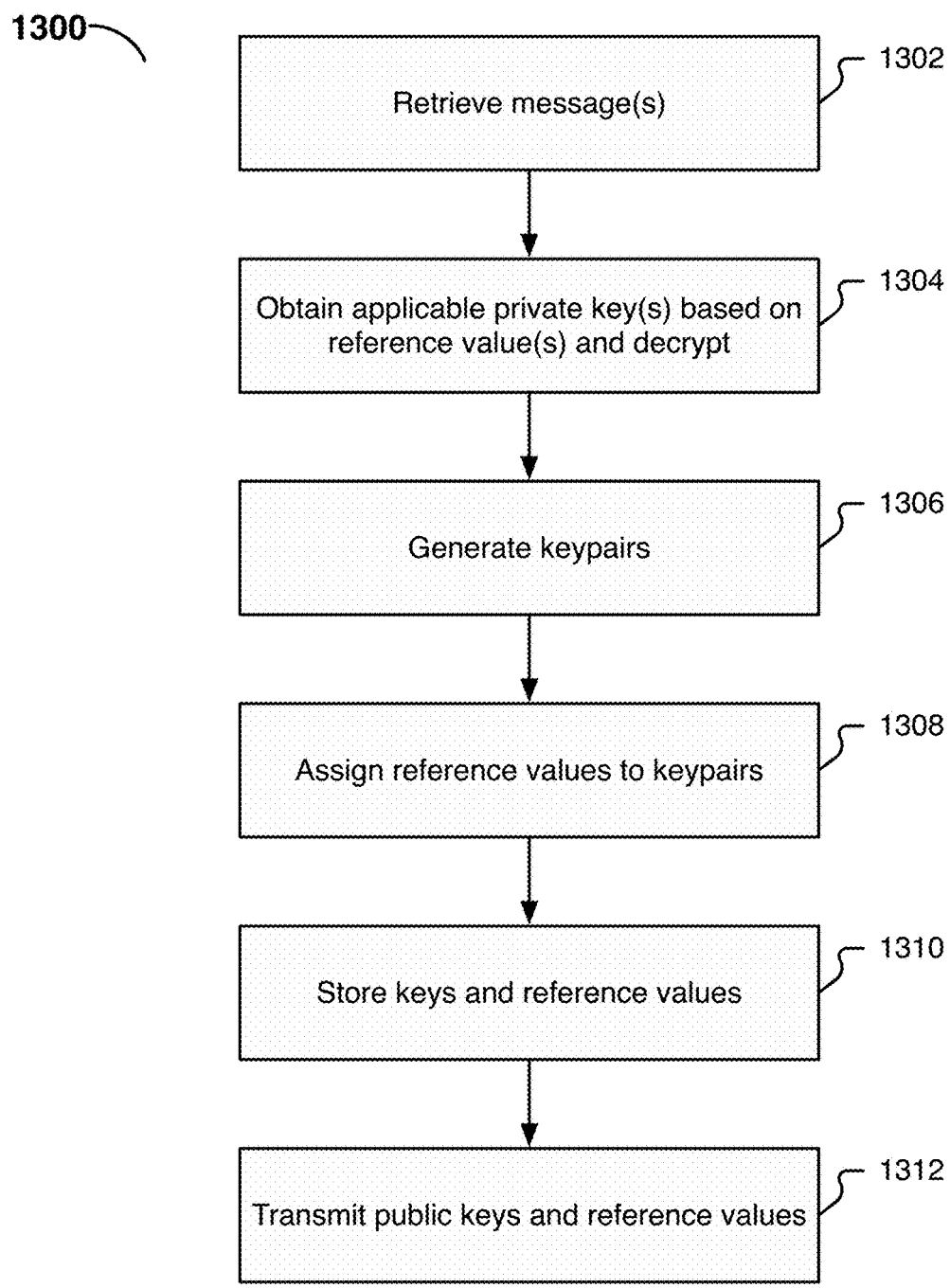
FIG. 13 illustrates an example of a process for performing a synchronous key cache update.

FIG. 13 illustrates an example of a process for performing a synchronous key cache update. In some embodiments, process 1300 is performed by device 106 (e.g., when Alice connects to platform 102 to retrieve messages). The process begins at 1302 when device 106 connects to platform 102 and retrieves one or more messages.

For each retrieved message (at 1304), read the respective key reference value (e.g., included in the respective message as metadata), retrieve the appropriate private key (i.e., having the key reference value) from local storage on device 106, and decrypt the message(s).

At 1306, device 106 generates additional keypairs (i.e., to replenish public keys used from the pool on platform 102 by Bob). The number of keys to be generated can be determined in a variety of ways. As one example, device 106 can generate a number of new keypairs equal to the number of messages she received at 1302. As another example, device 106 can be instructed (whether by platform 102 or local instructions) to generate the lesser of: A: (the number of messages downloaded at 1302 * V), where (V) is a variable impacting the desired expansion rate of the server cache size (e.g. 0.9); or B: the initialization value (e.g., 50 keys, as discussed at 1102 in process 1100).

At 1308 (similar to 1106), reference values (e.g., usable to uniquely identify each of the key pairs and described in more detail above) are assigned for each of the keypairs generated at 1308.

At 1310 (similar to 1108), the private key portion of the key pairs (i.e., the new private keys) and associated reference values are securely stored locally (e.g., on device 106). As one example, the private keys are inserted into a database resident on device 106 and secured using the password selected by Alice at 210 in process 200.

Finally, at 1312 (similar to 1110), the public key portion of the key pairs (i.e., the new public keys) and associated reference values are securely transmitted to platform 102. In this example, suppose Alice's reserve key was not depleted. The key originally designated as her reserve key remains present on platform 102 and remains designated as the reserve key. —Now suppose Alice's reserve key was depleted (e.g., because Bob and/or other users of platform 102 sent Alice more than fifty messages prior to her connecting to platform 102). The first 49 messages addressed to Alice would make use of those public keys in her pool not designated as the reserve key. Any additional messages sent to Alice before she can replenish her pool will all make use of her reserve public key (i.e., messages 50, 51, and 52—whether from Bob or others, will all make use of the same public key for Alice—her reserve key). As will be explained below, when Alice's pool has been deleted (i.e., her reserve key is being used), a flag will be set on platform 102 indicating that, in conjunction with her next execution of process 1300 (or portions thereof, as applicable), a new key should be designated as the reserve key, and the existing reserve key be destroyed. Additional actions can also be taken (e.g., by platform 102) in response to Alice depleting her key pool, such as by increasing the size of her pool.

Figure 14:
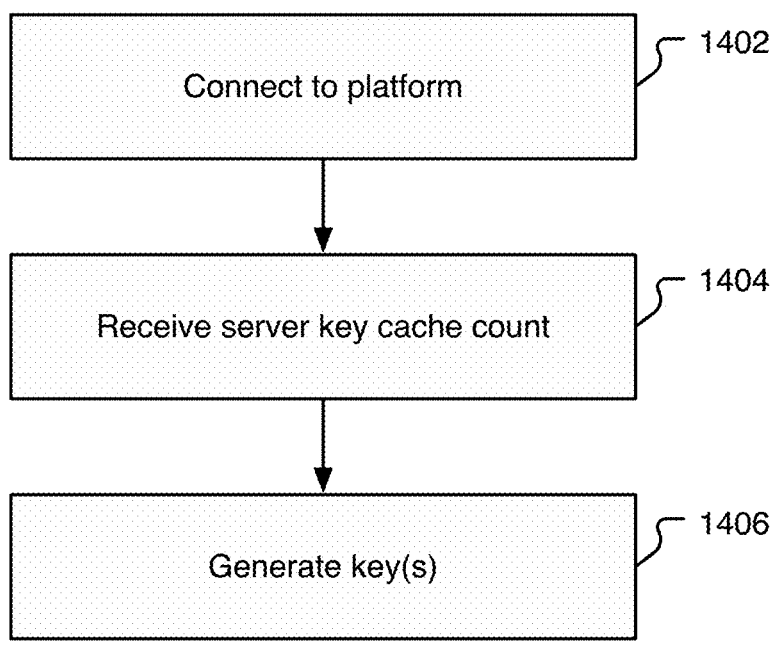
FIG. 14 illustrates an example of a process for performing an asynchronous key cache update.

FIG. 14 illustrates an example of a process for performing an asynchronous key cache update. In some embodiments process 1400 is performed by device 106. Process 1400 begins when device 106 connects to platform 102. The connection can be periodic (e.g., app 116 can be configured to connect to platform 102 once a day, once an hour, etc.) and can also be in response to triggering events (e.g., Alice's phone was powered off and has just been powered on, has just connected to a cellular or other network, etc.). At 1404, the device receives the current server key cache count (i.e., the number of keys presently in the platform's pool for the user). At 1406, the device generates an appropriate number of keypairs (and reference values) and stores/transmits them in accordance with the techniques described above. Further, in the event the server key cache count is zero (i.e., the reserve key is being used by platform 102 due to key pool depletion), one of the newly generated keys will be designated by the server as a replacement reserve key and the old reserve key will be destroyed.

G. Secure Time-to-Live (TTL)

As mentioned above, one example of a message control a sender can specify for a message is a limit on the time period (also referred to herein as a "time-to-live" or "TTL") during which a recipient is able to access the message (e.g., to view, listen to, or otherwise interact with the message and any attachments). In scenarios such as where the sender is using an embodiment of platform 102 operated by an enterprise on behalf of its employees, the TTL may be selected by an entity other than the sender (e.g., based on a default corporate policy, or based on administrator configurable rules implemented by an enterprise-specific version of the secure messaging application). For example, messages sent by employees to one another (e.g., as specified on a privacy list) can have a first default TTL, and messages sent by employees to vendors (also using the enterprise-specific application) can have a second default TTL. As another example, messages sent by certain employees (e.g., within a particular department such as the legal department, or having certain titles or positions, and, e.g., as specified on a privacy list) can be given different default TTLs. In various embodiments, the default TTL can be overridden, if permitted by an administrator configuration.

The TTL is encrypted and sent together with the secure message. When the recipient opens the message (e.g., taps or clicks on the message in an app), the message is decrypted and displayed on the recipient's device. The corresponding TTL is decrypted, and in some embodiments converted into a message expiry time by adding the TTL (e.g., expressed in seconds) to the current time. In various embodiments, the TTL is stored in the recipient's device's secure database and encrypted to prevent tampering with the secure TTL by the device's user. As will be described in more detail below, the current time can also be secured (e.g., against attempts by the recipient to thwart the TTL by adjusting a clock on the recipient's device). Once the TTL has expired, the message is no longer accessible to the recipient (e.g., is removed from the recipient's viewing interface and deleted from the recipient's device's secure database, along with any associated decryption keys).

The sender (or sender's application, as applicable, e.g., where configured by an enterprise administrator) can specify time limits in a variety of ways. As one example, the sender can set a maximum duration (e.g., a one day limit), with the time limit countdown commencing when the recipient first opens the message. The time limit countdown can also be commenced when the sender sends the message. As another example, the sender can specify a fixed start time (e.g., for embargo purposes) before which the recipient is unable to access the message, even if the recipient is already in possession of the message. Once the embargo period ends, as with above, a TTL value can control how long the recipient is able to view the message once opened. This allows, for example, a company to release company news to multiple shareholders in a secure, time-controlled manner, with each shareholder having the same opportunity to open the message at the same start time. This also allows an enterprise to implement rules (e.g., via an enterprise-specific version of the secure messaging application/platform 102) that only allow employees to open messages during certain periods of the day. (E.g., hourly workers can only read messages during business hours; salaried workers have no such prohibition.) As yet another example, the sender can specify a fixed end time after which the recipient is unable to access the message (irrespective of whether the message was also given an "upon opening" TTL, e.g., of ten minutes). Further, in various embodiments, a sender of the message can shorten a limit on an already sent message. For example, if Bob sends Alice a message with a one day limit, and Alice opens that message, Bob can subsequently revoke Alice's ability to continue to read the message (even though the day has not passed) by interacting with his app (e.g., by long pressing on the sent message as it appears to Bob and selecting an "expire now" (immediately expiring the message) or "expire faster" (expiring the message at a new time picked by Bob) option, as applicable).

Figure 15:
FIG. 15 illustrates an embodiment of a message composition interface.

FIG. 15 illustrates an embodiment of a message composition interface. In particular, FIG. 15 depicts interface 1500 as rendered on Bob's phone 112. In the following example, Bob is composing a message to Alice. In region 1502, Bob has indicated that he would like to send a message to Alice. In region 1504, Bob has provided a message for Alice. Specifically, Bob has provided Alice with information about how to enter a locked gate. By interacting with region 1506, Bob can select an amount of time for which, once Alice opens Bob's message, Alice will be able to view the message. As shown in region 1508, Bob has decided to allow Alice to read the message for six seconds once she opens it. When Bob sends the message (by selecting button 1512), a time value of six seconds (an example of a TTL) will be included as a message control (e.g., an example of message control 504).

Figure 16:
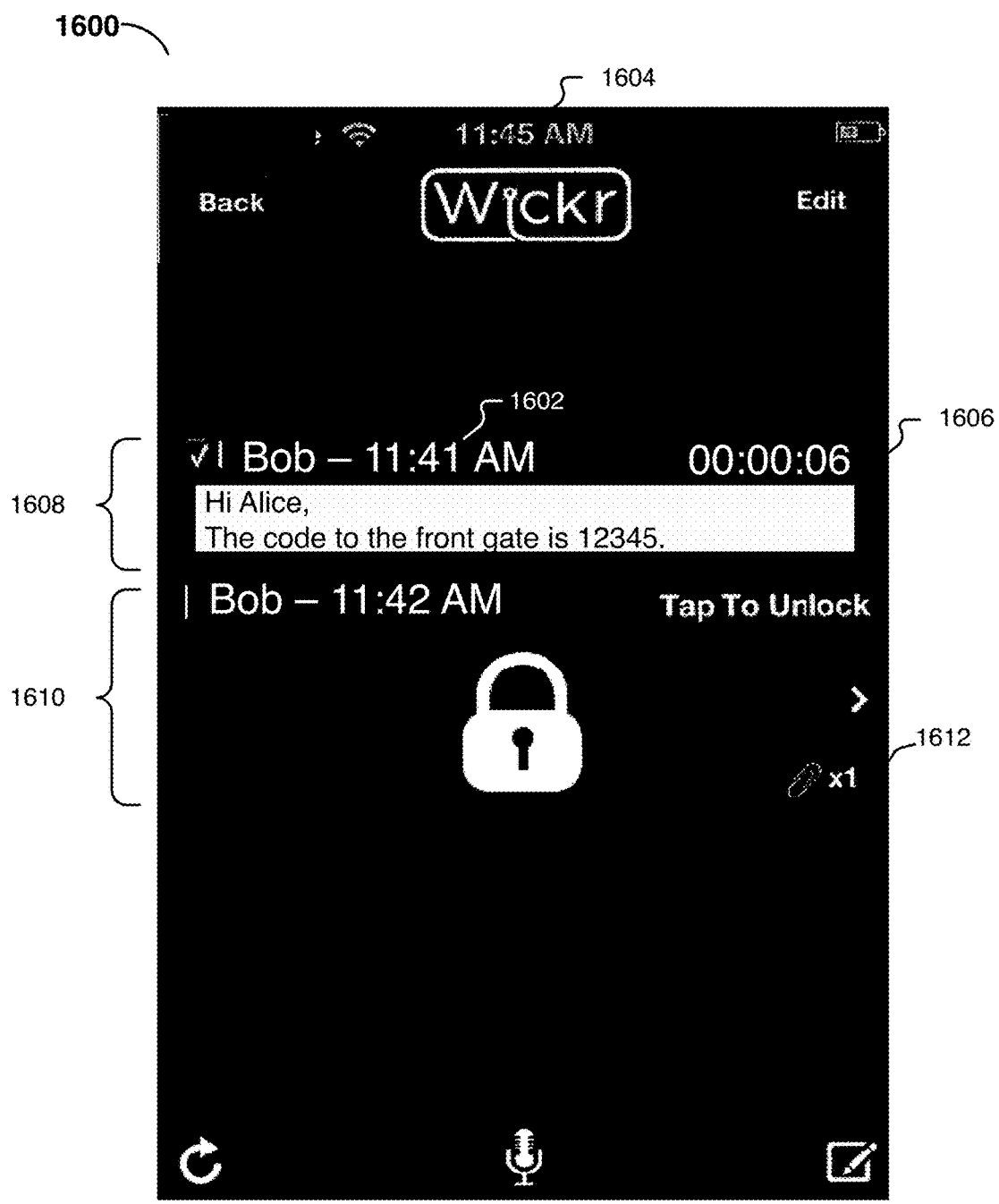
FIG. 16 illustrates an embodiment of a message viewing interface.

FIG. 16 illustrates an embodiment of a message viewing interface. In particular, FIG. 16 depicts interface 1600 as rendered on Alice's tablet 106. In the example of FIG. 16, Alice has just opened the message Bob was composing in interface 1500 of FIG. 15. As indicated in region 1602, Bob sent the message to Alice at 11:41 am. As indicated in region 1604, Alice's device has a time of 11:45 am. As indicated in region 1606, Alice has six seconds to read message 1608. After the six seconds have elapsed, message 1608 will be removed from interface 1600 (and deleted from Alice's device). Also shown in interface 1600 is a message from Bob that Alice has not yet opened (1610). Bob sent message 1610 at 11:42 am, and message 1610 includes one attachment, as indicated in region 1612. Since Alice has not yet opened message 1610, the TTL for message 1610 has not yet been applied to the message. Alice can open message 1610 by clicking on it with her finger. In the event Alice has multiple devices, in some embodiments a received but unopened message (e.g., message 1610) will appear on all of Alice's devices rendered in the manner shown in FIG. 16. In some embodiments, once Alice opens the message on one of the devices, she will be unable to open the message on any of her other devices (i.e., any additional copies of message 1610 will be removed, unopened, from Alice's other devices). In other embodiments, Alice's messages are synchronized across all of her devices, and Alice is allowed to read any of her messages which have not yet expired on any of those devices. In this scenario, the remaining TTL for a given message can be calculated using the time the message is initially opened on a first device/file, and the remaining TTLs reported by all devices on which the message has been opened. For example, suppose Bob sends a message to Alice and sets the TTL to ten minutes. If Alice has three different devices associated with her account (e.g., an iPhone, an Android tablet, and a desktop computer), she is allowed to open the message on any (or all) of her devices as long as the TTL that Bob established (ten minutes in this example) is not exceeded, collectively, across Alice's devices. Suppose Alice opens the message first on her iPhone (e.g., at 11 am) and views it for three minutes. The TTL for the message at that moment is 10−3=7 minutes. If, after two more minutes (e.g., at 11:05 am) Alice opens the same message on her desktop computer, the TTL is now 7−2=5 min. After five more minutes have elapsed (e.g., it is now 11:10 am), if she tries to open the message again on her iPhone, or on her Android tablet, the TTL will be zero, and the message will be deleted from all of Alice's devices. One way of synchronizing the TTL in a multi-device scenario (also referred to herein as the "global TTL" for the message) is for each app to report the remaining TTL for a particular message ID each time the message is opened on that device. The global TTL for that message ID can be synchronized between all of Alice's devices via a variety of mechanisms. For example, Alice's devices could be configured to update one another on the remaining TTL. As another example, platform 102 can receive updates (i.e., reported openings/TTLs) from each of Alice's devices and share that information with other of Alice's devices with the remaining TTL.

Figure 17:
FIG. 17 illustrates an embodiment of a message viewing interface.

FIG. 17 illustrates an embodiment of a message viewing interface. In particular, FIG. 17 depicts interface 1700 as rendered on Alice's tablet 106. In the example of FIG. 17, Alice (at 1:26 pm) has just opened the message that Bob sent her at 11:42 am (i.e., Alice has just opened message 1610 of FIG. 16). Message 1608 is no longer available to Alice as its TTL has expired. In region 1702, Alice is viewing text authored by Bob. Alice can review an attachment that Bob sent by clicking on region 1704. Region 1706 includes a countdown timer that indicates to Alice that she has approximately one hour (59 minutes and 29 seconds) remaining to read Bob's message and view the attachment. When the timer reaches zero, Alice will be unable to view the message or attachment further.

Figure 18:
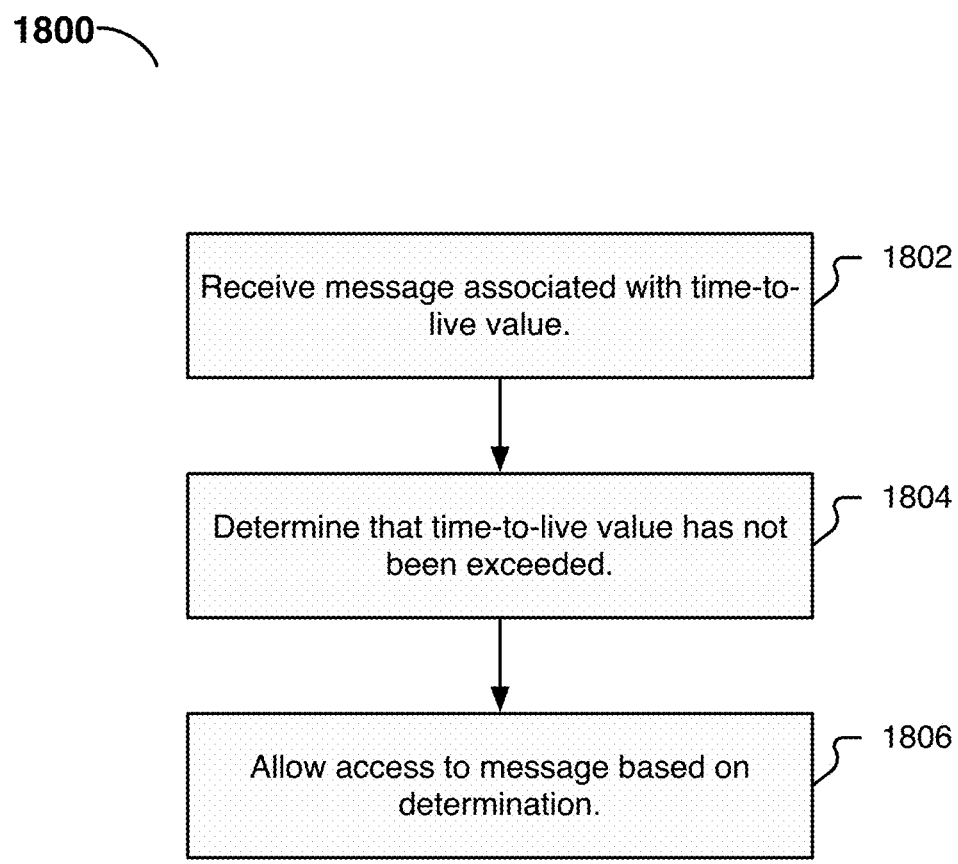
FIG. 18 illustrates an example of a process for determining whether to allow access to a message.

FIG. 18 illustrates an example of a process for determining whether to allow access to a message. In various embodiments, process 1800 is performed on a client device, such as Alice's client device 106. The process begins at 1802 when a message is received. The message has an associated TTL value (or, as explained in more detail below, in some embodiments has a set of associated time-related values). As one example, Bob's message 1610 is received by Alice's device 106 at 1802. Message 1610 has an associated TTL of one hour (3600 seconds), as selected by Bob during message composition. In some embodiments, the TTL is stored in Alice's device's secure database (i.e., preventing tampering with the value by Alice). Next, a determination is made as to whether the TTL has been exceeded. If the TTL has not been exceeded (1804), the message is made available to the recipient (1806). As one example, when Alice initially opens message 1610, the associated TTL (3600 seconds) is decrypted and read by app 116. App 116 begins counting down (using the TTL). So long as the TTL has not been exceeded (e.g., 3601 seconds have elapsed since Alice opened the message), Alice can continue to view the message via app 116. Once the TTL has been exceeded, the message will be removed from her device (e.g., no longer shown on her device's screen and deleted from her device's secure database).

Figure 19:
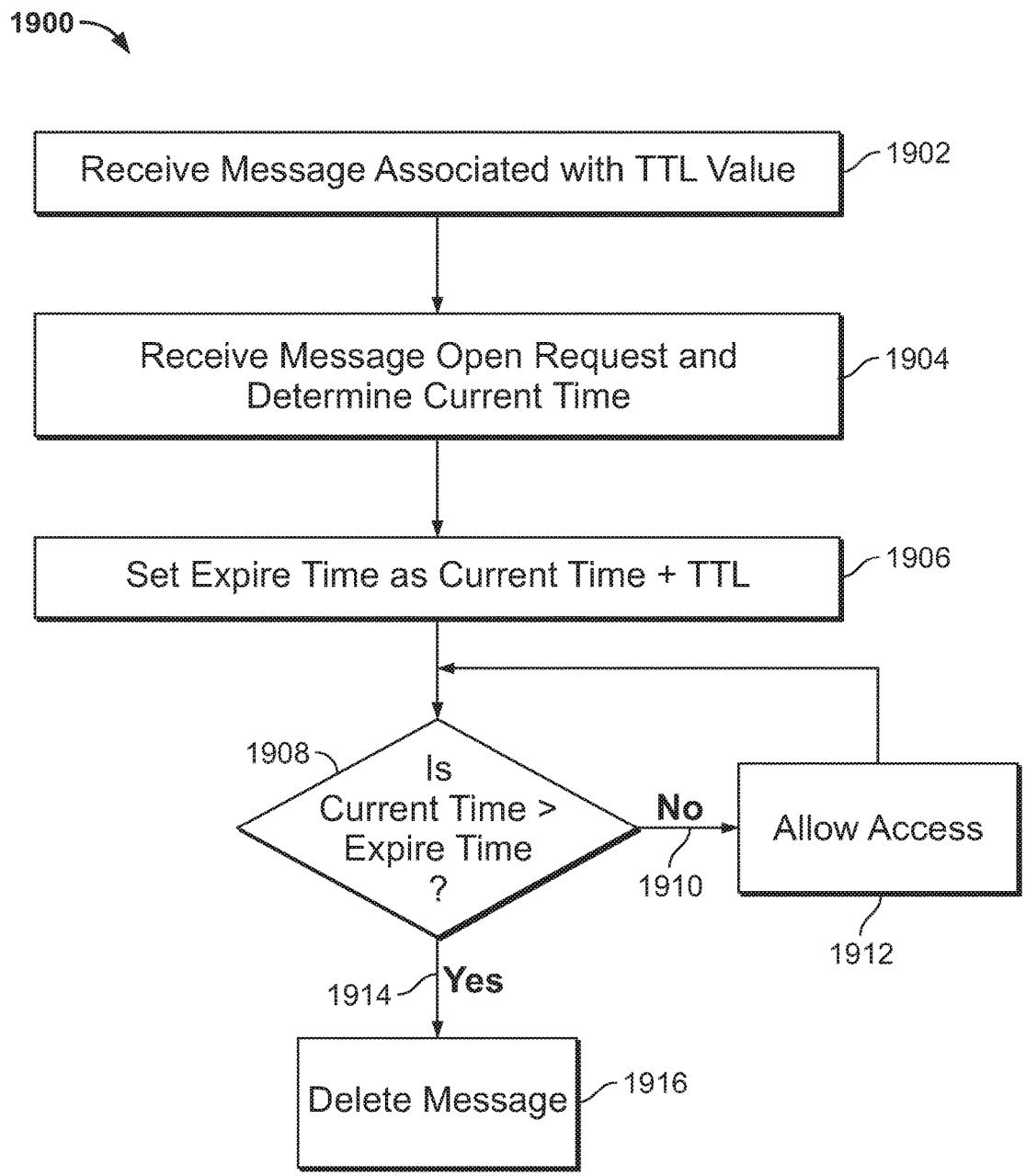
FIG. 19 illustrates an example of a process for determining whether to allow access to a message.

FIG. 19 illustrates an example of a process for determining whether to allow access to a message. Process 1900 is an embodiment of process 1800 and is in some embodiments performed on a client device such as Alice's client device 106. The process begins at 1902 when (as with 1802) a message that has an associated TTL value is received. At 1904, a message open request (e.g., Alice clicking on the lock icon shown in FIG. 16) is received and in response a Current Time is determined. One approach for determining a Current Time is to use the device time. However, a nefarious device user could attempt to circumvent TTL enforcement by modifying the device date, time, and/or time zone settings. A second approach for determining a Current Time is for the recipient's secure messaging app (e.g., app 116 in the case of Alice) to contact platform 102 (or another external time source, such as a dedicated time server) and obtain a Current Time from platform 102 (or the other external time source). In some embodiments, if app 116 is unable to obtain a Current Time (e.g., device 106 is in airplane mode or otherwise offline; or if platform 102 or the other external time source(s) are unreachable), Alice will be unable to open the message (until such time as app 116 is able to obtain a Current Time).

At 1906, the message expiration time ("Expire Time") is set as the Current Time (determined at 1904) with the TTL (e.g., 3600 seconds) added. Thus for example, when Alice opens message 1610 (e.g., at 1:26 pm), a Current Time is obtained from platform 102 (or another appropriate external time source), and a TTL of 3600 is added to the Current Time, resulting in an Expire Time of 2:26 pm.

At 1908, a determination is made as to whether the Current Time is greater than the Expire Time. If not (1910), Alice is able to view the message (1912), and after a period of time (e.g., one second elapsing), another check of the Current Time vs. the Expire Time is performed (1908). In various embodiments, the Current Time continues to be obtained from an external source (e.g., device 106 contacts platform 102 every second). In other embodiments, app 116 is responsible for maintaining the Current Time, at least a portion of the time, after performing an initial check with platform 102 of the Current Time upon message open. In some embodiments, if a Current Time cannot be obtained from an external source (e.g., platform 102 or another server) during the ongoing checking of portion 1908, the message will cease being available to Alice. So, for example, if Alice temporarily loses connectivity during the one hour window of time Bob has allowed her to read message 1610, Alice will be unable to read message 1610 during that portion of the hour. In some embodiments, the TTL countdown continues, irrespective of whether Alice is offline, meaning that Alice will not be given additional time to view the message to compensate for the period her device lacked connectivity. Eventually (e.g., after one hour has elapsed), the Current Time will exceed the Expire Time (1914), at which point the message is deleted (1916).

Figure 20:
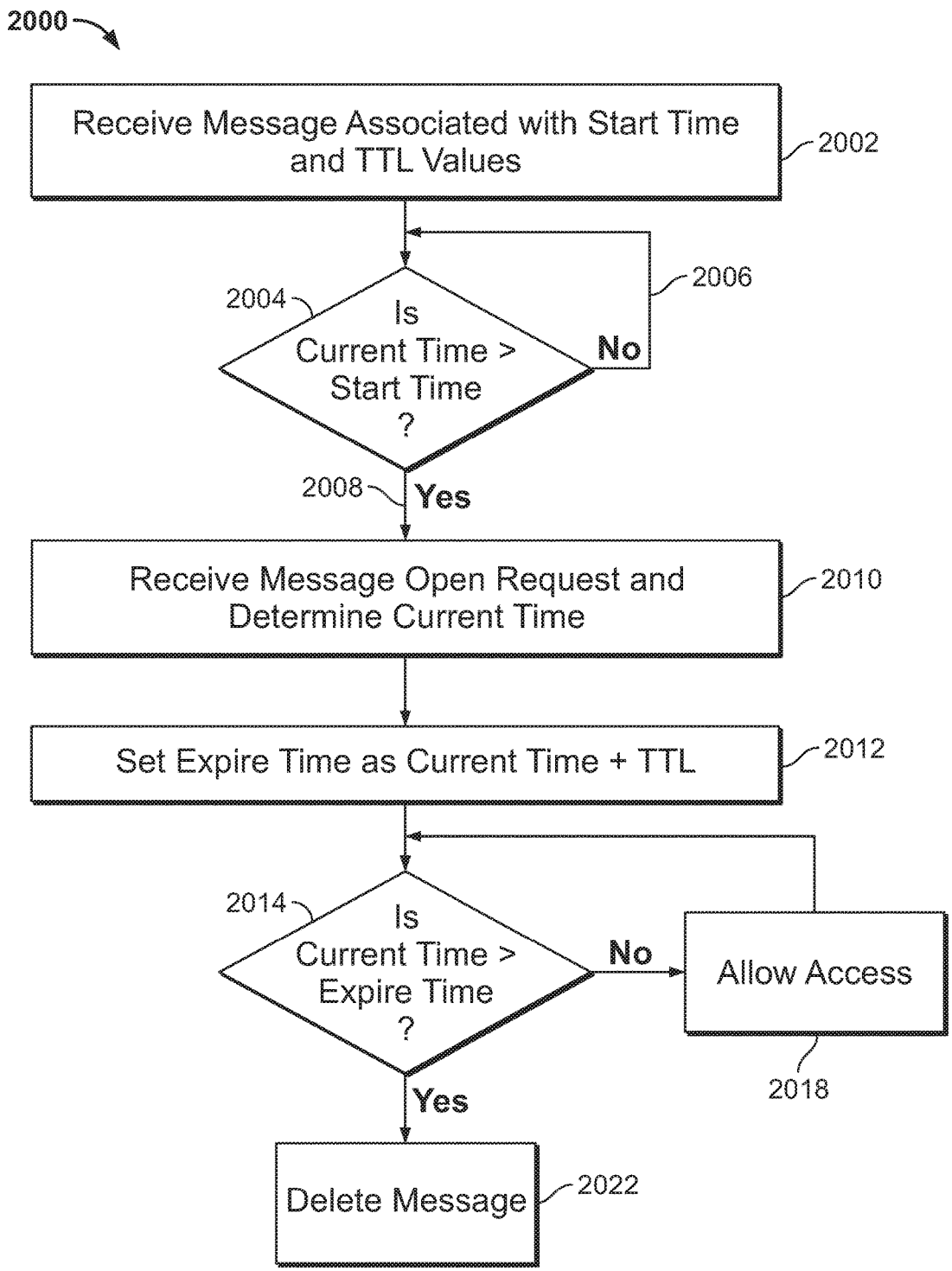
FIG. 20 illustrates an example of a process for determining whether to allow access to a message.

FIG. 20 illustrates an example of a process for determining whether to allow access to a message. Process 2000 is an embodiment of process 1800 and is in some embodiments performed on a client device such as Alice's client device 106. The process begins at 2002 when a message that has multiple TTL-related values is received. As one example, a start time (i.e., embargo time) is provided, as is a duration (e.g., 3600 seconds, as per above). Process 2000 can also be adapted to accommodate a hard end time (instead of, or in addition to a start time), as applicable. At 2004, a determination is made (e.g., by contacting platform 102) whether the Current Time exceeds the Start Time. If not (2006), any requests by Alice to open the message will be ignored, as the end of the embargo has not yet been reached. And, additional checks of the Current Time vs. the Start Time will continue until the embargo ends (2008). The remainder of process 2000 continues as per process 1900. E.g., a message open request is received, and a Current Time determined (1904, 2010); the Expire Time is set as the Current Time and TTL (1906, 2012); and the Current Time is checked against the Expire Time (1908, 2014) to determine whether to continue to allow access to the message (1912, 2018) or delete the message (1916, 2022).

H. Mutual Privacy Management

Traditional messaging systems typically allow all users of the system to generate and send a message to an arbitrary recipient. If the recipient does not want to receive messages, the recipient must either rely on spam filters or delete the messages after they arrive, as applicable. The sender in a traditional system is not prevented from sending messages to a recipient that does not wish to receive messages, thus wasting money, creating congestion on the network(s), wasting bandwidth, wasting processing power, and annoying the recipient, etc.

In contrast, using techniques described herein, users of embodiments of platform 102 (or their representatives, as applicable) are able to edit "privacy" lists, which allow would-be recipients to control from whom they receive messages. In various embodiments, the user's privacy list is stored in database 120 (e.g., in encrypted form, with username entries stored as hashes), and is globally applied across all of the user's devices (where the user has multiple devices configured to use platform 102). As will be described in more detail below, in some embodiments the privacy settings are "mutual," meaning that if a first user chooses not to receive messages from a second user, the first user will symmetrically be unable to send messages to the second user. In various embodiments, users are able to select from (and switch between) one of two privacy modes: a "block mode" and a "whitelist mode." Based on which mode the user is in, the user's privacy list will have different effects. In some embodiments, instead of having a single list (treated differently based on which mode the user is in), the user has a respective list for a respective mode. As one example, where platform 102 is operated on behalf of an entity such as a school, certain user accounts (e.g., "announcements" or "campus policy") can be included in a universal whitelist, applicable to all users irrespective of individual user settings. In such a scenario, students (or other users of the school-specific platform) are otherwise able to operate in allow or block mode, and make individual choices about which usernames to include in their individual privacy list. In various embodiments, the user can only be in one privacy mode at a time (e.g., preventing the user from inadvertently misconfiguring the user's settings to prevent all users of the system from messaging the user).

Figure 21:
FIG. 21 illustrates an example of an interface in which a user can specify a privacy setting.

Suppose Alice has been receiving unwanted messages from a user of platform 102, "Charlie." Alice would like to prevent Charlie from sending any more messages to her. Alice can use the "block mode" to provide a list of specific users (such as Charlie) who should be blocked from sending her messages. Charlie (once blocked by Alice) will be unable to send messages to Alice because platform 102 will not provide Charlie with Alice's public key. In FIG. 21, Alice has selected to be in "block mode" by clicking on region 2102 (as indicated by the checkmark). Charlie is the first user Alice has decided to block, and she enters his username in region 2104. Alice can later un-block Charlie, if desired, by clicking on region 2106. Alice can add additional users to be blocked by clicking region 2108 and providing their usernames, if desired. When a user (e.g., Alice) is in block mode, the user will be able to receive messages from any users not appearing on the list (also referred to herein as a "privacy list") such as the list (of just Charlie) shown in FIG. 21. The privacy setting is mutual, meaning that Alice will also be unable to message Charlie if she adds him to her privacy list while in block mode (i.e., Alice will symmetrically be unable to obtain Charlie's public key from platform 102 while she has blocked Charlie).

Figure 22:
FIG. 22 illustrates an example of an interface in which a user can specify a privacy setting.

An alternate way for Alice to prevent Charlie from sending her messages is for Alice to enter "whitelist mode." In whitelist mode (also referred to herein as "allow mode"), only those users whose usernames Alice has added to her privacy list will be able to obtain her public key and thus send her messages. And, in some embodiments, symmetrically, Alice will only be able to send messages to (i.e., obtain the public keys of) those users appearing in her privacy list while in whitelist mode. In FIG. 22, Alice has selected to be in "whitelist mode" by clicking on region 2202 (as indicated by the checkmark). Alice likes communicating with Bob and so has entered his name in region 2204 (indicating that Bob is allowed to send her messages (i.e., obtain her public key)). Alice can remove Bob from her privacy list by clicking on region 2206 and can add additional users to her privacy list by clicking on region 2208.

In various embodiments, an entity other than the end user of platform 102 (or embodiments of platform 102) has control over that end user's privacy list (or, as applicable, can configure a supplemental privacy list for the user). As one example, suppose an embodiment of platform 102 is made available to families as a service. Parents of children using the service are able to customize (e.g., through a password-protected interface on their child's app) whether their child's app should operate in block mode or whitelist mode. Those parents can further configure which usernames should appear on their child's privacy list (e.g., resulting in a messaging app that allows the child to communicate with family members and known friends only). As another example, where platform 102 is operated on behalf of a University, the University-specific embodiment of the secure messaging app can be configured to support a predefined whitelist (e.g., such that all University-specific secure messaging apps will always allow communications from certain University accounts, such as campus police to be sent) and permit students to optionally configure their own individual block lists (e.g., of other students they do not want to receive messages from), if desired.

Figure 23:
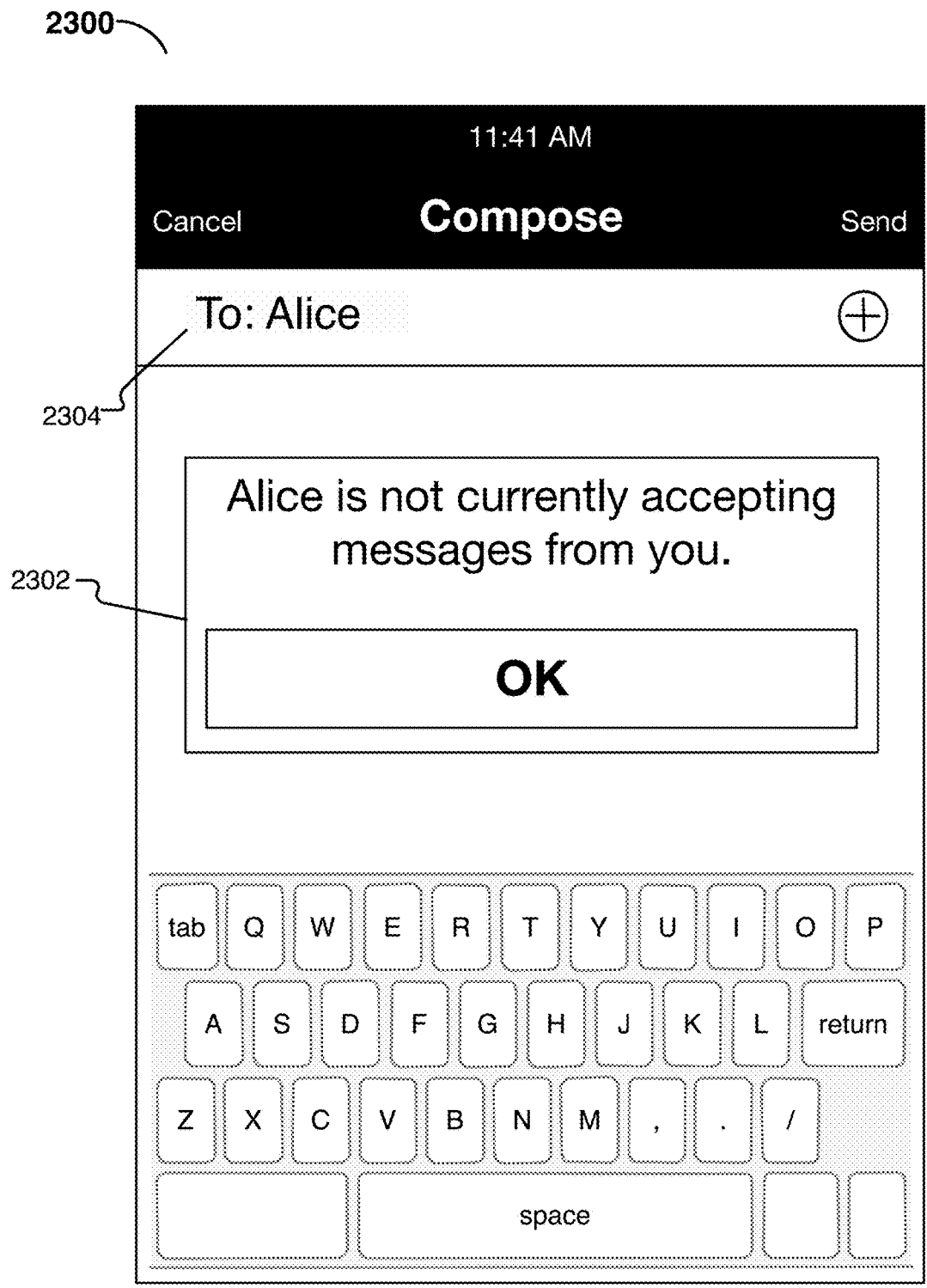
FIG. 23 illustrates an embodiment of a message composition interface.

FIG. 23 illustrates an embodiment of a message composition interface. In particular, FIG. 23 depicts interface 2300 as rendered on Charlie's client device. In the example of FIG. 23, Charlie is attempting to compose a message to Alice, after Alice has added Charlie to her privacy list while in block mode (e.g., after Alice's actions shown in FIG. 21). Charlie is unable to send a message to Alice, as indicated in region 2302. As mentioned above, Charlie is unable to acquire Alice's public key from platform 102 due to Alice's inclusion of Charlie on her privacy list while she is in block mode.

Figure 24:
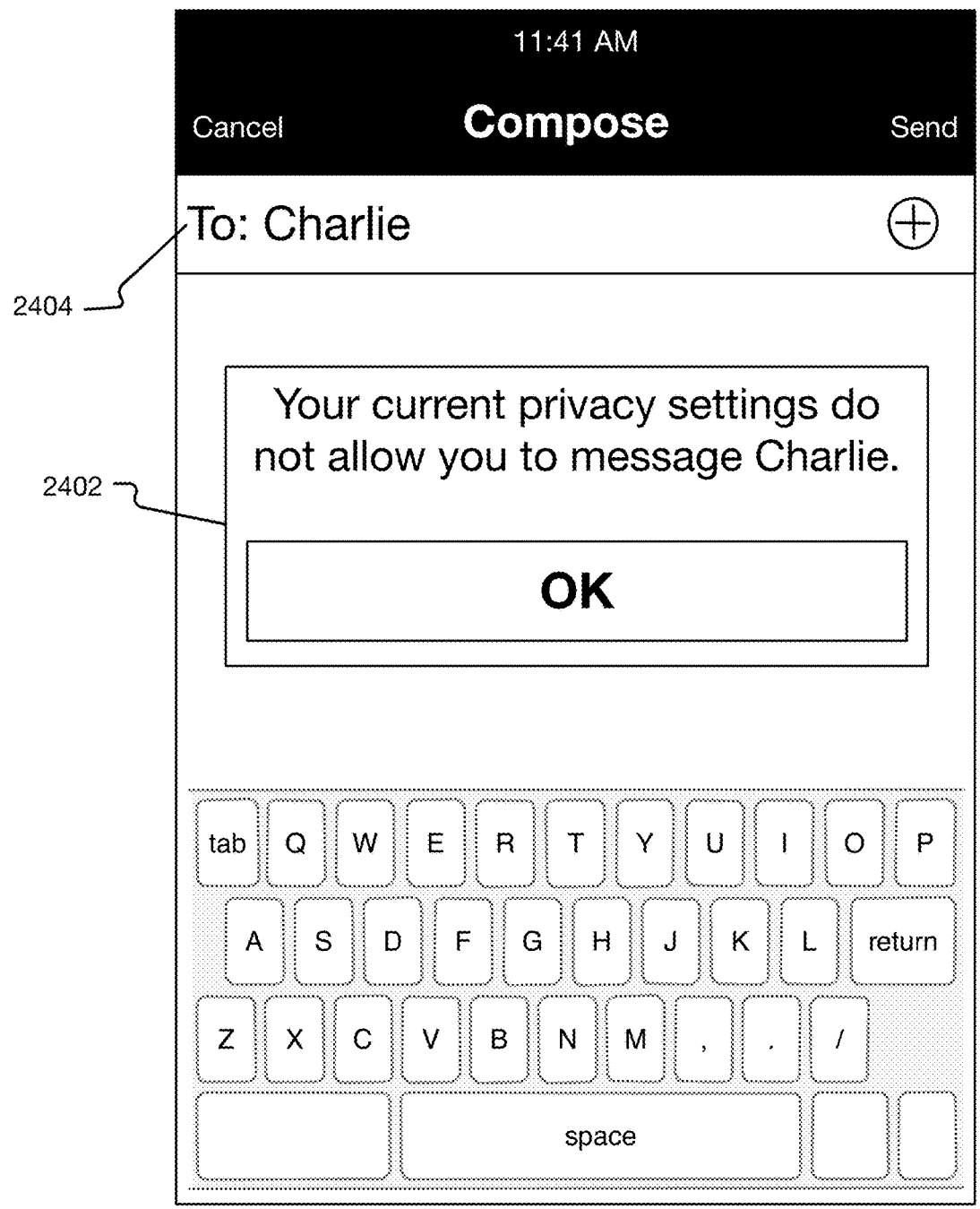
FIG. 24 illustrates an embodiment of a message composition interface.

FIG. 24 illustrates an embodiment of a message composition interface. In particular, FIG. 24 depicts interface 2400 as rendered on Alice's client device (e.g., tablet 106). In the example of FIG. 24, Alice is attempting to compose a message to Charlie, after Alice has added Charlie to her privacy list while in block mode (e.g., after Alice's actions shown in FIG. 21). Alice is symmetrically unable to send a message to Charlie, as indicated in region 2402, because she added Charlie to her block list. Alice is reminded of the reason that she is unable to message Charlie (e.g., in case she mistakenly blocked Charlie, or in case she has changed her mind about blocking Charlie).

Figure 25:
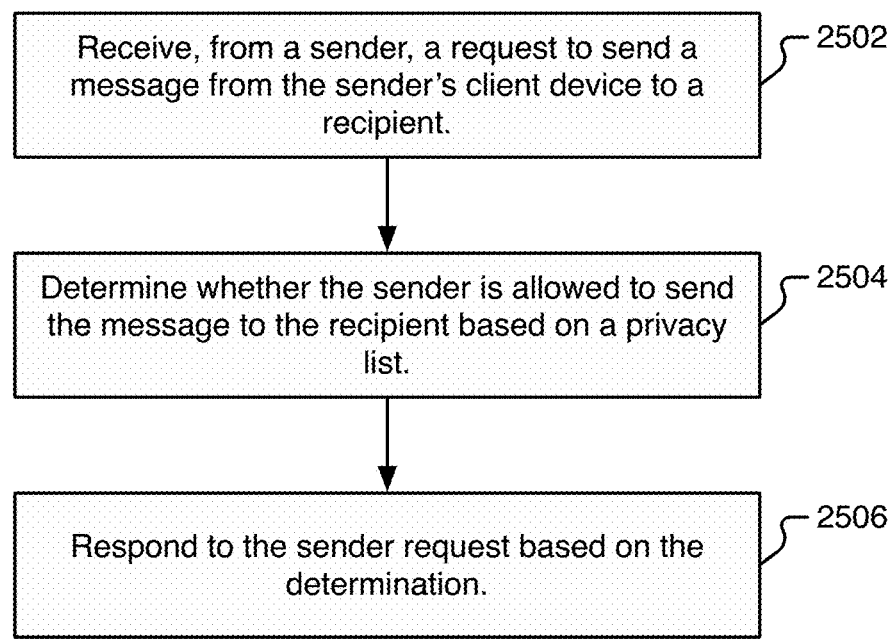
FIG. 25 illustrates an example of a process for determining whether to allow a message to be sent.

FIG. 25 illustrates an example of a process for determining whether to allow a message to be sent. In various embodiments, process 2500 is performed by platform 102. The process begins at 2502 when a request is received, from a sender, to send a message to a recipient. As one example, such a request is received at 2502 when Alice enters Bob's name into region 302 of interface 300, or presses send button 314, as applicable (e.g., when Alice's app 116 requests Bob's public key from platform 102).

At 2504, a determination is made as to whether the sender is allowed to send the message to the recipient, based on a privacy list. As one example, at 2504, platform 102 determines whether Bob is in block mode or in whitelist mode. Platform 102 also determines whether Bob's privacy list contains an entry for Alice. In various embodiments, platform 102 also determines whether Alice is in block mode or whitelist mode and further determines whether Alice's privacy list contains an entry for Bob. Specific examples of how the determination at 2504 can be performed are described in more detail in conjunction with FIG. 26.

Finally, at 2506, the sender receives a response to the send request, based on the determination made at 2504. For example, where a determination is made at 2504 that the sender is allowed to send a message to the recipient, at 2506 platform 102 sends a public key of the recipient to the sender. Where a determination is made at 2504 that the sender is not allowed to send a message to the recipient, at 2506 platform 102 does not send the public key of the recipient to the sender. In various embodiments, an applicable rejection message (e.g., as shown in interface 2300) is shown to the sender.

Figure 26:
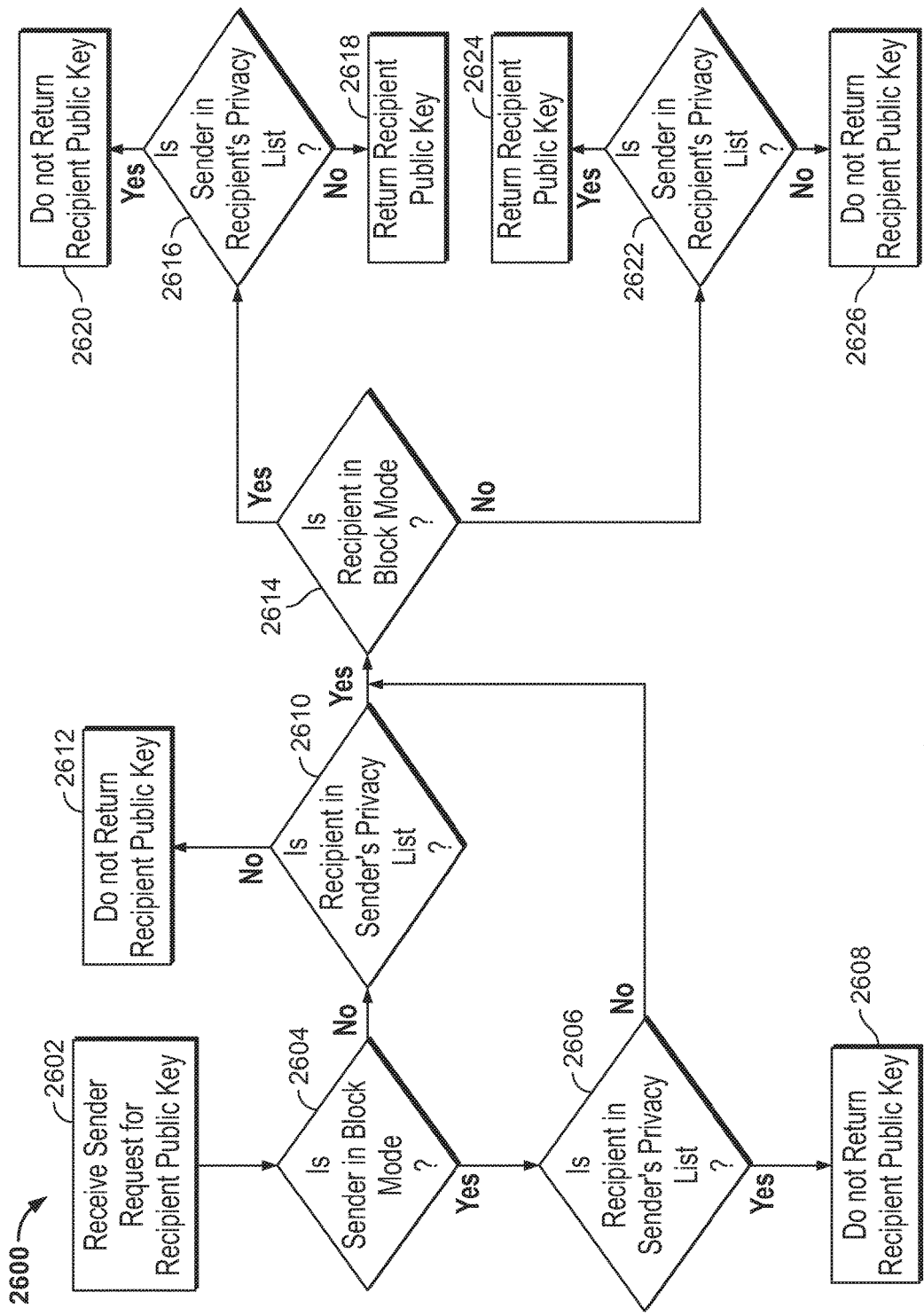
FIG. 26 illustrates an example of a process for determining whether to allow a message to be sent.

FIG. 26 illustrates an example of a process for determining whether to allow a message to be sent. In various embodiments, process 2600 is performed by platform 102. Process 2600 begins (at 2602) when a request is received from a sender for a public key of a recipient. As one example, such a request is received at 2602 when Alice enters Bob's name into region 302 of interface 300. As another example, such a request is received at 2602 when Charlie enters Alice's name into region 2304 of interface 2300. As yet another example, such a request is received at 2602 when Alice enters Charlie's name into region 2404 of interface 2400.

At 2604, a determination is made as to whether the sender is in block mode. As one example, at 2604 platform 102 examines database 120 for information about which privacy mode the sender is in. In various embodiments, a user defaults to being in the block mode, with an empty privacy list. As mentioned above, a user can change which mode the user is in, and add or remove other users from a privacy list by interacting with interfaces such as are shown in FIGS. 21 and 22. Manipulations of a user of interfaces 2100 and 2200 are transmitted to platform 102 which updates database 120 (and its encrypted entries) accordingly.

If the sender is in block mode, a determination is made (at 2606) as to whether the recipient is in the sender's privacy list. This indicates that the sender is attempting to send a message to a recipient that the sender has prevented from sending messages to the sender. Accordingly, in some embodiments due to the mutual/symmetric nature of privacy controls, the sender will be prevented from sending the message to the recipient (i.e., the sender will not be sent the recipient's public key) at 2608.

If the sender is not in block mode, the sender is instead in allow mode and a determination is made (at 2610) as to whether the recipient is in the sender's privacy list. If the recipient is not in the sender's privacy list, this indicates that the sender has not whitelisted the recipient as someone who can message the sender. Accordingly, in some embodiments due to the mutual/symmetric nature of privacy controls, the sender will be prevented from sending the message to the recipient (i.e., the sender will not be sent the recipient's public key) at 2612.

In the event the sender is in block mode and the recipient is not blocked by the sender (i.e., the recipient is not on the sender's privacy list) or in the event the sender is in allow mode and the recipient is in the sender's privacy list (i.e., the recipient is explicitly allowed by the sender's list), process 2600 next examines the recipient's privacy settings. In particular, at 2614 a determination is made as to whether the recipient is in block mode. If so, at 2616 a determination is made as to whether the sender is in the recipient's privacy list. If not, the sender will be provided with the recipient's public key at 2618 (and can send a message to the recipient). If so, the sender will not receive the recipient's public key at 2620 (and cannot send a message to the recipient).

In the event the recipient is not in block mode, at 2622 a determination is made as to whether the sender is in the recipient's privacy list. If so, at 2624 the sender will be provided with the recipient's public key (and can send a message to the recipient). If not, at 2626 the sender will not receive the recipient's public key (and cannot send a message to the recipient).

As explained above, in the event the sender is unable to obtain the recipient's public key due to privacy settings, the sender can be presented with an appropriate message in the secure messaging application, such as message 2302 or message 2402, as applicable.

I. Securing Group Communications (Secure Social Feed)

Social networks allow users to share content, such as pictures, videos, text, audio, etc., with other users on their friend list via social media posts. However, the posted content may permeate to other users' feeds not associated with the original poster when the original poster's friends respond, or otherwise interact, with the shared content.

One solution for limiting who can view the content would be for users to send the content to individuals or groups of users via a secure messaging platform, such as security platform 102. Accordingly, a user, such as Alice, may use the secure messaging app described above to send content to multiple recipients in accordance with one or more of the multiparty messaging scenarios previously discussed.

Figure 27:
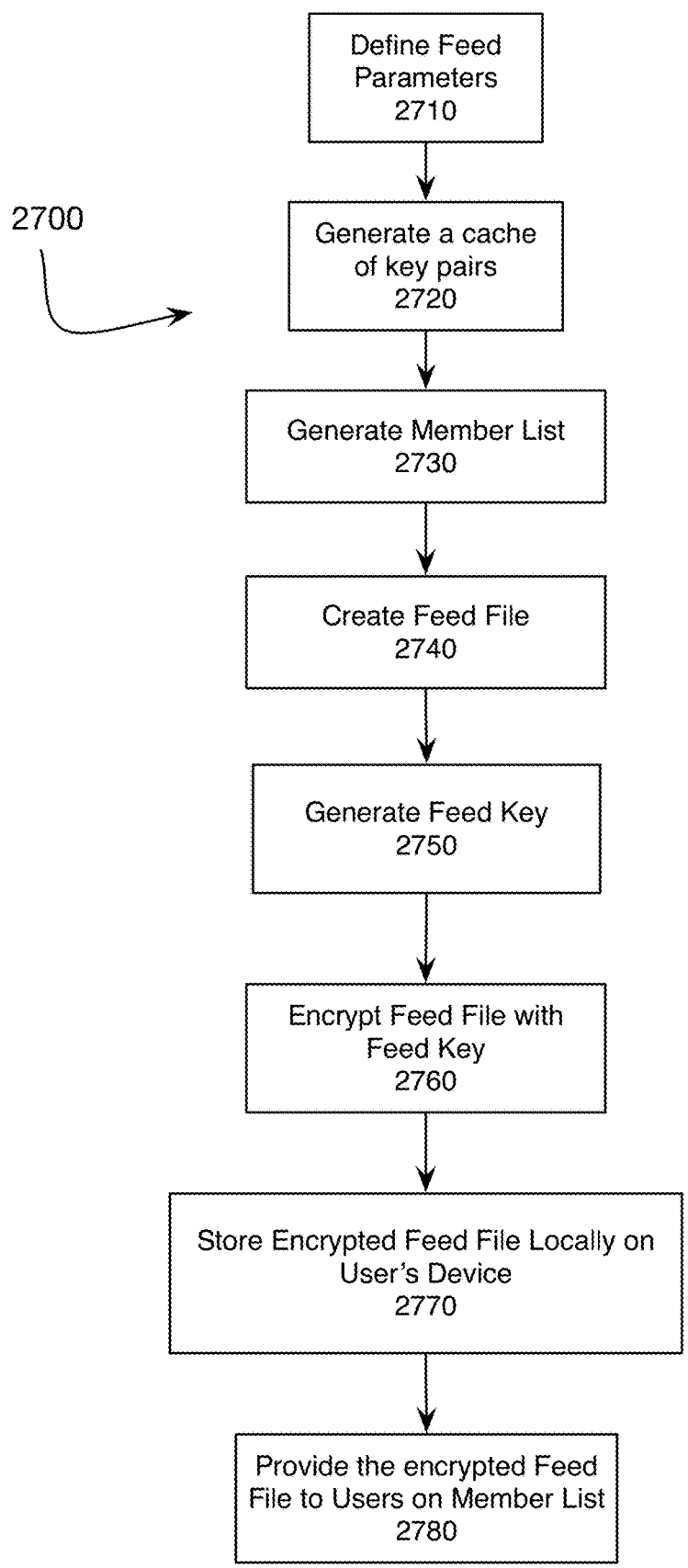
FIG. 27 illustrates an example flowchart for creating a secure social feed.

Alternatively, Alice may use the secure messaging app to create a secure social feed in order to share her content with upwards of thousands of recipients. FIG. 27 illustrates a method 2700 for creating a secure social feed.

In block 2710, Alice may define the secure social feed parameters. The feed parameters may include a static ID and a dynamic ID. The static ID is similar to the user ID described above. That is, the static ID does not change after being defined. Conversely, the dynamic ID is similar to the application ID described above and may change from time-to-time. For example, a new dynamic ID may be generated whenever a user leaves the secure social feed. Alternatively, the dynamic ID may be updated each time any feed parameter is updated as discussed in greater detail below.

In block 2720, Alice's app may generate a cache of key pairs to associate with the feed. The cache of key pairs are used to effectuate an Elliptic-Curve Diffie-Hellman (ECDH) key exchange between the secure social feed and recipients of the feed. Each key pair is used only once, which ensures perfect forward secrecy for the communications between Alice and members of the secure social feed. In preferred embodiments, the key pairs are Elliptic Curve Cryptography (ECC) key pairs. However, one of ordinary skill in the art would recognize that comparable asymmetric key generation techniques may be used.

After generating the cache of key pairs, Alice's app generates a member list for the feed in block 2730. In this regard, Alice may select which users she wishes to share her secure social feed with via one of the interfaces discussed below. After receiving Alice's selection, her app may assign aliases to each user name in order to mask recipients' true identities from the security platform and other recipients. The aliases will be compiled into a file to create the member list. In some embodiments, aliases may be random 64 character alpha-numeric strings that are uniquely assigned to recipients across the group.

Next, Alice's app builds the feed file in block 2740. The feed file defines the criteria for the secure social feed. In particular, the feed file may include information to enable recipients to access Alice's secure social feed. Further, the feed file may also include information related to the group. For instance, the feed file may define that the secure social feed is broadcast only, meaning only Alice (or the creator of the feed) is allowed to post content to the secure social feed. Alternatively, the feed file may define which members of the secure social feed may send messages. Similarly, the feed file may permit all members of the feed to communicate with other members of the feed.

Alice's app creates the feed file using the static ID for the feed, the dynamic ID for the feed, a cache of the ECC private keys, the member list, and any additional parameters set forth by the feed creator. For instance, the feed file may include a feed definition. The feed definition may include the group static ID, as well as past and current dynamic IDs for the feed. In this regard, the dynamic ID may change as members are added and removed to guard against unauthorized users accessing the secure social feed.

In block 2750, Alice's app may generate a feed key to encrypt the feed file. The feed key may be a pseudorandom, 256-bit key. According to some embodiments, Alice's app may refresh the feed key periodically. In preferred embodiments, Alice's app generates a new feed key every 24 hours. However, one of ordinary skill in the art would recognize that a new feed key may be generated periodically according to user or system preferences. In block 2760, the feed key is used to encrypt the feed file. In preferred embodiments, the feed file is encrypted using AES256 and the feed key. One of ordinary skill in the art would recognize that any suitable encryption algorithm may be used in lieu of AES.

In block 2770, the encrypted feed file may be stored locally on Alice's device. Preferably, the encrypted feed file is saved in Alice's user-level back-up. As used herein, a user-level back-up is an encrypted data store that may also be stored with the security platform, with a trusted third party, or on a server. According to some embodiments, the user-level back-up is encrypted with a key that is derived from the password Alice uses to log-in to her secure messaging app. In this regard, the user-level back-up ensures that users retain their data, including their feed files, aliases, and feed keys, in the event of a catastrophic loss of data on their device. Thus, Alice may be able to restore her secure messaging app from her encrypted user-level back-up and resume normal behavior.

Finally, in block 2780, Alice's app provides the encrypted feed file to users on the member list. In preferred embodiments, Alice's app provides the encrypted feed file to security platform 102. In this regard, recipients included on the member list will be able to retrieve the encrypted feed file, decrypt it, and use the information contained therein to view Alice's secure social feed as discussed in greater detail below. Alternatively, Alice's app may provide the encrypted file to each user included in the member list via a standard DSB.

Figure 28:
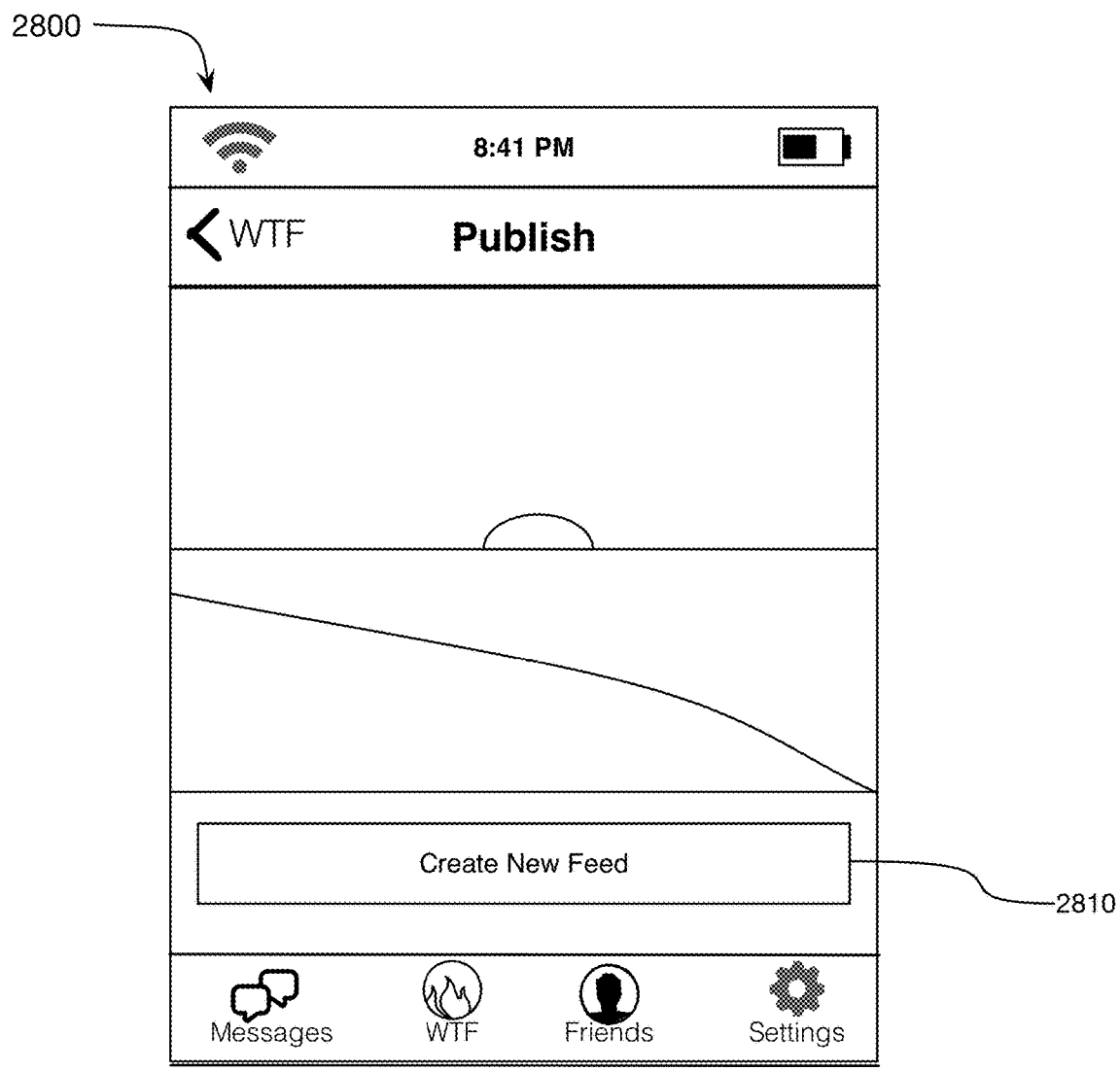
FIG. 28 illustrates a screen shot for creating a new secure social feed.

FIG. 28 illustrates an example of an interface for creating a secure social feed. In particular, button 2810 allows a user to create a new secure social feed. After selecting button 2810, the app may begin creating the feed according to process 2700 described above. Alternatively, a new secure social feed may be created after a user has selected content to share, as shown below in FIG. 36C.

Figure 29:
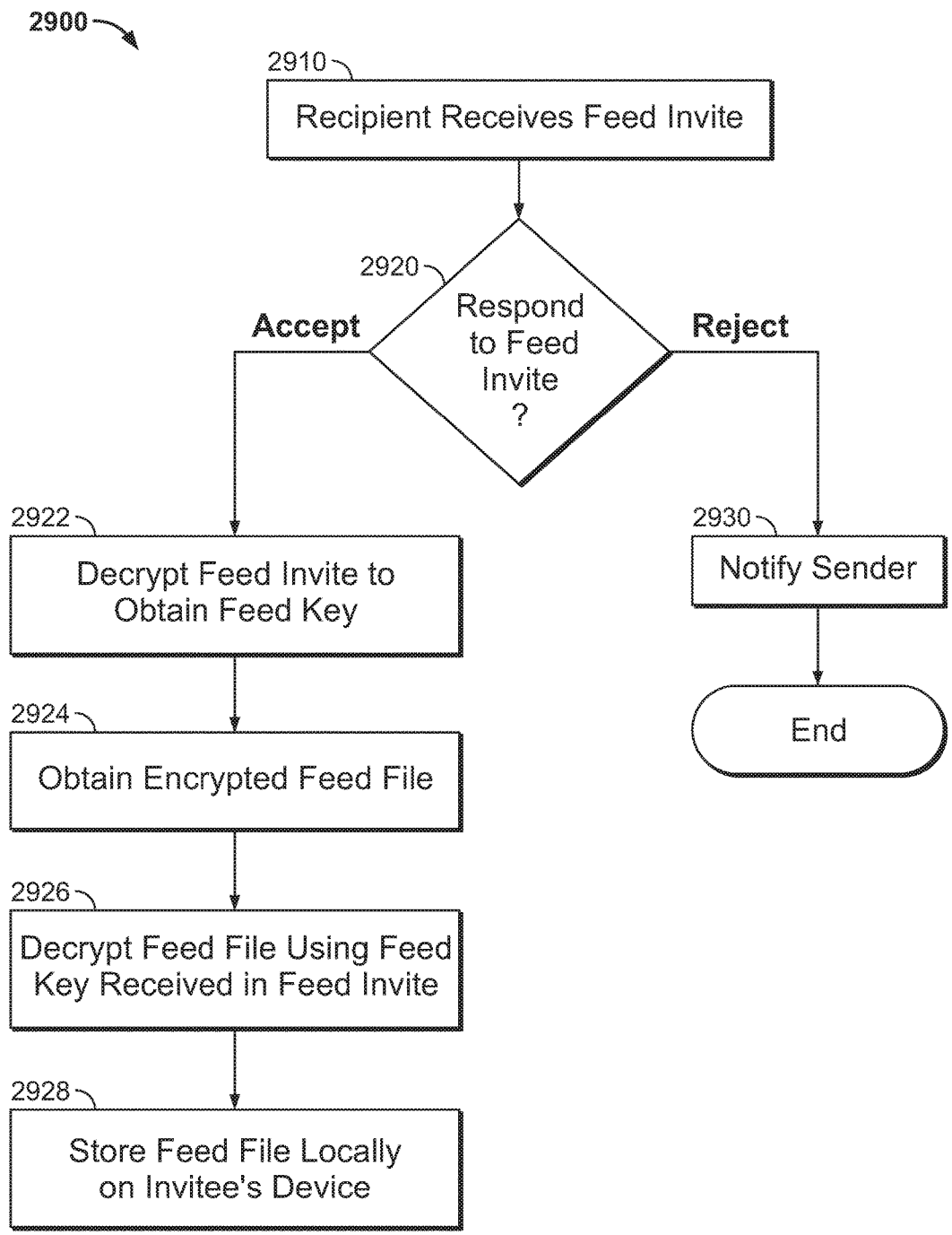
FIG. 29 illustrates a flowchart for inviting friends to view a poster's secure social feed.

After creating the secure social feed, Alice's app may send invitations to users on the member list. FIG. 29 illustrates a process 2900 for responding to a secure social feed invitation.

In block 2910, users may receive an invitation to a feed. The invitation may be a standard DSB sent from Alice's app to each user on the member list in a peer-to-peer manner. Alternatively, Alice's app may send the invitation in a one-to-many manner as a group message to the member list. According to some embodiments, the keys may always be exchanged in either a peer-to-peer manner or from the security platform 102 irrespective of group size. The invitation may include the feed definition—including the static ID and dynamic IDs; the member list; and the feed key.

In block 2920, the user may respond to the feed invite. To respond to the invite, the user may accept, reject, or ignore it and not respond. The user's selection may be conveyed to Alice's app and/or security platform 102, which will update the user's status in a master member list. That is, the member list included in the feed file may include a status field to indicate whether the user has accepted, rejected, did not respond, or have been removed by the administrator of the group. Accordingly, users may be provided an updated encrypted feed file based upon the responses Alice receives from other users. As discussed above, providing the updated encrypted feed file may include providing it to the security platform for users retrieval or transmitting the updated encrypted feed file to each user on the updated member list.

If the user accepts, process 2900 proceeds to block 2922 where the user's app decrypts the feed invite to obtain the feed key. In some embodiments, the feed invite may also include alias assignments. In this regard, users would receive the member list in the feed invite instead of the feed file.

In block 2924, the user's app may obtain the encrypted feed file. In embodiments where the encrypted feed file is located on security platform 102, users' apps may use the received static ID and dynamic ID to obtain the encrypted feed file. That is, the user's app will request the feed file from the security platform. The security platform uses the static ID and dynamic ID to retrieve the appropriate feed file and send it to the user's app.

In embodiments where Alice's app provides the encrypted feed file, users' apps may receive the encrypted feed file via a standard DSB that is different from the invite DSB. Accordingly, each user's app may decrypt the standard DSB to retrieve the encrypted feed file.

After receiving the feed file, the user's app will decrypt it using the feed key in block 2926. In block 2928, the user's app may review the decrypted feed file and store the decrypted feed file on the invitee's device in order to view Alice's secure social feed. In particular, the invitee's app may extract the cache of private keys and store them locally on their device in order to perform the ECDH key exchange necessary to access the encrypted content, as discussed in greater detail below. Additionally, the invitee's app may store the feed file in their user-level back-up. In the event of a catastrophic loss of data on their device, the invitee would be able to restore their secure messaging app and resume accessing their secure social feeds.

If the user declines the invite or does not reply to the invite after a predetermined time period, process 2900 proceeds to block 2930 where Alice's app is notified that the user has declined the feed invite. This may include the invitee's device notifying Alice that the feed invite has been declined. In situations where the invitee has not responded after a certain period of time, Alice's app may treat the lack of response as the user declining the invitation to the feed.

In response to receiving notification that the invitee has declined the feed invite, Alice will recreate the feed file so that the invitee does not have access to the feed key. Accordingly, Alice will update the feed file by generating a new dynamic ID, updating the member list, and generating a new feed key. Additionally, the feed definition may be updated to record the previous dynamic ID. The updated feed file will be encrypted with the new feed key and provided to users via the techniques described above. The new feed key will be sent to users on the member list who have accepted the feed invite and those who have not yet responded. Updating the feed file and feed key may be repeated each time Alice receives notification that an invitee has declined her invitation to the secure social feed.

Figure 30:
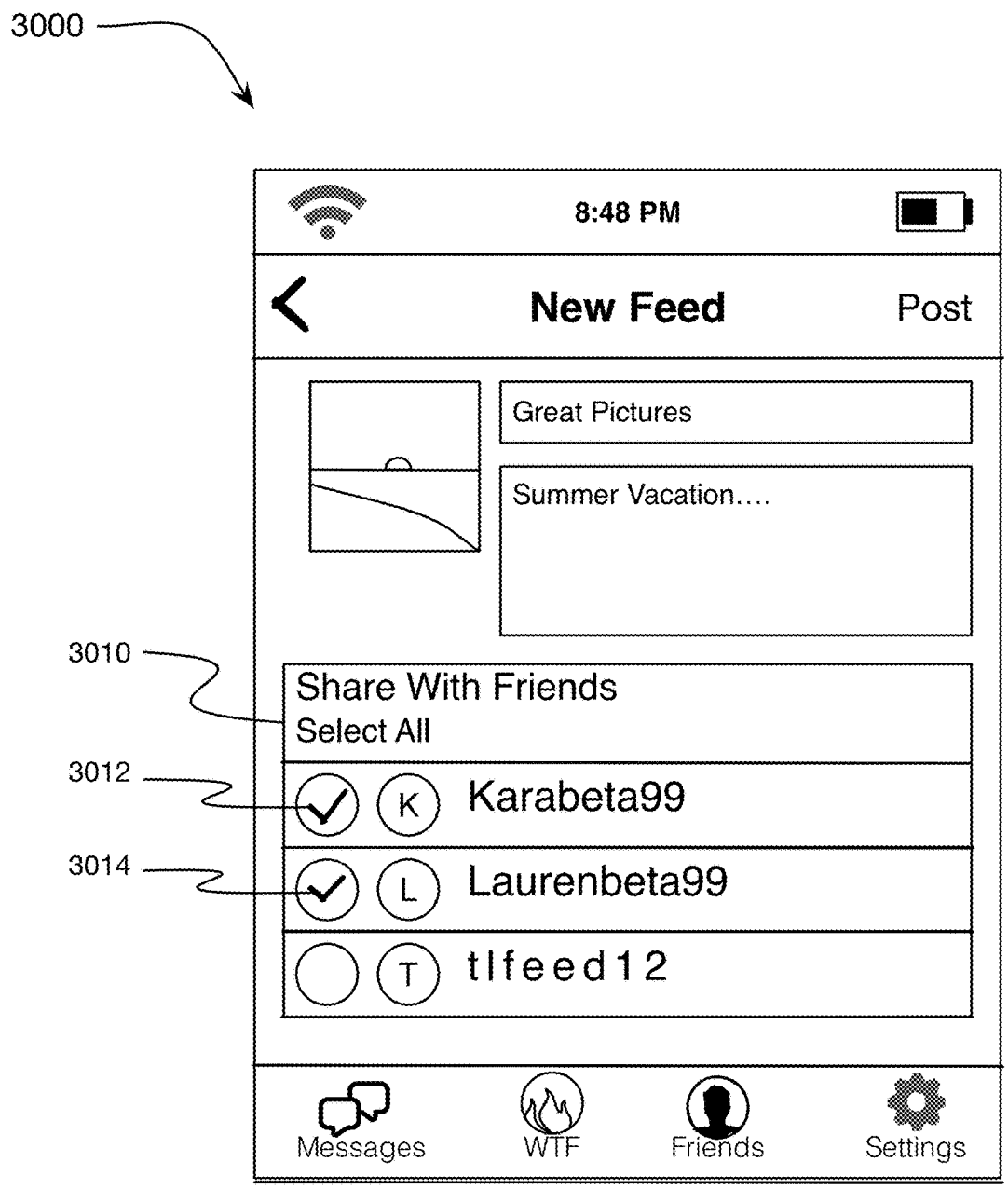
FIG. 30 illustrates a screen shot for adding friends to view the secure social feed according to one embodiment.

FIG. 30 illustrates an example of interface 3000 for selecting users to invite to view the secure social feed. Interface 3000 includes a "Share with Friends" field 3010 that allows the feed's administrator, Alice, to select users to view her secure social feed. Field 3010 may be populated by Alice's app's friend list. Alternatively, field 3010 may be populated by Alice's contact list located on her device or a social media site's friend list.

Alice may select users to share the secure social feed by selecting a check box located next to each user's name. For example, FIG. 30 illustrates check box 3012 and check box 3014 selected, thereby sharing the secure social feed with "Karabeta99" and "Laurenbeta99." As noted above, Alice's app will assign each of these names an alias and include the alias in the member list that is included in the feed file.

Figure 31A:
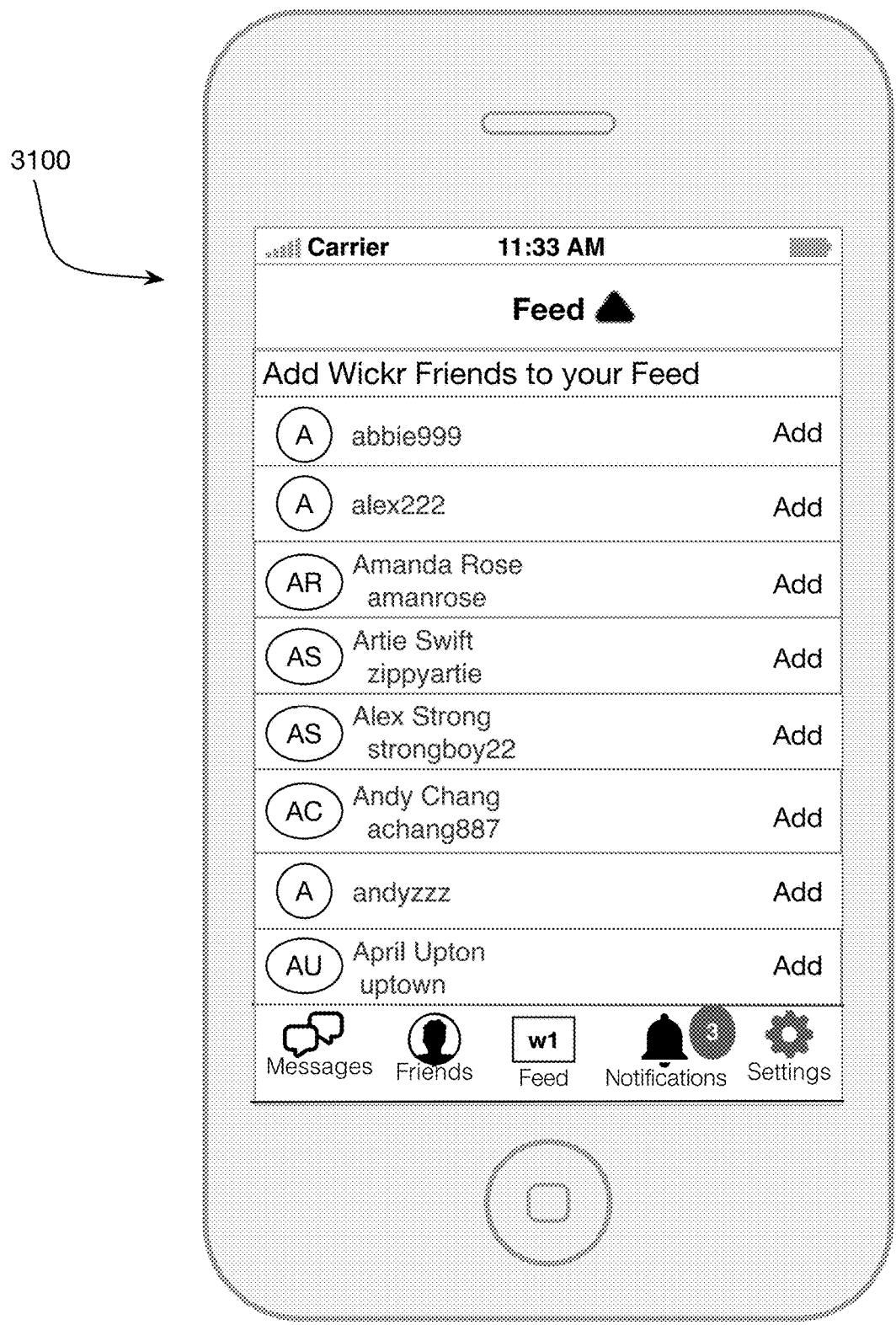
FIGS. 31A-31B illustrate a screen shot for adding friends to view the secure social feed according to another embodiment.
Figure 31B:
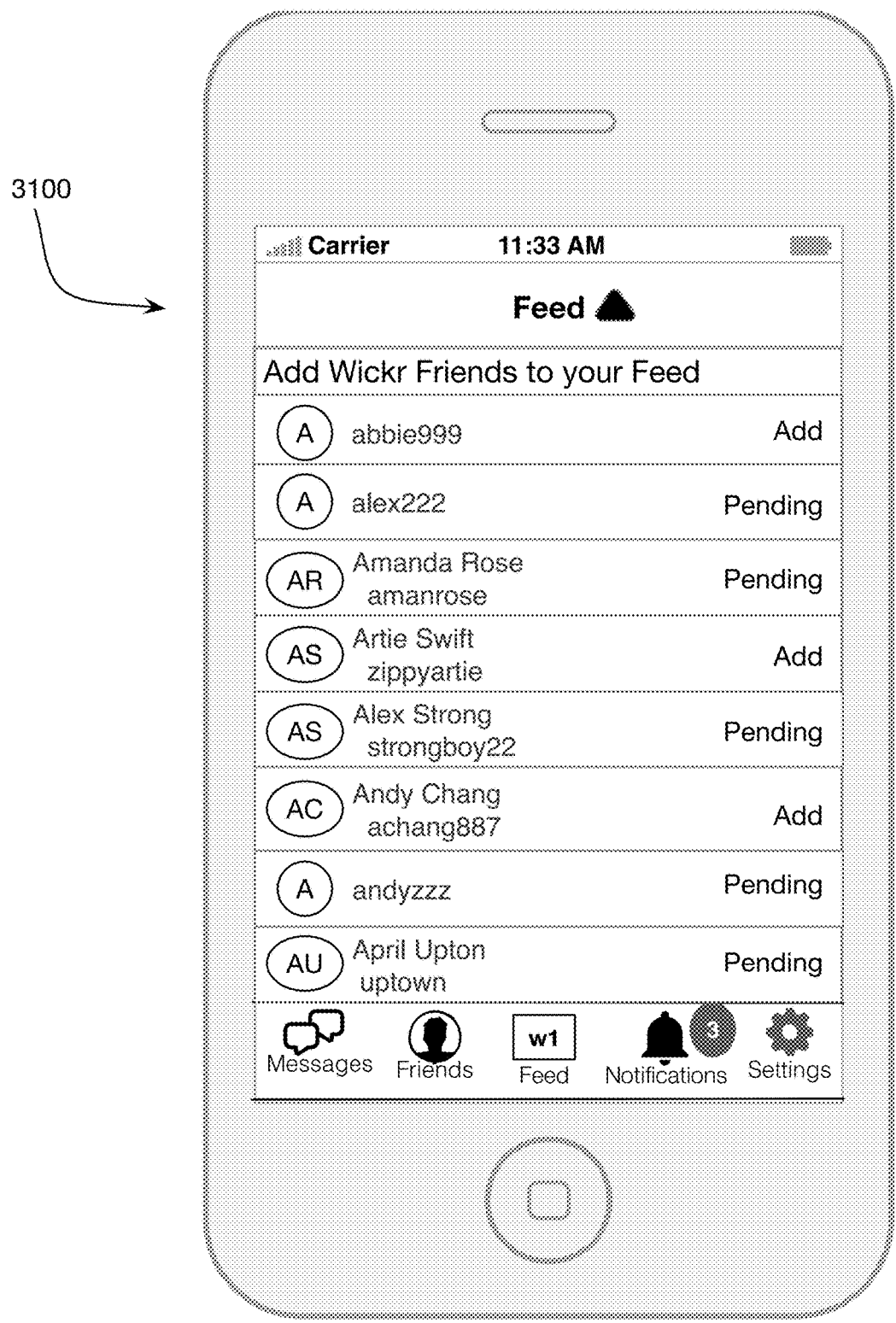

FIGS. 31A and 31B illustrate an interface 3100 for inviting users to view the secure social feed according to another embodiment. Similar to interface 3000, interface 3100 may be populated by Alice's app's friend list, her contact list, or her friend's list from a social media site. However, instead of selecting a checkbox, Alice may click an "Add" field to invite users to view her secure social feed.

FIG. 31B illustrates an example of interface 3100 after invitations have been sent to a subset of users. In particular, FIG. 31B illustrates how the app presents the status of the user's response to the feed invite. For example, feed invites have been sent to "alex222," "Amanda Rose," "Alex Strong," "andyzzz," and "April Uptown." However, none of those users have responded, thus interface 3100 reflects that their status is pending. Similarly, Alice may invite additional users at any by selecting the "Add" field.

Figure 32:
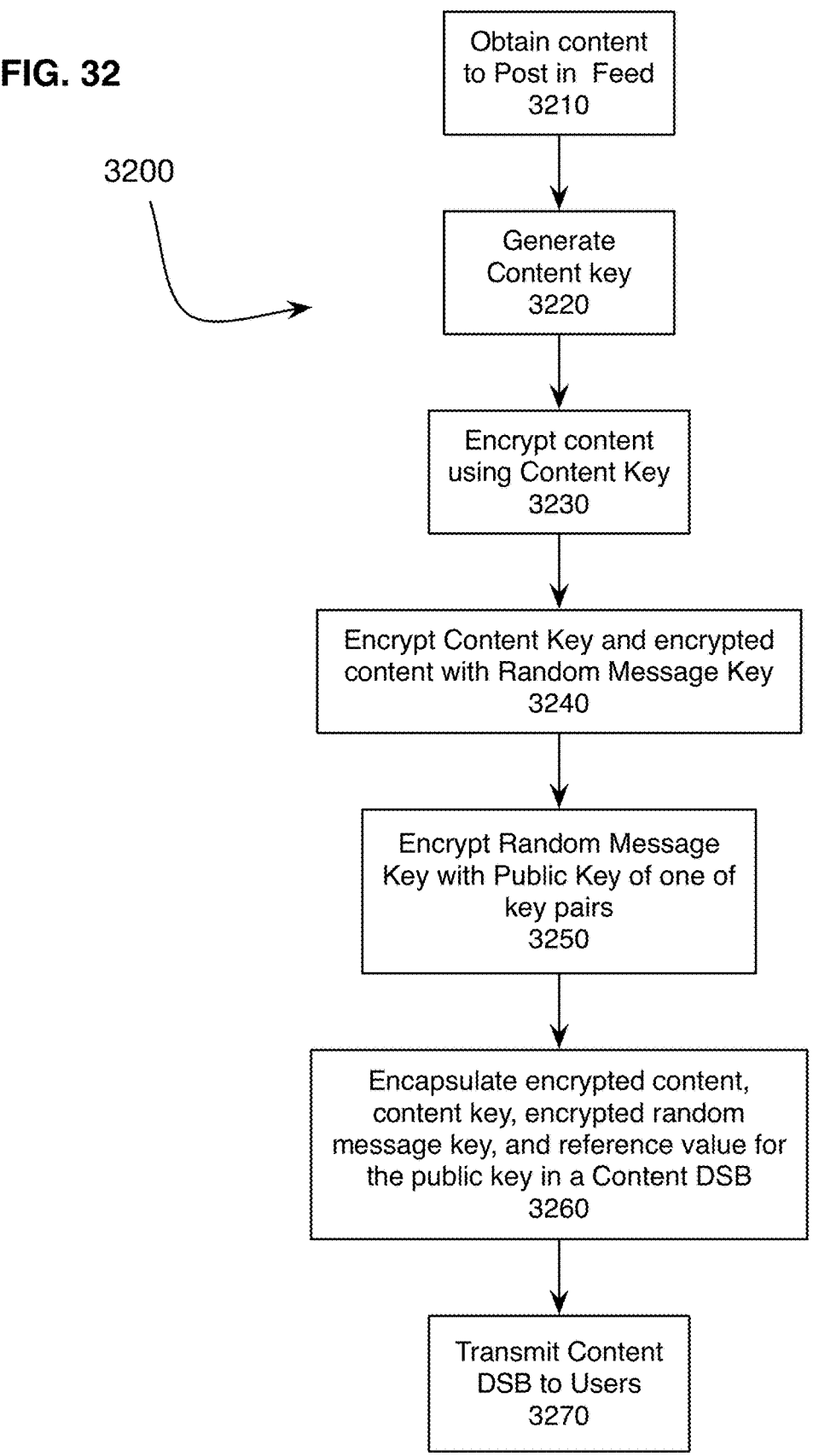
FIG. 32 illustrates a process for posting content to the secure social feed.

After creating the encrypted feed file and sending feed invites, Alice, or other users that Alice has permitted to post content, may begin sharing content via the secure social feed. FIG. 32 shows a process 3200 for posting content to a secure social feed.

In block 3210, Alice may obtain content to post to her secure social feed. The content may be obtained from the photo album on Alice's device. Alternatively, obtaining content may include capturing a picture or video. As will be shown in greater detail below, Alice's app may allow her to modify her content prior to posting it. Next, Alice's app may generate a content key in block 3220. As with previous keys, the content key is a random, 256-bit key generated by Alice's app.

In block 3230, Alice's app may encrypt the content using the content key. In preferred embodiments, the content is encrypted using the content key and AES; however, one of ordinary skill in the art would recognize that any suitable encryption algorithm could be used to protect Alice's content from being viewed by unauthorized users.

Alice's app may publish her encrypted content to the secure social feed. Publishing her content to the secure social feed begins in block 3240, where Alice's app prepares a content DSB. In particular, the content key and the encrypted content may be encrypted via AES with a random, 256-bit message key.

In block 3250, the random message key may be encrypted with one of the public keys from the cache of key pairs that Alice's app generated in process 2700. Alice's app may then encapsulate the encrypted content and content key, the encrypted random message key, and a reference value for the public key in a DSB. In block 3270, Alice's app transmits the content DSB to security platform 102.

While the process of posting content to a secure social feed has been described from the perspective of the feed creator, one of ordinary skill in the art would recognize that other users on the member list may post content to the secure social feed using process 3200.

Figure 33:
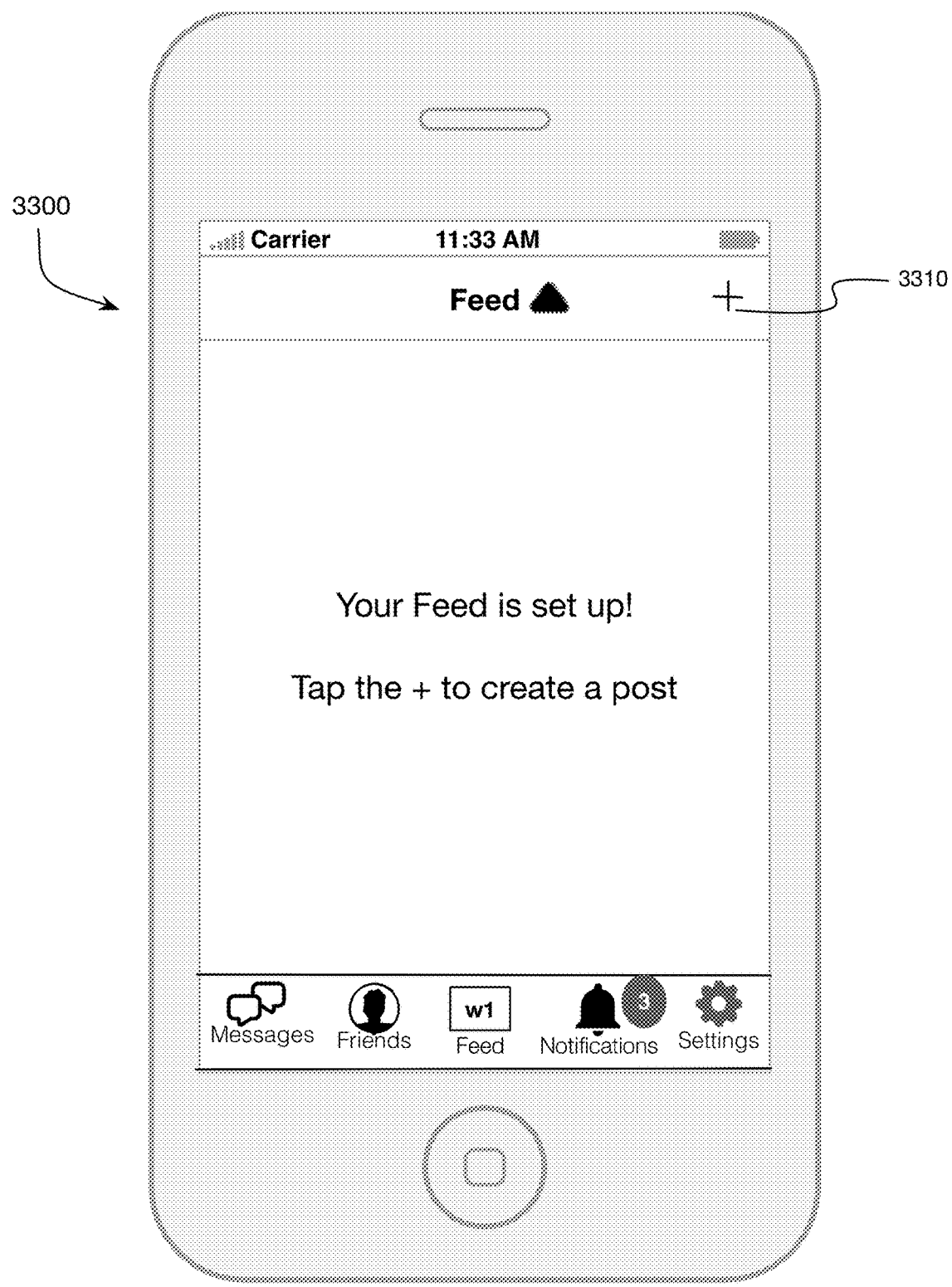
FIG. 33 illustrates an example of an interface for posting content to the secure social feed according to one embodiment.

Turning to FIG. 33, an interface 3300 for posting content to a secure social feed after it is created is shown. In particular, interface 3300 includes addition button 3310, which allows a user, such as Alice, to access content to post to his or her secure social feed. In this regard, addition button 3310 may prompt the user to select an existing photo or video from their photo album or capture a new photo or video using their device's built-in camera.

Figure 34A:
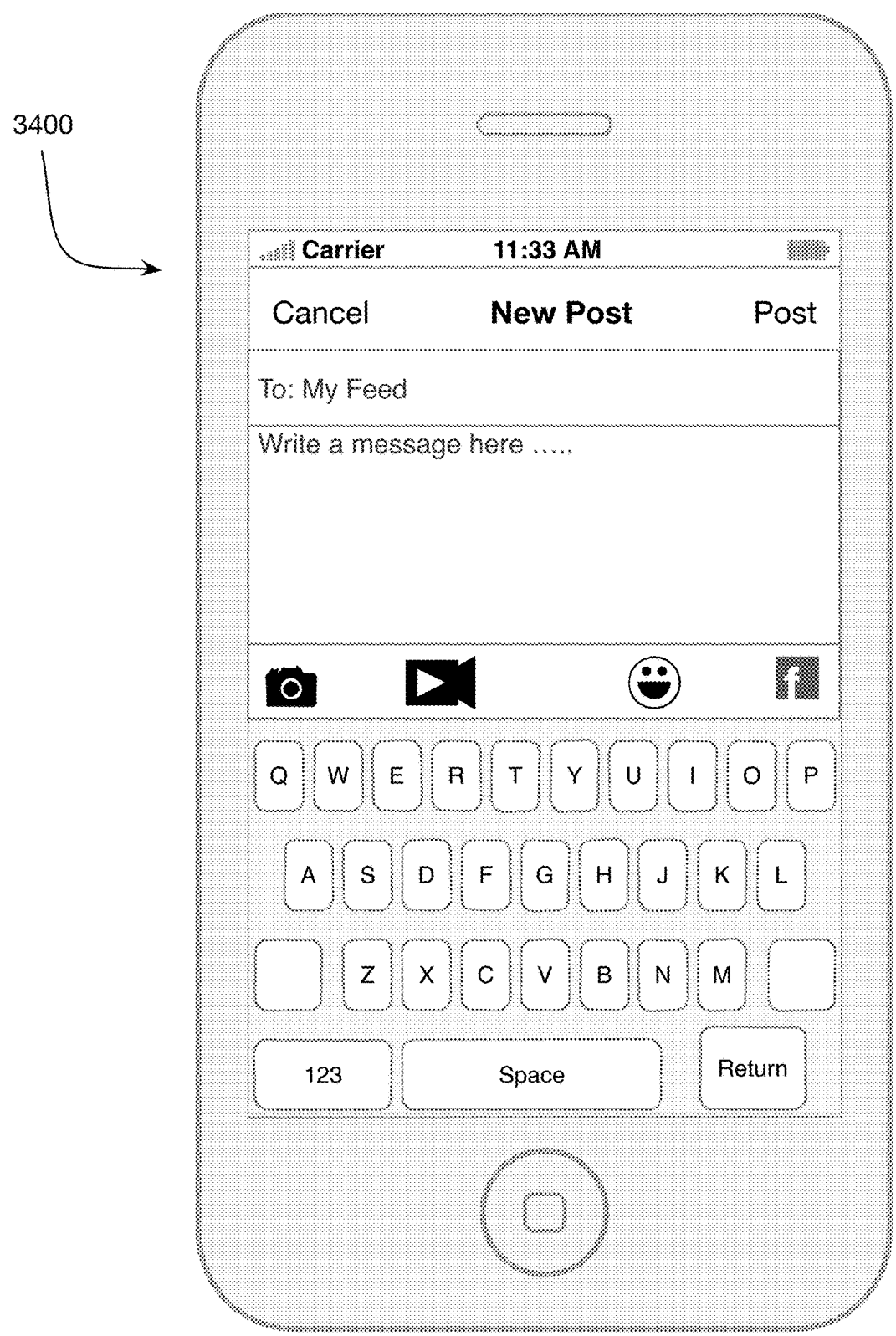
FIGS. 34A-34B illustrate another example for posting content to the secure social feed according to another embodiment.
Figure 34B:
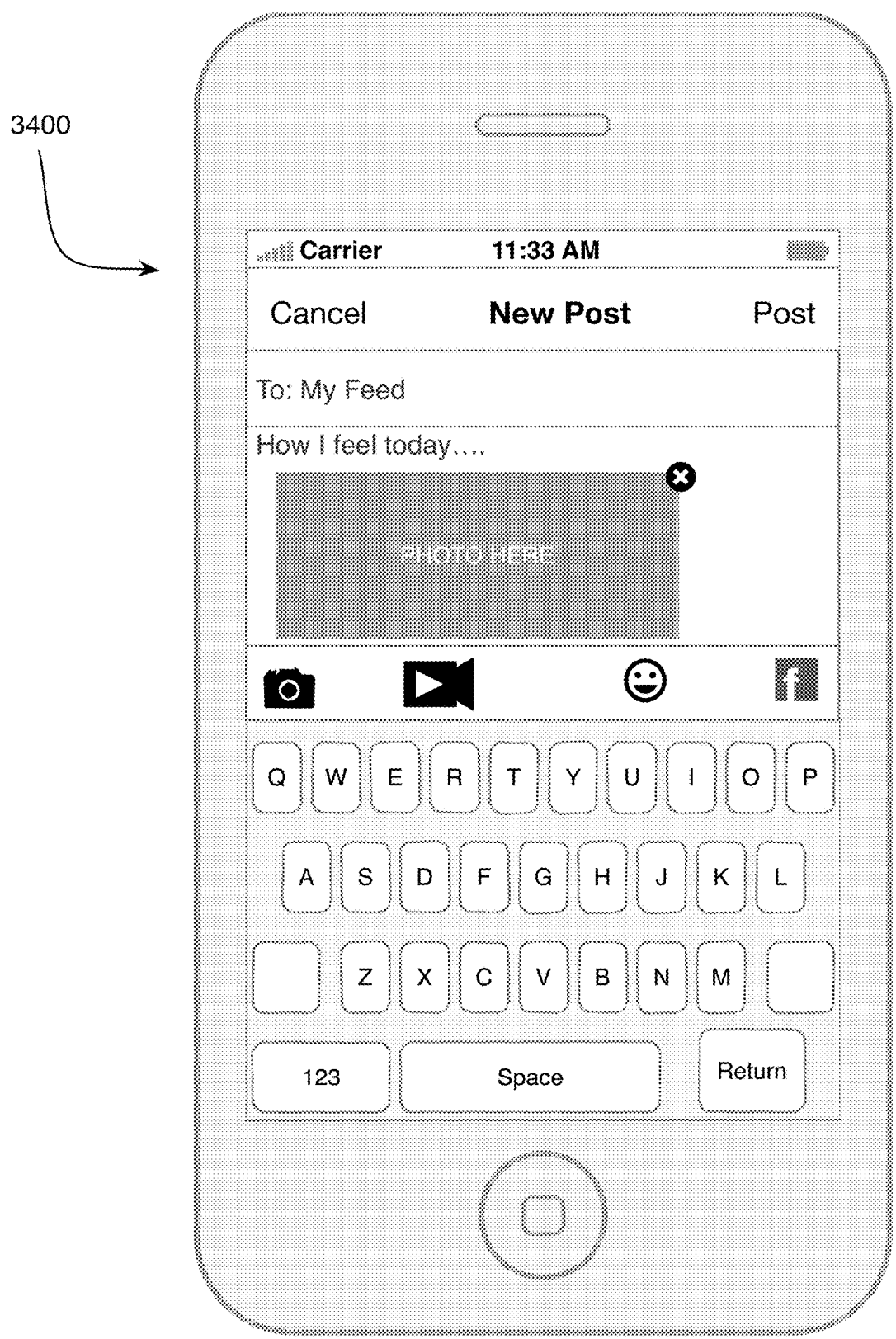

FIGS. 34A and 34B illustrate interface 3400 for posting content to a secure social feed according to another embodiment. In particular, interface 3400 shows how a user may post text, such as a status update, a description of the content, or an emoji. FIG. 34B illustrates a post that includes both text and content.

Figure 35:
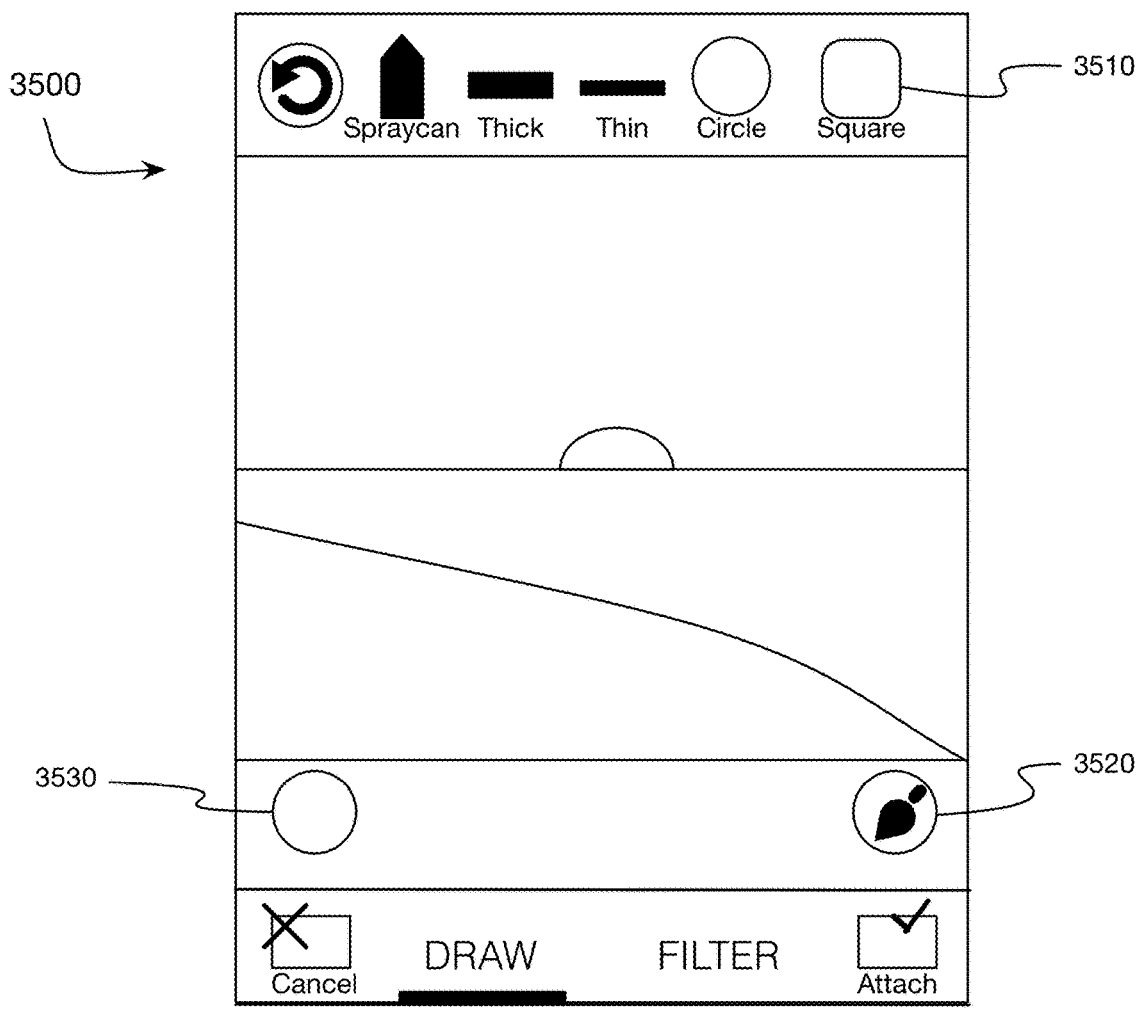
FIG. 35 illustrates an interface for modifying content prior to posting it on the secure social feed.

Turning to FIG. 35, an example of modifying content prior to it being posted to the user's secure social feed is shown. That is, interface 3500 provides a user the ability to modify the content. In particular, interface 3500 includes toolkit 3510 that includes an undo button, a spray can brush, a thick line, a thin line, a circle and a square. In this regard, a user may select one of the options in the toolkit 3510 to modify the content. For example, if a user were to select the circle from the toolkit, the user would be able to draw circles on the content.

Additionally, interface 3500 may include a brush selection option 3520 and a color palette option 3530. The brush selection option 3520 may allow the user to draw freehand on the content. Alternatively, the brush selection option 3520 may select the brush thickness for the option selected in the toolkit 3510. The color palette option 3530 may allow the user to select the color for their alterations.

Figure 36A:
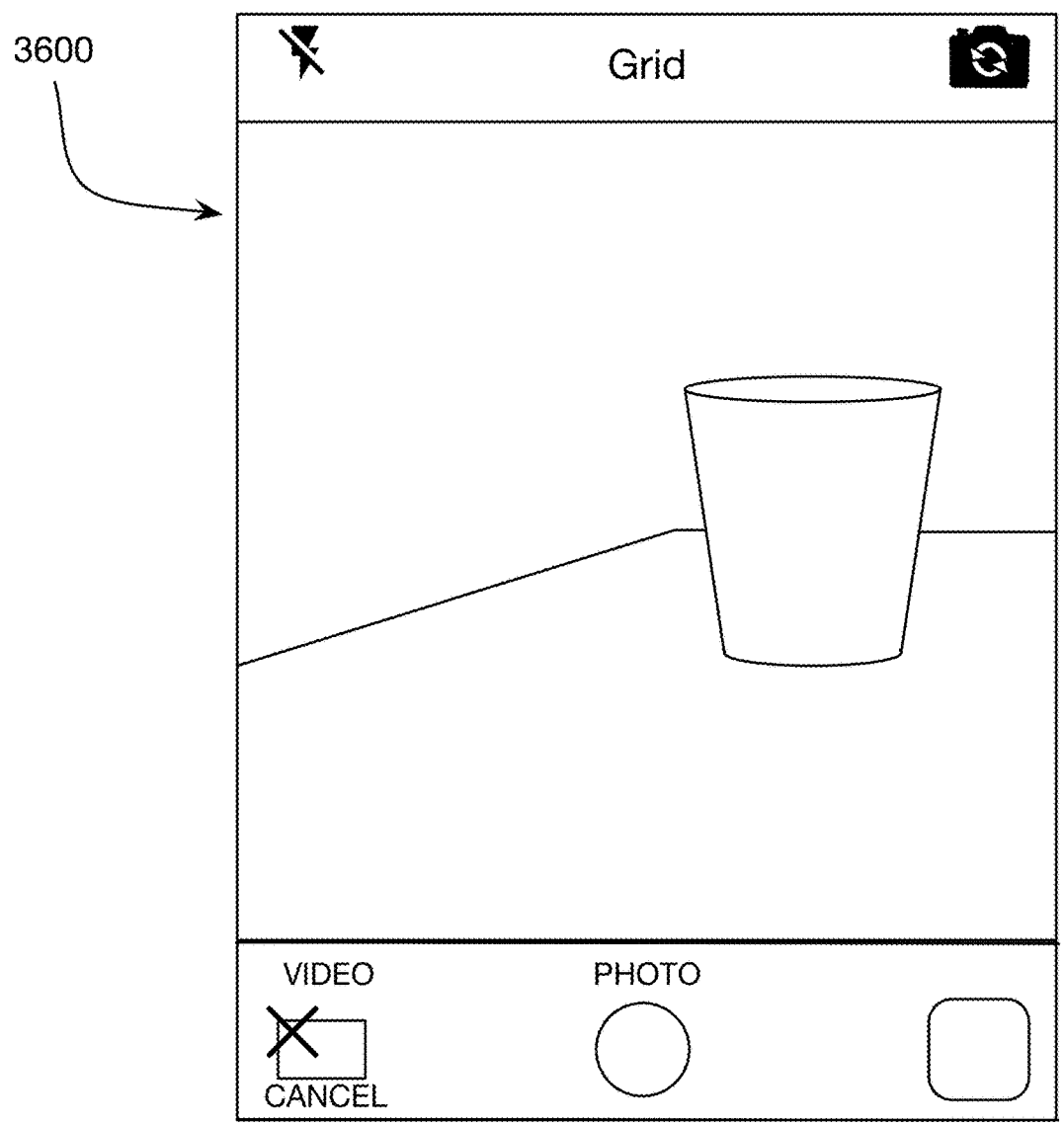
FIGS. 36A-36D illustrate interfaces to editing and posting content to a secure social feed and a social networking site.

FIGS. 36A-36D illustrate the lifecycle for posting content to the secure social feed, from content selection to actual publication. In particular, FIG. 36A shows interface 3600, in which a user has selected a picture of a cup to post to their secure social feed.

Figure 36B:
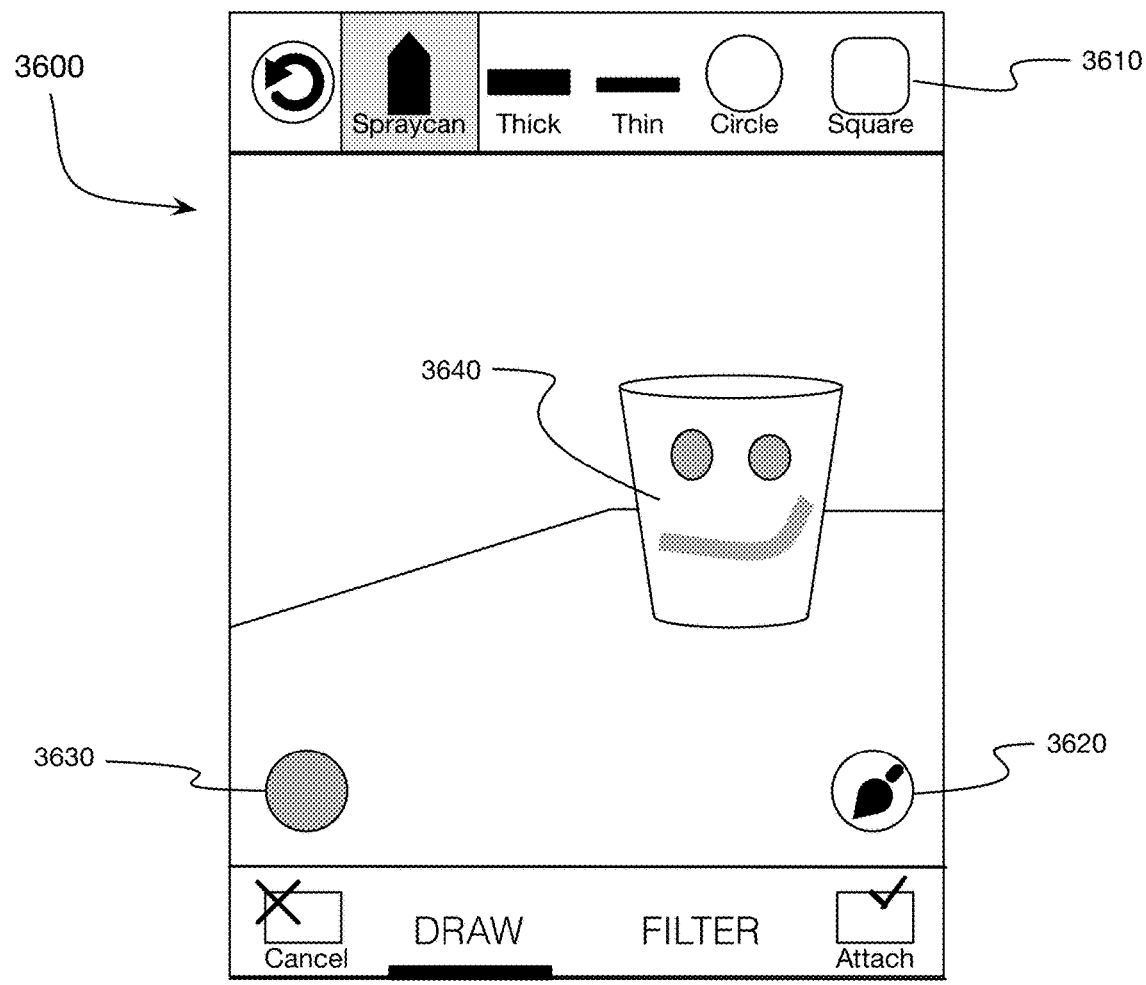

FIG. 36B illustrates interface 3600 with the options to modify the content. In particular, interface 3600 includes toolkit 3610, a brush selection option 3620, and a color palette option 3630. FIG. 36B shows that the user modified the cup by drawing smiley face 3640.

Figure 36C:
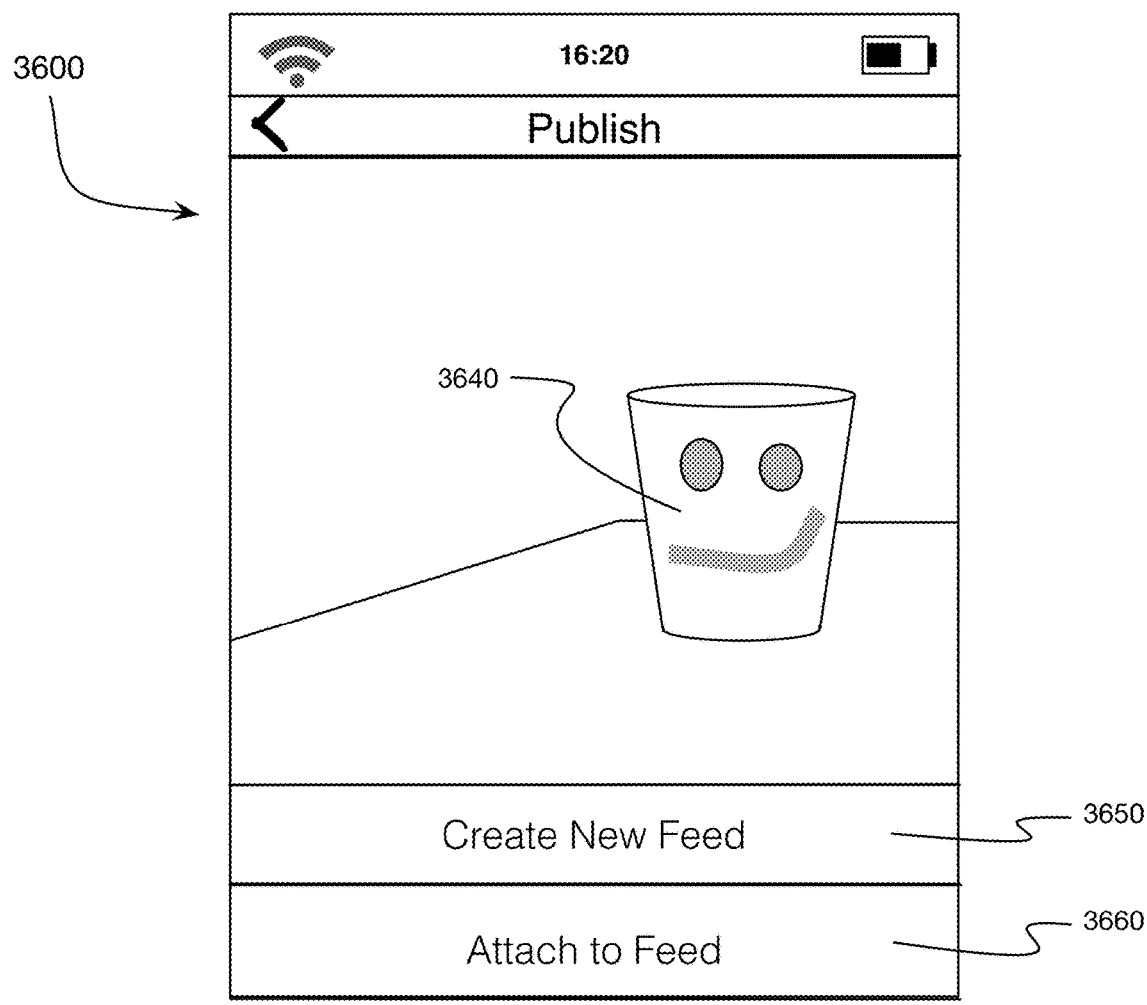

FIG. 36C illustrates interface 3600 after the user has finished modifying the content. Interface 3600 includes two options for the user: Create New Feed 3650 or Attach to Feed 3660. The Create New Feed Option 3650 would allow the user to create a new secure social feed as described above with respect to process 2700. Alternatively, the Attach to Feed Option 3660 would allow the user to attach the content to an existing secure social feed.

Figure 36D:
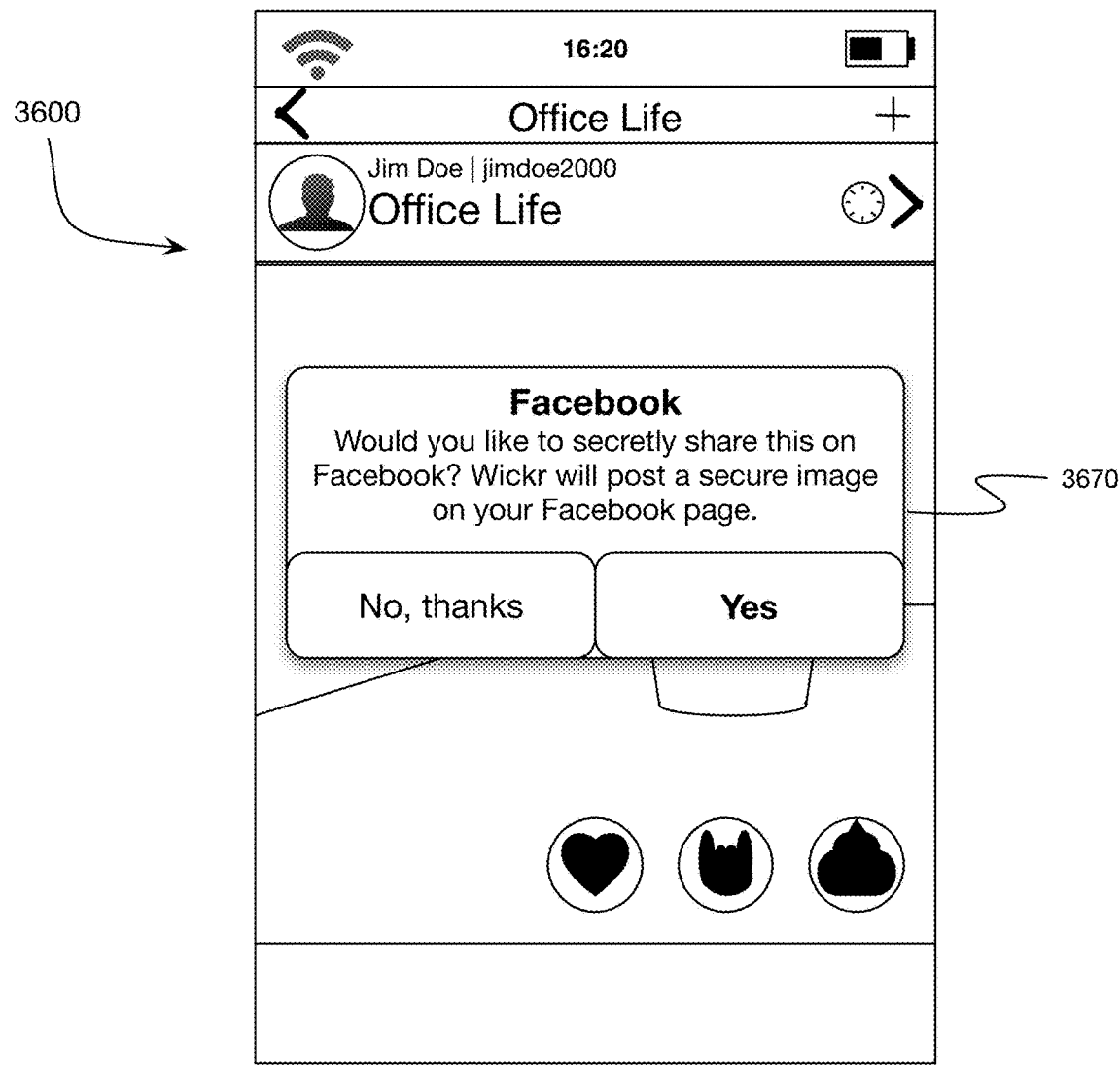

FIG. 36D shows interface 3600 inquiring whether a user wants to post the content to one of their social media accounts, such as Facebook or Twitter. In particular, interface 3600 includes dialogue box 3670 that inquires whether the user wishes to share the content on their Facebook page. If the user selects no, then the content is only shared through the user's secure message app.

However, if the user selects yes, the encrypted content may be posted to the user's social media account. In particular, the secure messaging app may connect to the user's social media account through various APIs to share the encrypted content. In this regard, a decoy image may be posted to the user's social media account. Users that have the secure messaging app installed either on their device or in their social media account may be able to decrypt the content and view the content, while users that do not have the secure messaging app will only be able to see the decoy image. Alternatively, a decoy image that includes a URL, or a similar link, may be posted to the user's social media account. The URL may connect users to the secure messaging app for them to view the posted content. Accordingly, users with the secure messaging app that are included in the member list will be able to view the user's content via the secure message app.

Figure 37:
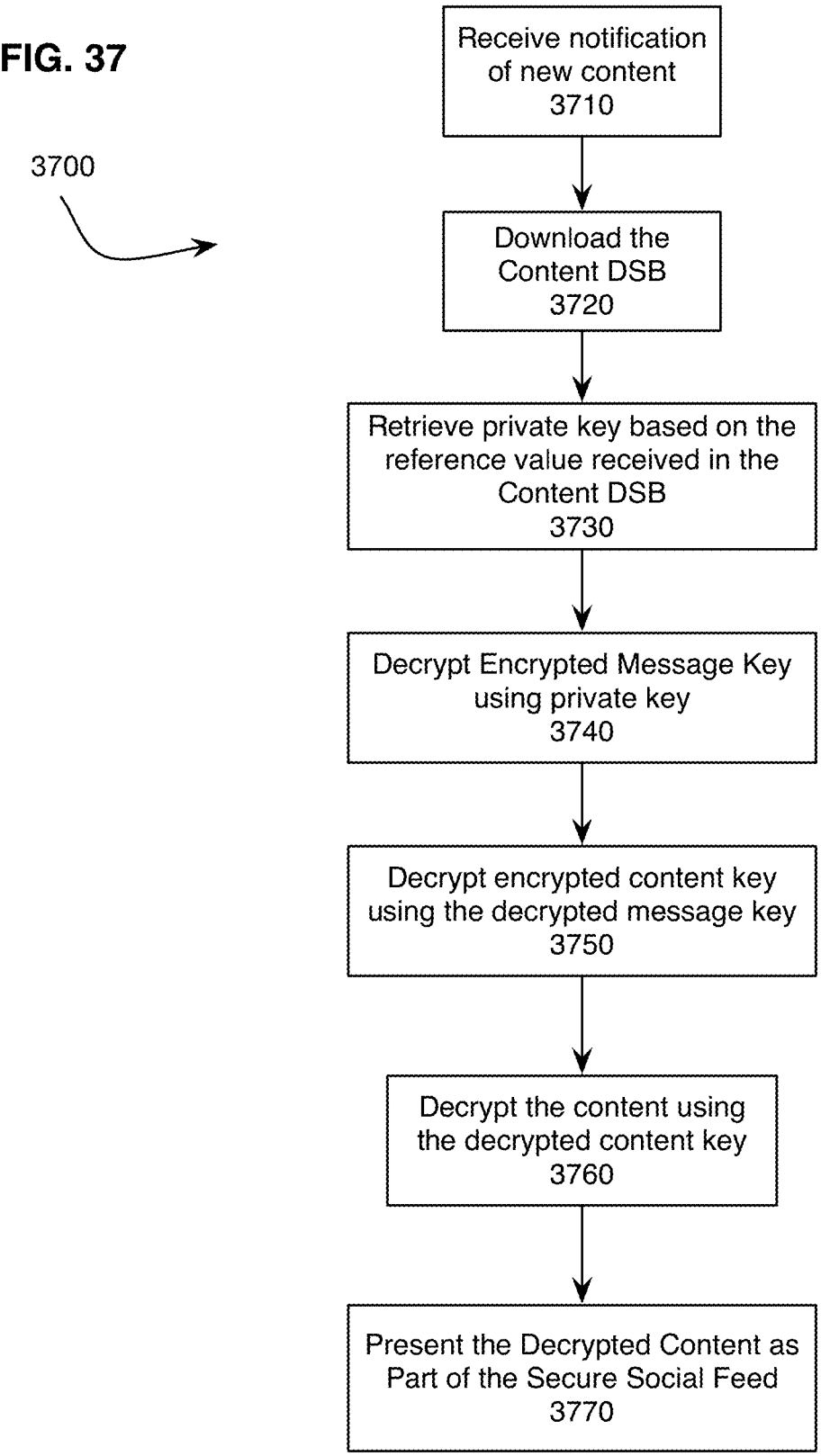
FIG. 37 illustrates a process for viewing content posted to a secure social feed.

FIG. 37 shows a process 3700 for viewing content posted to a secure social feed. The process begins in block 3710, when the invitee receives notification that a user has posted content to the secure social feed. In preferred embodiments, the invitee's app may use the dynamic ID received in the feed file to poll the security platform to determine whether any new content has been posted to the secure social feed. In some embodiments, the invitee's app may ping inactive feeds periodically to determine whether any new content has been posted or an updated feed file and feed key have been issued. Further, the invitee's app may ping the secure social feeds for which the user is a member to determine whether the user's status with the secure social feed has changed. Alternatively, the security platform may provide a push notification to all invitees' devices that appear in the member list.

In block 3720, the invitee's app may download the content DSB from the security platform 102. The invitee's app may parse the content DSB to obtain the reference value for the ECC public key used to encrypt the Random Message Key. In block 3730, the invitee's app may retrieve the corresponding private key from the cache of private keys received in the feed file based on the reference value obtained from the content DSB.

In block 3740, the invitee's app decrypts the encrypted message key using the retrieved private key. The message key is then used to decrypt the encrypted content key in block 3750. In block 3760, the content key decrypts the content. Finally, in block 3770, the decrypted content is presented to the invitee as part of the secure social feed.

In preferred embodiments, the decrypted content is available to invitees for a predetermined amount of time. Typically, the predetermined amount of time is 24 hours from when the user posts the content, regardless of when the invitee first accessed the content. According to some embodiments, the predetermined amount of time may be adjusted by the content poster. After the predetermined amount of time has elapsed, the invitee's app may delete the content from the invitee's device.

If the invitee cannot access the content, the invitee may ping the security platform and/or the administrator to determine whether the invitee has the most up-to-date feed file. If it is determined that the invitee does not have the most recent feed file, the security platform or administrator may provide the invitee with the most up-to-date feed file as long as the invitee has not either rejected the administrator's invitation or been removed by the administrator.

If the invitee has the most up-to-date feed file, then the invitee may request help. For example, the invitee may not be able to decrypt the feed file or access the content. In preferred embodiments, requesting help may include setting a status flag to "help." The "help" status may be conveyed to the administrator and/or the security platform. The "help" status may be stored in the member list as described above. If the invitee's status in the member list indicates that they were removed by administrator, then the administrator and/or security platform ignore the invitee's request. However, if the invitee has not been removed by the administrator or otherwise declined the invitation, the administrator and/or security platform may provide the invitee with updated information, including the most recent feed key, the encrypted feed file, or any combination of the information contained therein.

Figure 38A:
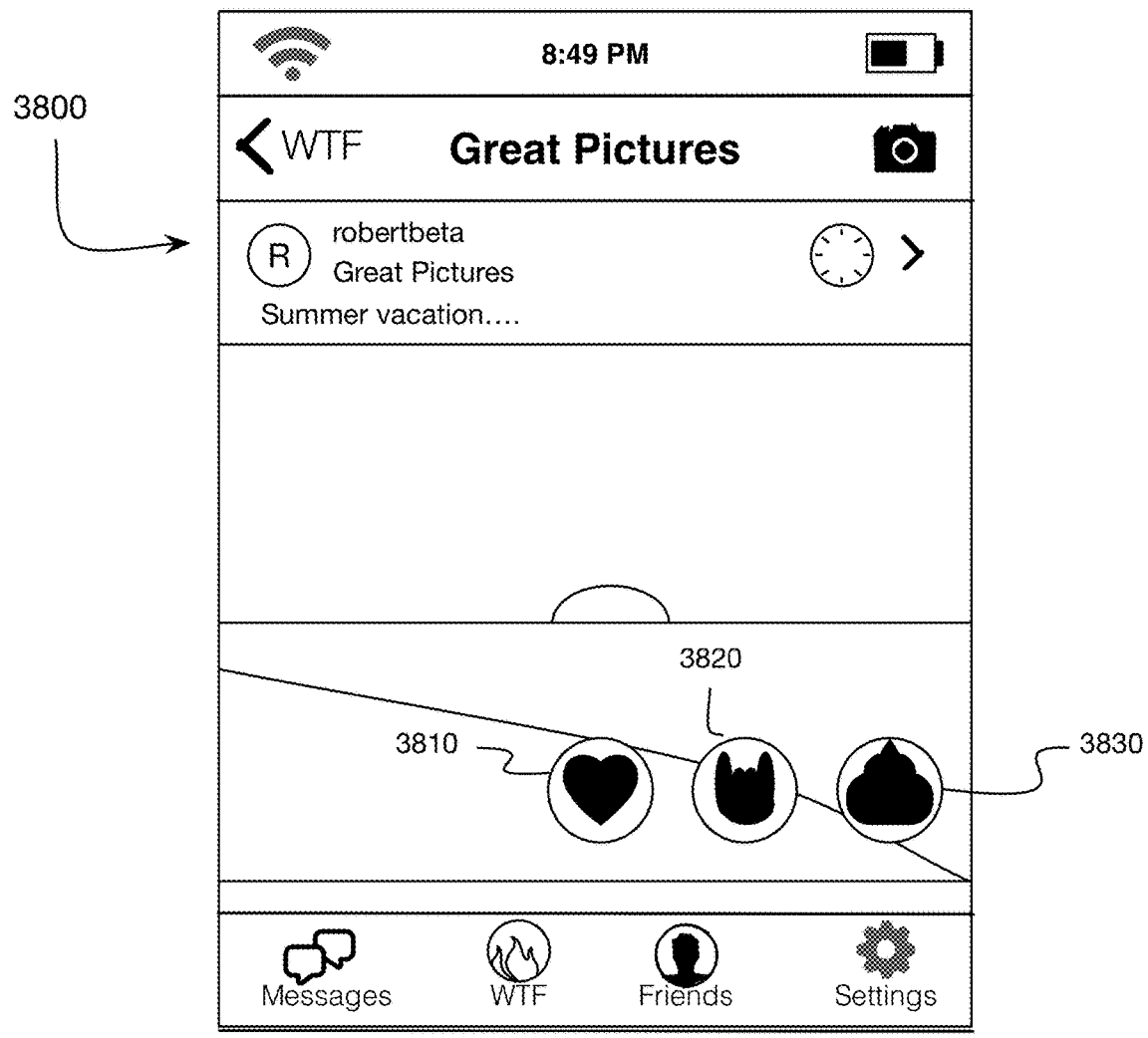
FIGS. 38A and 38B illustrate an example of an interface for viewing content posted to a secure social feed according to one embodiment.
Figure 38B:
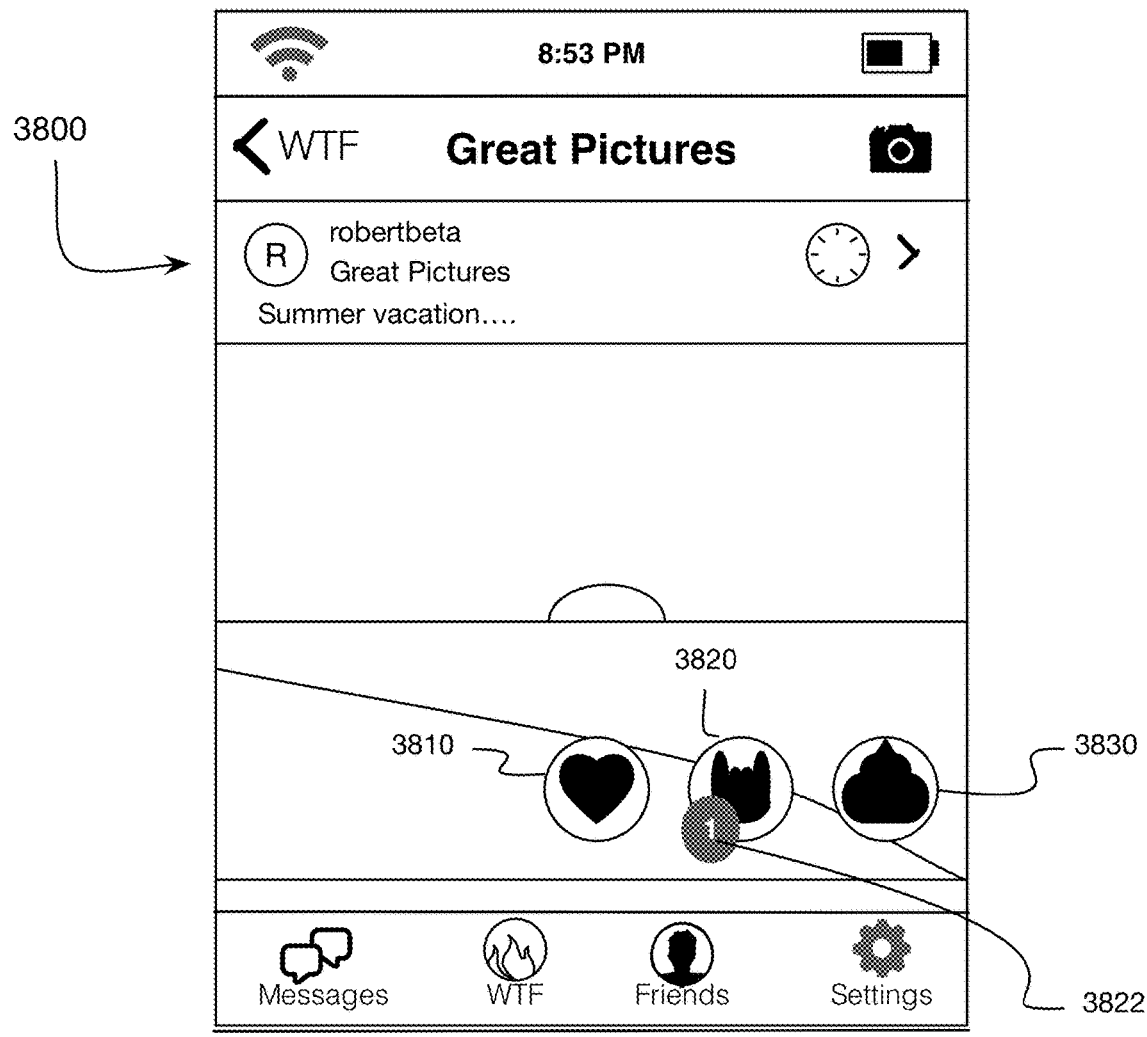

Turning to FIGS. 38A and 38B, an example of interface 3800 is shown for displaying content in a secure social feed. In this regard, the content may be displayed along with the user's name or username and a description of the content.

According to some embodiments, interface 3800 may include a number of rating buttons that allow members of the secure social feed to provide feedback on the posted content. In the embodiment shown in FIGS. 38A and 38B, interface 3800 includes three rating buttons: "Love It" button 3810, "Rock It" button 3820, and "Poop It" button 3830. By merely tapping one of the rating buttons, feedback may be provided to the content poster.

For example, FIG. 38B illustrates an embodiment of feedback received for the posted content. In particular, a notification icon, such as icon 3822, may appear on the associated rating button to indicate other users' feedback on the posted content. For example, FIG. 38B illustrates that one user has rated the content as "Rock It." Accordingly, notification icon 3822 appears on the "Rock It" button to show how many members of the secure social feed have selected the rating button. In some embodiments, the notification icons may be updated in real-time or near real-time.

Figure 39:
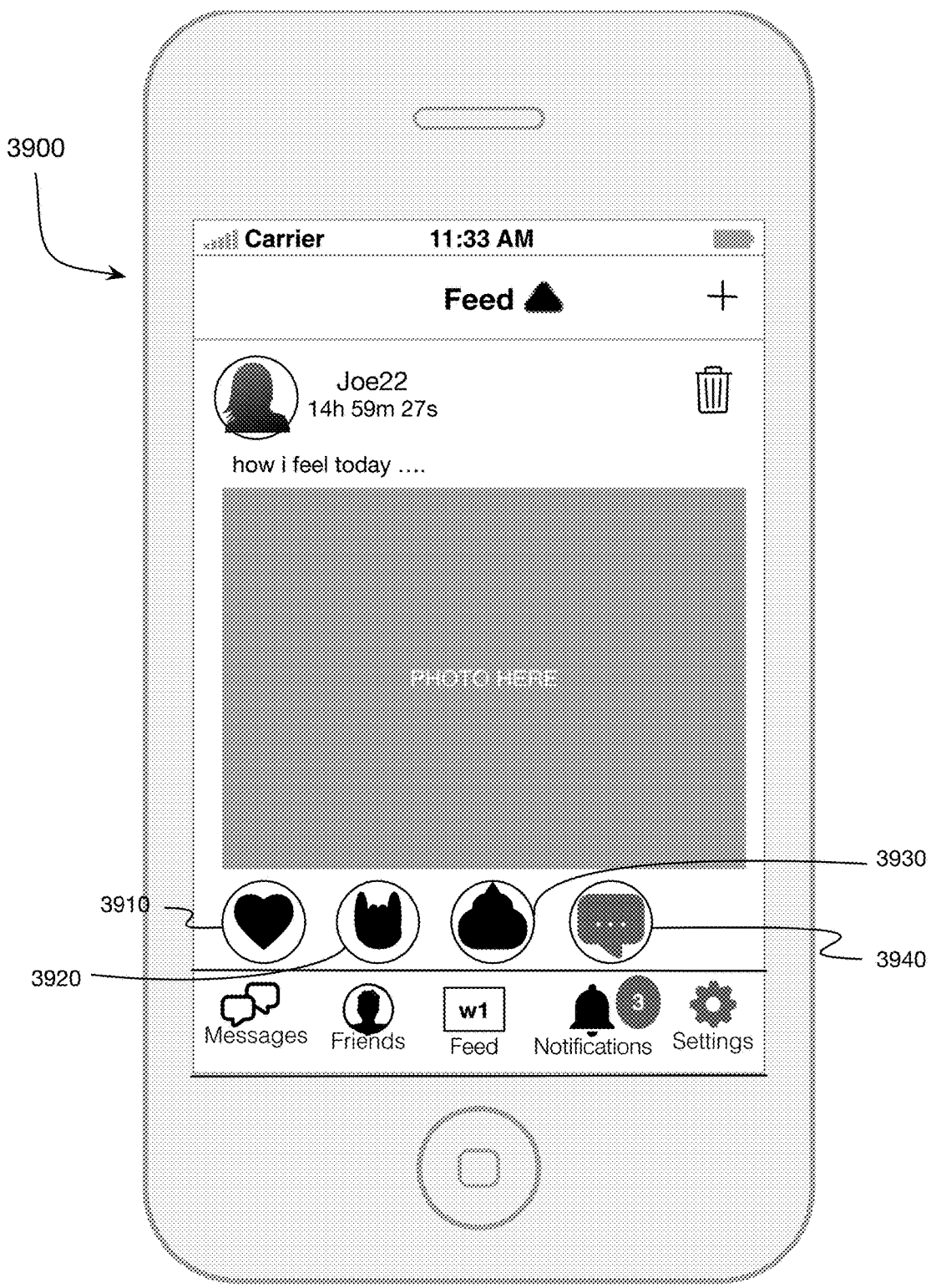
FIG. 39 illustrates another example of an interface for viewing content posted to a secure social feed.

FIG. 39 shows an interface 3900 for displaying a secure social feed according to another embodiment of the disclosure. Similar to interface 3800, interface 3900 includes the content along with the user's name or username, a description of the content, and three rating buttons. Additionally, interface 3900 has a comment button 3940. As discussed above, the administrator may allow members of the secure social feed to comment on the content or communicate with other members of the feed. Comment button 3940 may enable members to comment on the posted content. Alternatively, or additionally, the comment button 3940 may allow members of the feed to peruse comments left by other members of the feed.

Figure 40:
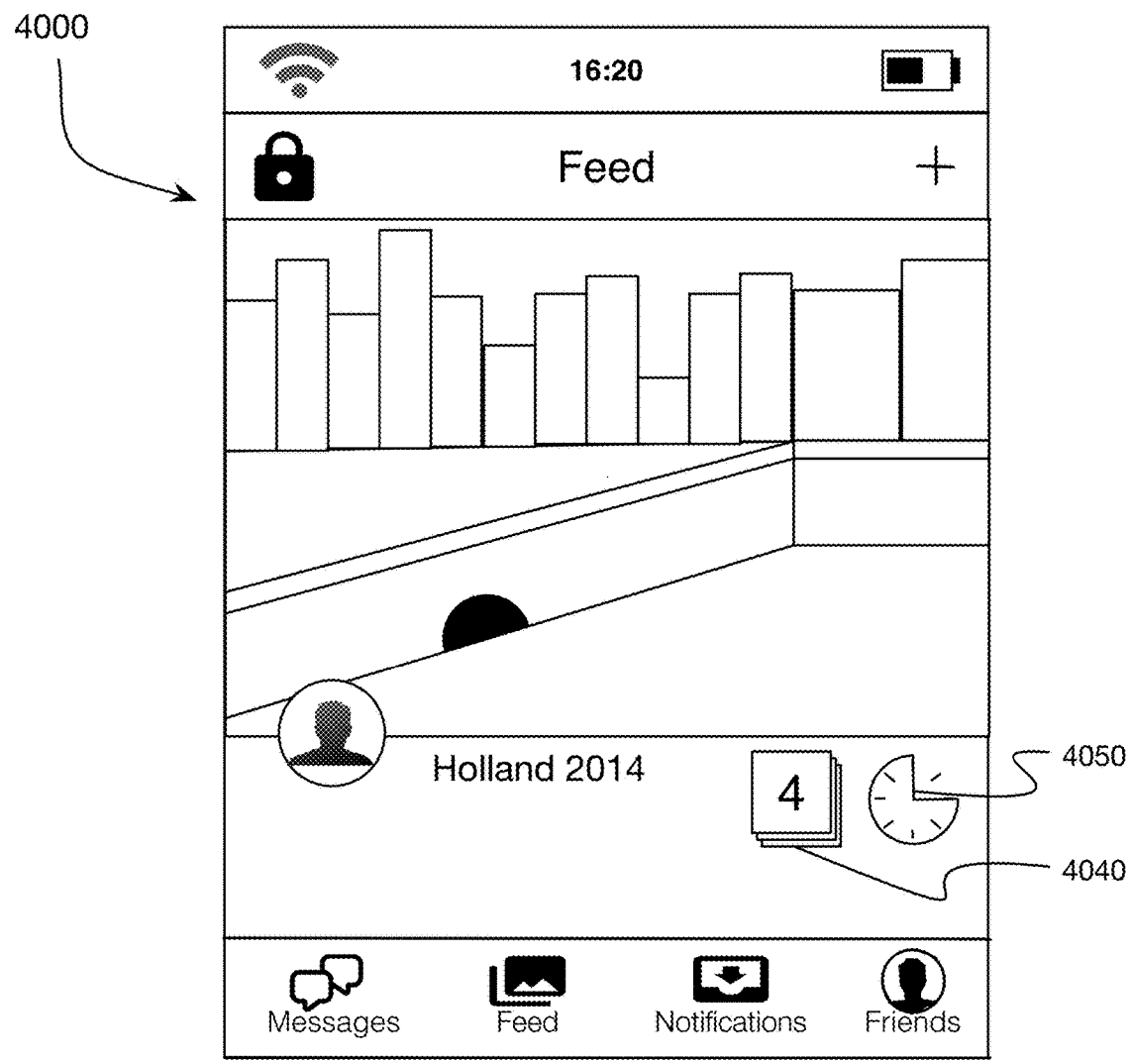
FIG. 40 illustrates an example of an interface for viewing content posted to a secure social feed according to yet another embodiment.

FIG. 40 shows interface 4000 for displaying a secure social feed according to yet another embodiment of the disclosure. According to this embodiment, interface 4000 may display content posted by a content creator in a feed type form that allows members of the feed to scroll through all the content posted by the administrator. Below each posted content, a Comment Button 4040 and a Time Remaining Display 4050 may be displayed. In this regard, Comment Button 4040 is similar to Comment Button 3940 described above. The Time Remaining Display 4050 may convey to members of the feed how much longer the content will be available. That is, the Time Remaining Display 4050 may convey the time remaining that members can view the content before it expires from the secure social feed. After the content expires, it will be removed from the secure social feed such that it will no longer be viewable.

Figure 41:
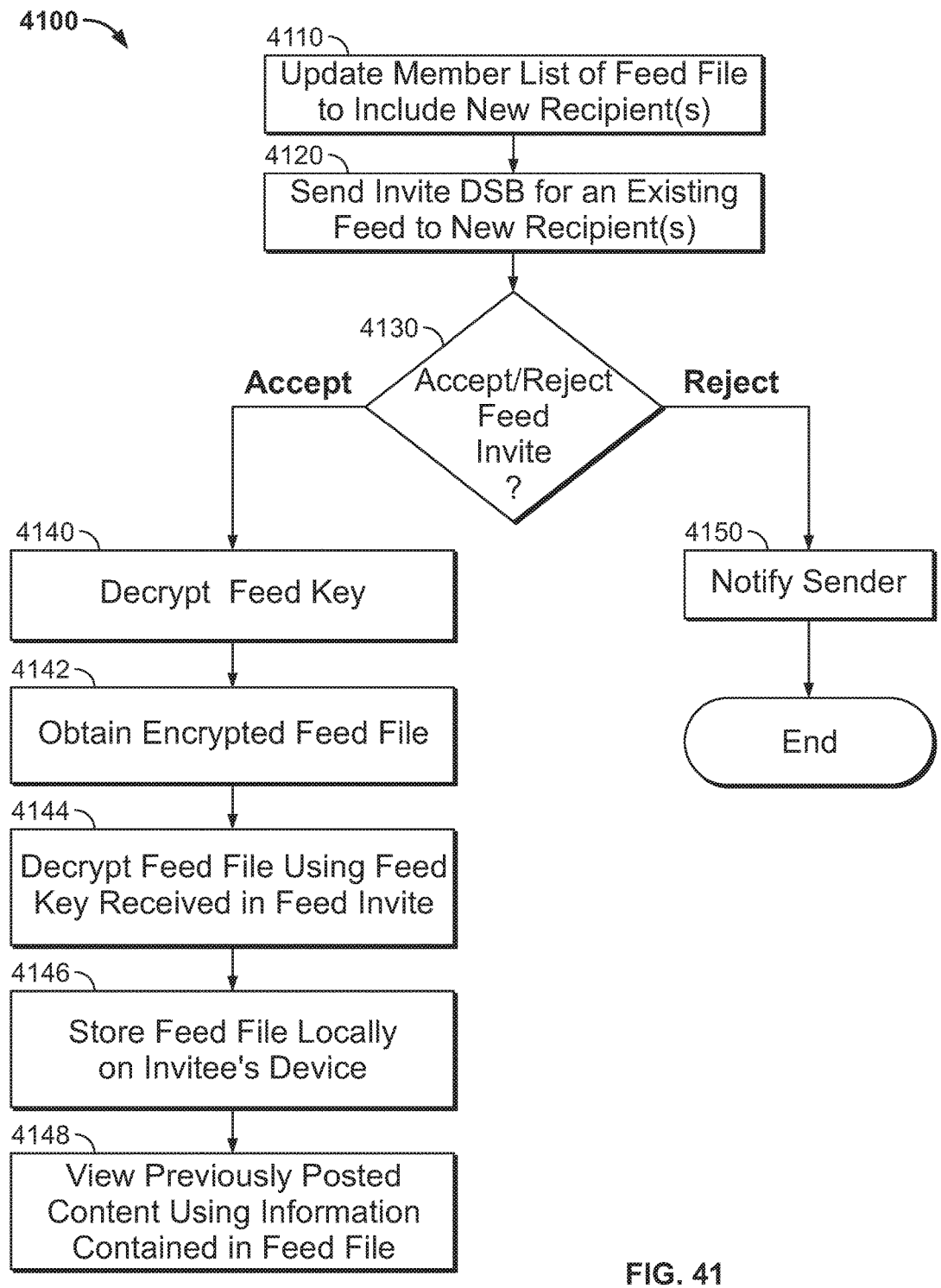
FIG. 41 illustrates a method for adding a user to an existing secure social feed.

According to some embodiments, the secure social feed creator or administrator may invite additional users to view their feed after posting content to the feed. FIG. 41 illustrates a process 4100 for adding members to an existing secure social feed. In block 4110, the administrator may update the member list of the feed file to include the new members. The dynamic ID of the feed file may not be updated when inviting new members to the secure social feed. In this regard, the dynamic ID and the feed key may only be updated when users have access to the feed key by either receiving and declining a feed invite or after leaving the secure social feed.

In block 4120, the administrator's app may send an invitation to the new members of the group. As previously discussed, the invitation may be a standard DSB sent from the administrator's app or security platform 102 to each user on the member list. The invitation may include the feed definition—including the static ID and dynamic IDs; the member list; and the feed key.

In block 4130, the new invitee may respond to the feed invite. If the user rejects the invite (e.g., decline invite or no-reply), the administrator is notified in block 4150. Accordingly, the administrator will recreate the feed file so that the invitee does not have access to the feed key.

However, if the new invitee accepts the feed invite, the new invitee decrypts the feed key in block 4140. In block 4142, the new invitee's app uses the received static ID and dynamic ID received in the feed invite to obtain the encrypted feed file from the security platform.

In block 4144, the new invitee's app may decrypt the received feed file using the feed key from the invite. In block 4146, the new invitee's app may store the decrypted feed file on the invitee's device. In particular, the new invitee stores the cache of private keys received in the feed file. In this regard, the cache of private keys may include all unused keys and used keys that are less than 24 hours old in order for the new invitee to access previously posted content. In block 4148, the new invitee uses information from the feed file to view previously posted content that has not expired. Accordingly, the security platform may provide the content DSB to the new invitee. Using the information contained in the feed file, the new invitee's app decrypts the content DSB to view previously posted content.

Figure 42:
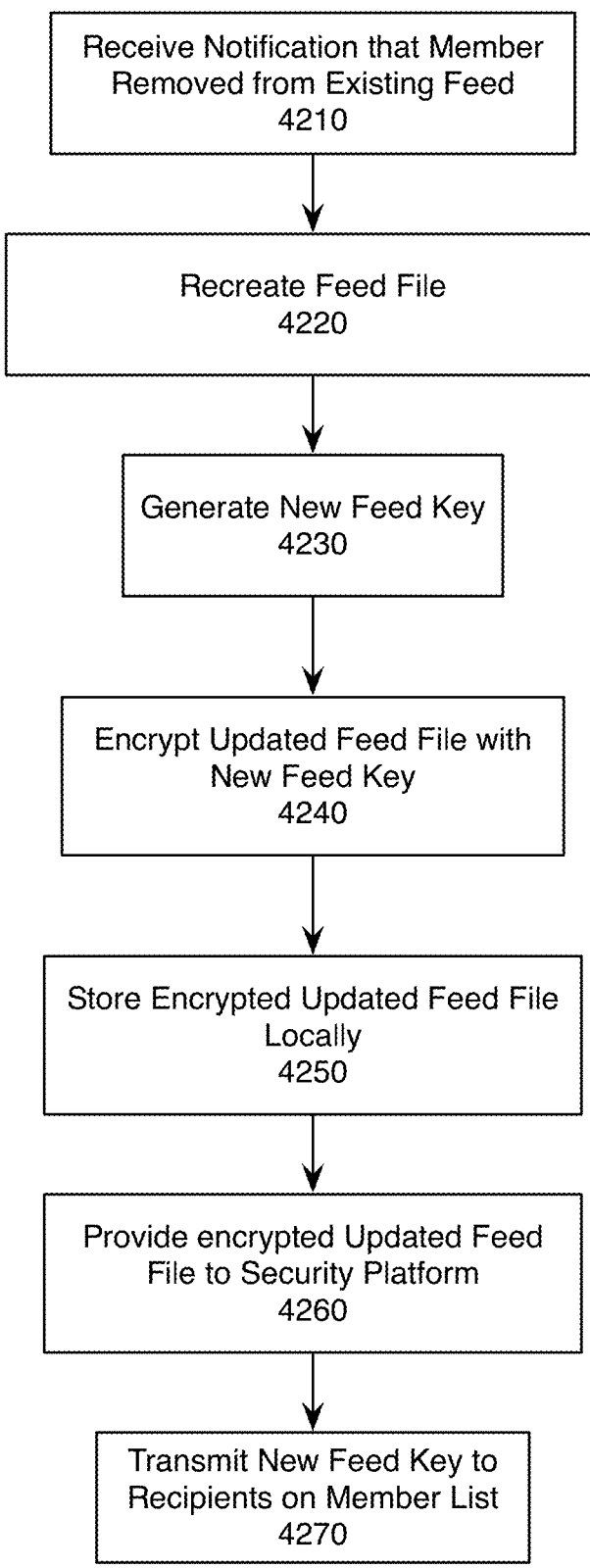
FIG. 42 illustrates a process for removing a user from an existing secure social feed.

Additionally, the administrator may have to remove users from their feed. FIG. 42 illustrates a process 4200 for removing users from the secure social feed.

In block 4210, the administrator may receive notification that a member has been removed from an existing secure social feed. The notification may be due to the administrator removing the member from the secure social feed. Alternatively, the member may opt to leave the secure social feed. In this regard, the member's app may provide notification to the administrator that the member is opting to leave the secure social feed.

Based on the notification that a user has left the secure social feed, the administrator's app may recreate the feed file in block 4220. Recreating the feed file may include generating a new dynamic ID and updating the member list. Additionally, the administrator's app may update the feed definition to include the previous dynamic ID. The new dynamic ID may prevent users that have left the secure social feed from viewing the secure social feed since they no longer have the correct dynamic ID to access the secure social feed. Further, the security platform may use the feed definition to block users who try to access a secure social feed using an older dynamic ID.

Next, the administrator's app may generate a new feed key in block 4230. The new feed key ensures that removed members may not access the feed file to view newly posted content if the removed members are able to discover the dynamic ID. In this regard, the old feed file and feed key ensure that removed members may only view previously posted content, and not newly posted content.

In block 4240, the administrator's app may encrypt the new feed file with the new feed key. Similar to the discussion above, the feed file may be encrypted via AES256.

After encrypting the new feed file, it may be stored locally on the administrator's device in block 4250. In block 4260, the administrator's app may be provided to the users included on the member list. For example, the encrypted new feed file may be provided to the security platform 102 so that members of the secure social feed can access the new feed file. Alternatively, the administrator may send the new feed file to users on the member list via a standard message.

Finally, in block 4270, the new feed key is transmitted to users included in the member list. As noted above, the new feed key may be transmitted from the administrator's device via a standard DSB when the member list is below a certain number of users (e.g., 150). When the number of users on the member list exceeds the certain number, the security platform may perform the ECDH key exchange with each user to compose and send the DSB with the new feed key to each user on the member list.

Figure 43A:
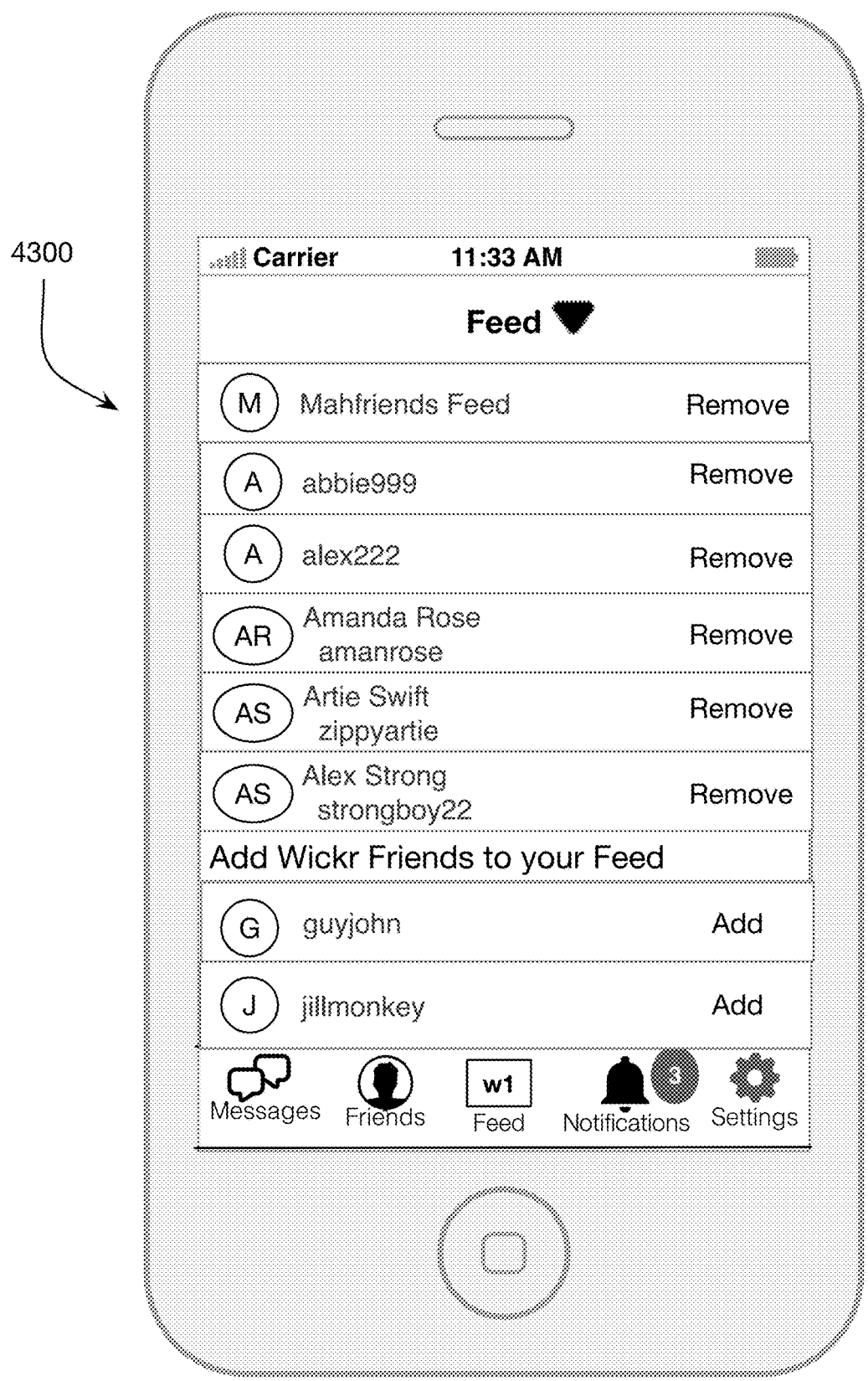
FIGS. 43A-43C illustrate examples of an interface for removing users from an existing secure social feed.
Figure 43B:
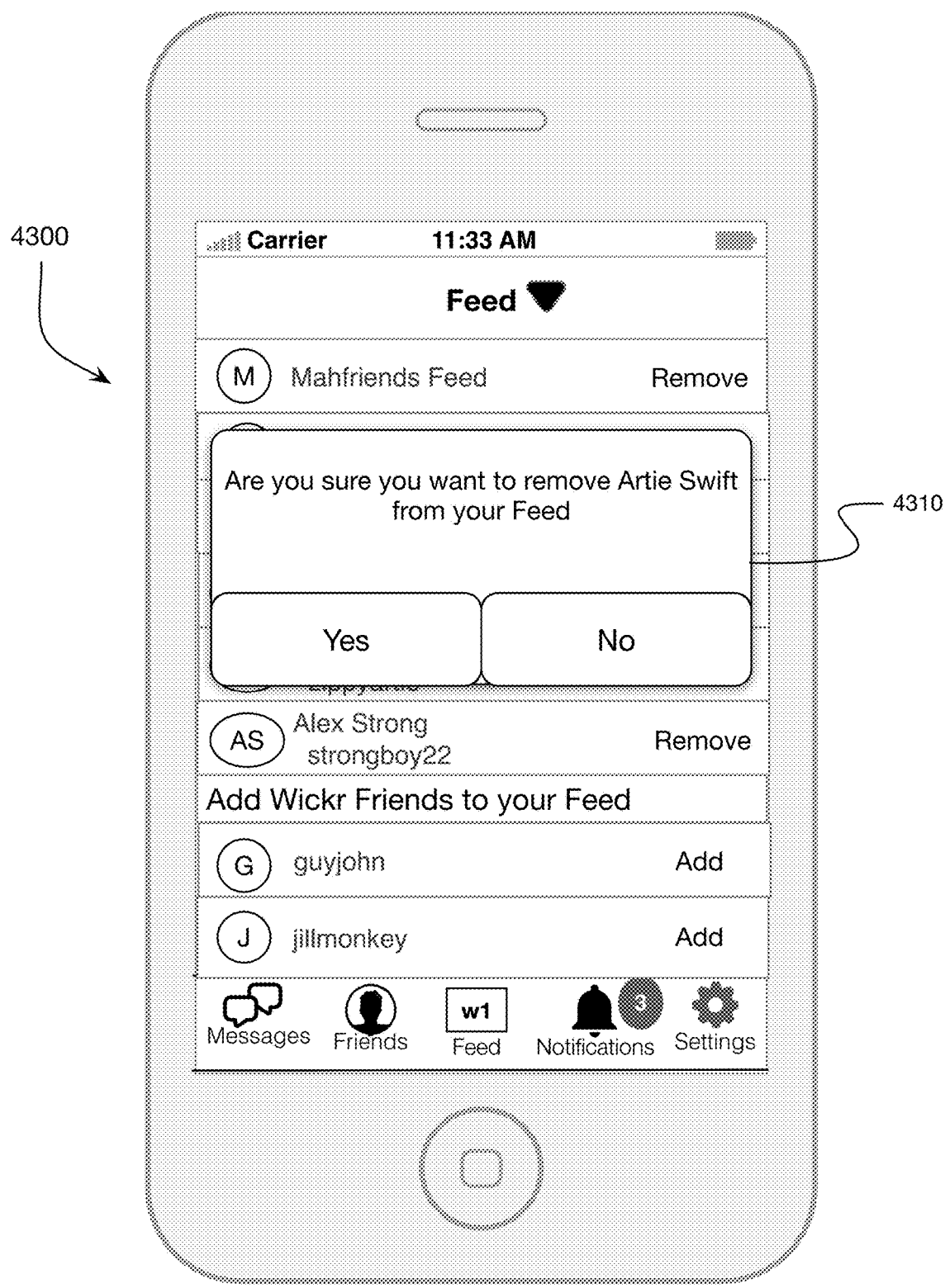
Figure 43C:
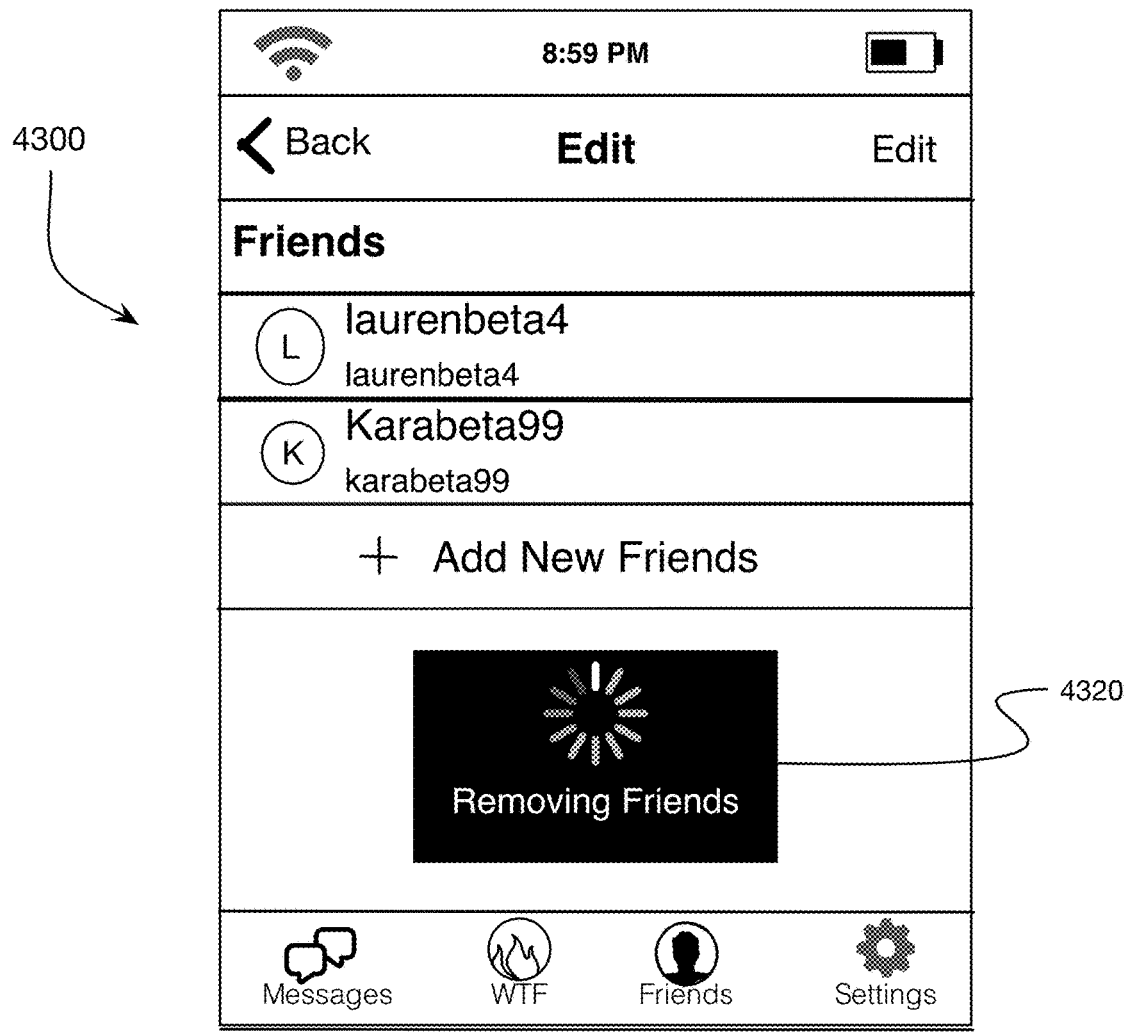

FIGS. 43A-43C illustrate an example of interface 4300 for removing users from a secure social feed. In particular, FIG. 43A shows an interface for modifying the users that may access the secure social feed. From interface 4300, the administrator may click a "Remove" field next to the member of the secure social feed in order to remove that member from the administrator's secure social feed.

FIG. 43B illustrates an example of interface 4300 after the administrator has selected a member to remove from the secure social feed. According to the illustrated example, the administrator has selected "Artie Swift" to remove from the member list. Accordingly, interface 4300 may prompt the administrator with Dialogue Box 4310 to confirm that the administrator wishes to remove "Artie Swift" from the secure social feed. If the administrator selects "No," "Artie Swift" will remain a member of the secure social feed. However, if the administrator chooses "Yes" in dialogue box 4310, the interface proceeds to FIG. 43C.

FIG. 43C shows interface 4300 processing the remove member request. In particular, a processing dialogue box 4320 is displayed to show the app is working to remove the user from the secure social feed. In this regard, the administrator's app may perform method 4200 while the processing dialogue box 4320 is displayed on the administrator's device.

Figure 44:
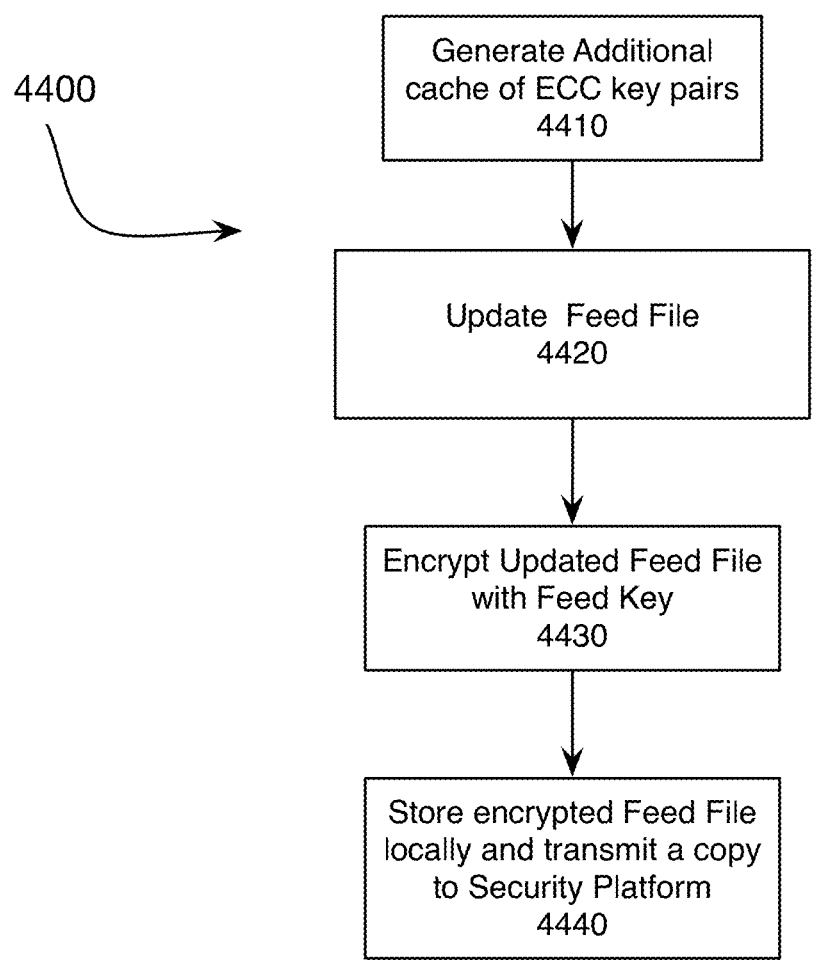
FIG. 44 illustrates a flowchart for periodically updating a feed file associated a secure social feed.

Finally, the administrator may be required to periodically update the cache of key pairs. FIG. 44 illustrates process 4400 for updating the cache of key pairs. Process 4400 begins in block 4410 where the administrator's app generates an additional cache of key pairs in response to receiving notification that the secure social feed's cache of key pairs is below a certain level. According to some embodiments, notification may be provided by the security platform 102.

After generating the additional cache of key pairs, the administrator's app may recreate the feed file to include the private keys set forth in the additional cache. Additionally, the administrator's app may also update the feed definition with respect to the updated cache of private keys.

In block 4430, the updated feed file is encrypted with the feed key using a suitable encryption algorithm. In preferred embodiments, the updated feed file may be encrypted with AES256.

Finally, in block 4440, the encrypted updated feed file is stored locally on the administrator's device. Further, the administrator's app will also provide a copy of the encrypted updated feed file to the users on the member list, either directly or via security platform 102.

In summary, a user, such as Alice, may use the secure messaging app to create a secure social feed in order to share her content with just a few friends or thousands of recipients. For example, Alice may wish to share content with her friends Bob, Brandon, Charles, Lucy and Joe. Using the secure messaging app described herein, Alice may create a secure social feed.

To create the secure social feed, Alice—acting as administrator of the feed—may define the secure social feed by creating a feed file. The feed file includes a static ID, a dynamic ID, a group definition, a cache of Elliptic Curve Cryptography (ECC) key pairs, and a member list—which includes an alias assigned to each recipient in order to protect each recipient's user identity.

After creating the feed file, Alice's app will encrypt the feed file using a feed key, which is a random, 256-bit key. Accordingly, Alice's app will store a copy of the encrypted feed file locally and transmit a copy to the security platform. Upon uploading the encrypted feed file to the security platform, Alice's app may begin sending invitations to recipients to view her secure social feed. According to this example, Alice initially forgets to invite Brandon to view her feed and only sends invitations to Bob, Charles, Lucy, and Joe.

The invitations comprise a group definition that includes the static and dynamic IDs, a member list, and the feed key. The invitation may be sent from Alice's app to all the recipients via a standard Digital Security Bubble as described above.

The recipients may respond to the invitation by accepting, declining, or not replying. Each recipient's response to the invitation may be recorded in the member list located in the feed filed stored locally on Alice's device. When recipients accept the invitation, they obtain the feed key from the invitation DSB. The recipients will then request the encrypted feed file from the security platform and use the received feed key to decrypt the feed file provided by the security platform.

When Alice's app receives negative responses or no-replies, Alice's app will rebuild the feed file—updating the dynamic ID, the member list, and the feed key; encrypt the feed file using the updated feed key; and transmit the rebuilt feed file to the security platform. Alice's app will then provide the updated feed key to the recipients included in the updated member list. Recipients then retrieve the updated feed file from the security platform and decrypt it using the updated feed key.

In order to post content to her secure social feed, Alice's app will encrypt the content using a 256-bit, randomly-generated content key. Alice's app then transmits the content key and the encrypted content to the recipients' apps in the payload of a DSB. Accordingly, Alice's app creates a random, 256-bit key to encrypt the payload of the DSB. The payload of the DSB is encrypted with the random, 256-bit key. The random, 256-bit key is then encrypted using one of the ECC public keys defined in the feed file. The encrypted payload, a reference value for the ECC public key, and information identifying Alice's secure social feed, such as the static and dynamic IDs, are encapsulated in the DSB. The DSB is then transmitted to the security platform, which reviews the identifying information to determine which secure social feed to associate the content with. Accordingly, the security platform will notify recipients included in the member list that the secure social feed includes new content.

The security platform may provide notification to the recipients' apps, for example through a push notification, that Alice's secure social feed has a new post. Alternatively, the recipients' apps may periodically poll the security platform to determine whether the secure social feed includes any new posts.

When the secure social feed includes new posts, the recipients' apps will contact the security platform and download the DSB associated with the new post. Each recipient app will use the reference value in the DSB to obtain the corresponding ECC private key to decrypt the random, 256-bit key. The recipient app will then use the obtained ECC private key to decrypt the random, 256-bit key. The recipient app decrypts the content key using the decrypted random, 256-bit AES key. The content key is then used by the recipients' apps to decrypt and view Alice's content.

After posting content, Alice may invite additional recipients to view her secure social feed. Accordingly, Alice may remember to invite Brandon. In this regard, Brandon will receive the feed key from Alice via an invitation DSB, obtain the encrypted feed file from the security platform, and be provided with the content and the content key via the techniques described above. In this regard, new invitees may view previously posted content using the received content key.

Further, recipients may leave the secure social feed either via their own volition or by being removed by the administrator (Alice). In order to prevent removed recipients from viewing posted content, Alice will update the feed file. Specifically, Alice's app creates a new dynamic ID, updates the member list, and generates a new feed key. The updated feed file is transmitted to the security platform. Further, Alice's app will provide the new feed key to the recipients on the member list. The recipients will obtain the updated feed file from the security platform in order to view newly posted content. In this regard, removed recipients may not view the secure social feed because they do not have the updated dynamic ID. However, if removed recipients are able to discover the secure social feed, they will only be able to view previously posted, but they will not be able to access the newly posted content since they do not have the new feed file.

Depending on how much content Alice posts, she may need to periodically update the cache of ECC key pairs. In this regard, Alice will derive another cache of ECC key pairs and build an updated feed file. The updated feed file is encrypted with the feed key and stored on the security platform.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system comprising:
    a processor configured to:
       generate a secure social feed by creating a feed file, wherein the feed file includes criteria that enables members of the secure social feed to decrypt encrypted published content;
       obtain content for publication to the secure social feed;
       generate a content key to encrypt the obtained content;
       encrypt the obtained content using the content key; and
       publish the encrypted content to the secure social feed, wherein a decoy image is posted to the secure social feed for users that are not authorized to view the encrypted content;
    a memory coupled to the processor and configured to provide the processor with instructions.

2. The system of claim 1, wherein the processor is further configured to:
    generate a cache of key pairs to include in the feed file.

3. The system of claim 1, wherein the processor is further configured to:
    generate a feed key to encrypt the feed file; and
    encrypt the feed file using the feed key.

4. The system of claim 3, wherein the processor is configured to:
    provide the encrypted feed file to a third party such that members of the secure social feed can obtain the encrypted feed file from the third party.

5. The system of claim 4, wherein the third party is a secure messaging platform.

6. The system of claim 3, wherein the processor is configured to:
    provide the encrypted feed file to each member of the secure social feed via a peer-to-peer communication.

7. The system of claim 3, wherein the processor is configured to:
    provide the encrypted feed file to members of the secure social feed via a group communication.

8. The system of claim 1, wherein the processor is configured to publish the content by:
    generating a random message key;
    encrypting at least the content key and the encrypted content using the random message key;
    encrypt the random message key using a public key;
    encapsulating at least the encrypted random message key, the encrypted content, the encrypted content key, and a reference value for the public key in a Digital Security Bubble; and
    transmitting the Digital Security Bubble to members of the secure social feed.

9. The system of claim 1, wherein the secure social feed is a social media account.

10. A method comprising:
    generate a secure social feed by creating a feed file, wherein the feed file includes criteria that enables members of the secure social feed to decrypt encrypted published content;
    obtain content for publication to the secure social feed;
    generate a content key to encrypt the obtained content;
    encrypt the obtained content using the content key; and
    publish the encrypted content to the secure social feed, wherein a decoy image is posted to the secure social feed for users that are not authorized to view the encrypted content.

11. The method of claim 10, wherein the secure social feed is a social media account.

12. A computer program product embodied in a non-transitory computer readable storage medium and comprising computer instructions for:
    generate a secure social feed by creating a feed file, wherein the feed file includes criteria that enables members of the secure social feed to decrypt encrypted published content;
    obtain content for publication to the secure social feed;
    generate a content key to encrypt the obtained content;
    encrypt the obtained content using the content key; and
    publish the encrypted content to the secure social feed, wherein a decoy image is posted to the secure social feed for users that are not authorized to view the encrypted content.

13. The computer program product of claim 12, wherein the secure social feed is a social media account.

* * * * *